(12) United States Patent
Wakayama et al.

(10) Patent No.: US 6,212,221 B1
(45) Date of Patent: Apr. 3, 2001

(54) COMMUNICATION APPARATUS

(75) Inventors: Hironobu Wakayama; Kazunari Taki, both of Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/037,956

(22) Filed: Mar. 11, 1998

(30) Foreign Application Priority Data

| | | |
|---|---|---|
| Mar. 14, 1997 | (JP) | 9-061282 |
| Mar. 14, 1997 | (JP) | 9-061285 |
| Mar. 24, 1997 | (JP) | 9-070129 |

(51) Int. Cl.[7] ............ H04B 15/00; H04K 1/00; H04L 27/30
(52) U.S. Cl. ............ 375/133; 370/436; 370/478
(58) Field of Search ............ 375/131, 132, 375/133, 134, 137; 370/320, 436, 478, 330

(56) References Cited

U.S. PATENT DOCUMENTS 5,907,545 * 5/1999 Arai et al. ............ 370/342

\* cited by examiner

*Primary Examiner*—Chi Pham
*Assistant Examiner*—Phuong Phu

(74) *Attorney, Agent, or Firm*—Oliff & Berridge, PLC.

(57) ABSTRACT

A communication apparatus having a master device connected with a plurality of outside lines and a plurality of slave devices wirelessly connected with the master device, the communication of the communication data between the master device and the plurality of slave devices being performed for each communication frame on the basis of the spread spectrum communication method, the communication apparatus further having, the master device having: an allocation device for dividing the communication frame into at least a first slot and a second slot, for allocating the first slot to the communication data to be used for performing a first communication between the master device and a first slave device among the plurality of slave devices, and for allocating the second slot to the communication data to be used for performing a second communication between the master device and a second slave device among the plurality of slave devices; and a second communicating device for performing simultaneously the first communication of the communication data between the master device and the first slave device by using the first slot, and the second communication of the communication data between the master device and the second slave device by using the second slot, and each of the plurality of slave devices having: a third communicating device for performing the first or second communication of the communication data between the master device and each of plurality of slave device by using the first or second slot.

1 Claim, 40 Drawing Sheets

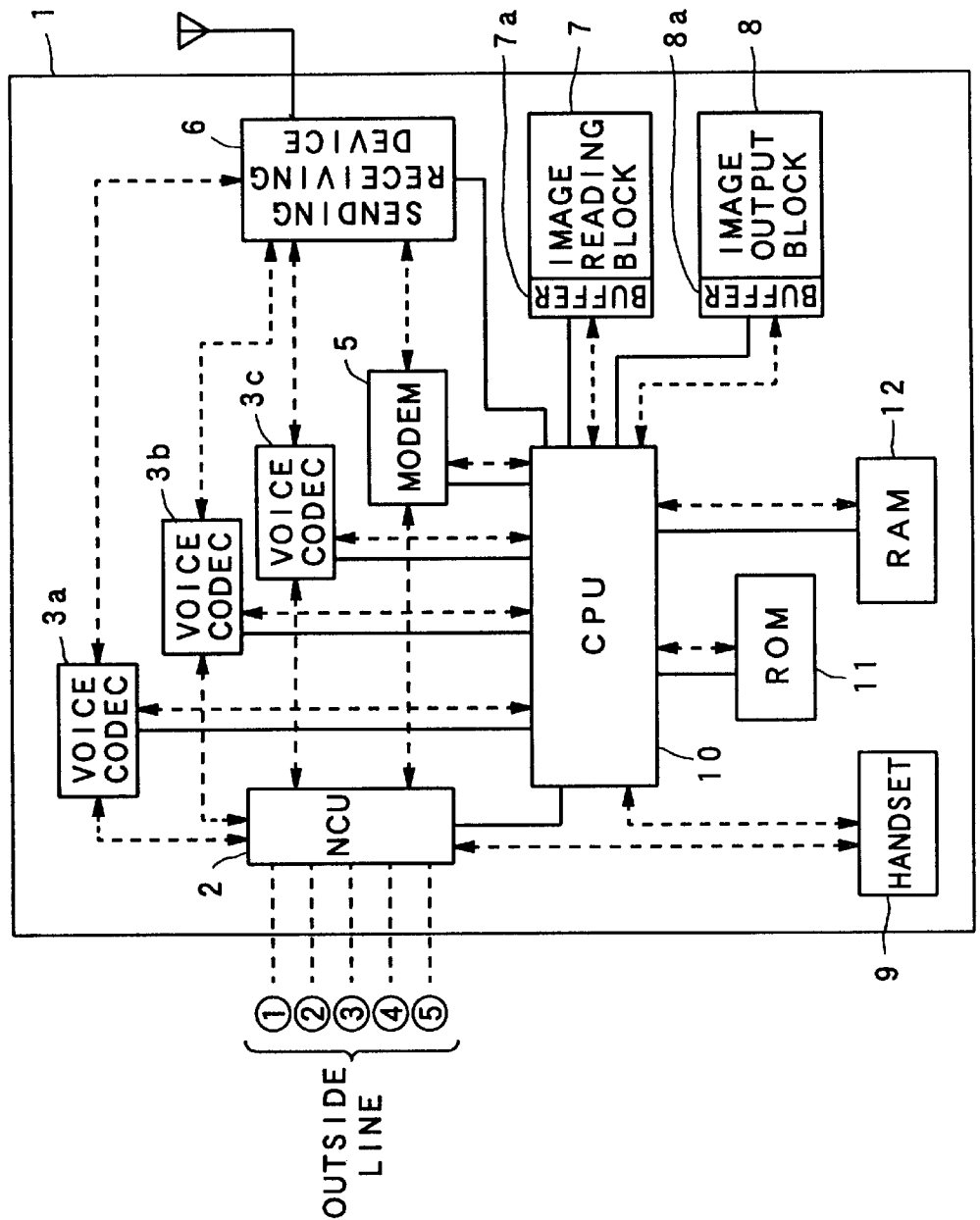

FIG. 5

| | ch 1 | ch 2 | ch 3 |
|---|---|---|---|
| 0 | $f_{00}$ | $f_{00}$ | $f_{00}$ |
| 1 | $f_{11}$ | $f_{21}$ | $f_{31}$ |
| 2 | $f_{12}$ | $f_{22}$ | $f_{32}$ |
| 3 | $f_{13}$ | $f_{23}$ | $f_{33}$ |
| ⋮ | ⋮ | ⋮ | ⋮ |
| n | $f_{1n}$ | $f_{2n}$ | $f_{3n}$ |

$$f_{1x} \neq f_{2x} \neq f_{3x}$$

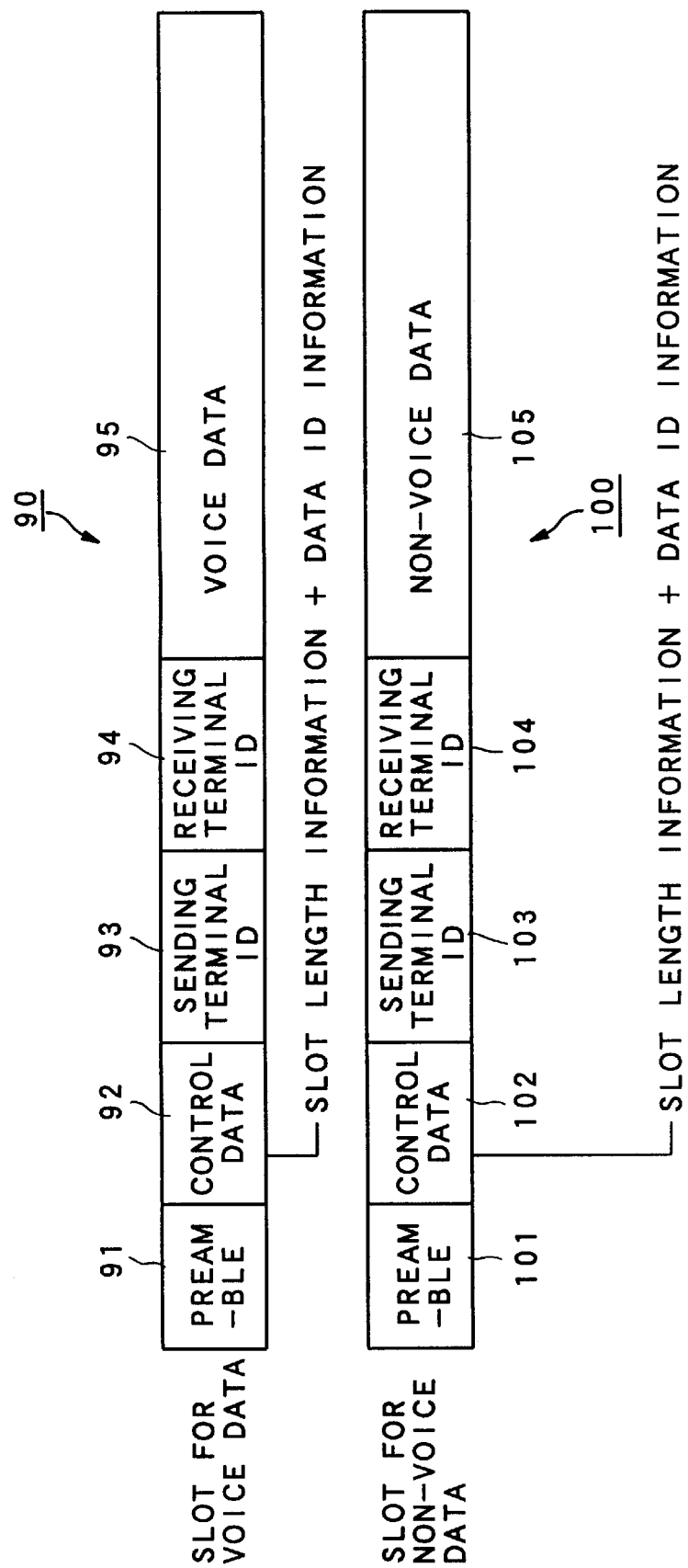

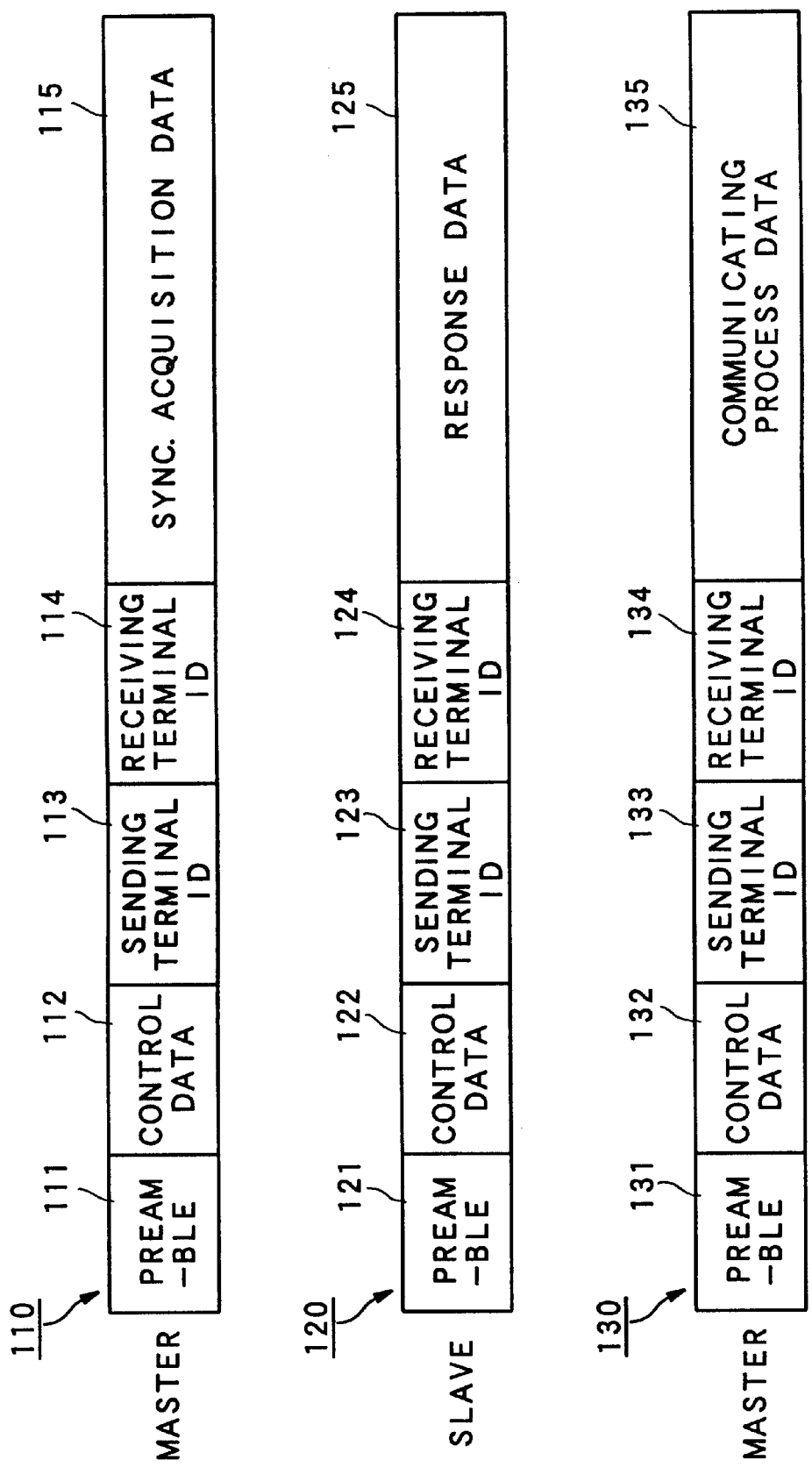

FIG. 11A

| OUTSIDE LINE | STATE OF CONNECTION |
|---|---|
| ① | IDLE |
| ② | VOICE CODEC 3a |
| ③ | MODEM 5 |
| ④ | IDLE |
| ⑤ | VOICE CODEC 3c |

FIG. 11B

| HARDWARE | STATE OF CONNECTION |
|---|---|
| VOICE CODEC 3a | SLAVE TERMINAL 20A |
| VOICE CODEC 3b | IDLE |
| VOICE CODEC 3c | SLAVE TERMINAL 20D |
| MODEM 5 | IMAGE OUTPUT BLOCK AND SLAVE PHONE 40C |

FIG. 11C

| TERMINAL | COMMUNICATION PARTNER | SLOT | CHANNEL | SYNC. ACQUISITION |
|---|---|---|---|---|
| MASTER TERMINAL 1 | SLAVE TERMINAL 20A (OUTSIDE LINE) | VOICE 1 | 1 | — |
| | SLAVE TERMINAL 40C | DATA 2 | 1 | — |
| | SLAVE TERMINAL 20D | VOICE 3 | 1 | — |
| SLAVE TERMINAL 20A | MASTER TERMINAL | VOICE | 1 | ○ |
| SLAVE TERMINAL 20B | SLAVE TERMINAL 20C | SINGLE A | 2 | ○ |
| SLAVE TERMINAL 20C | SLAVE TERMINAL 20B | SINGLE B | 2 | ○ |
| SLAVE TERMINAL 20D | MASTER TERMINAL | VOICE 3 | 1 | ○ |
| SLAVE TERMINAL 40A | SLAVE TERMINAL 40B | SINGLE B | 3 | ○ |
| SLAVE TERMINAL 40B | SLAVE TERMINAL 40A | SINGLE B | 3 | ○ |
| SLAVE TERMINAL 40C | MASTER TERMINAL | DATA 2 | 1 | ○ |
| SLAVE TERMINAL 40D | IDLE | — | — | × |

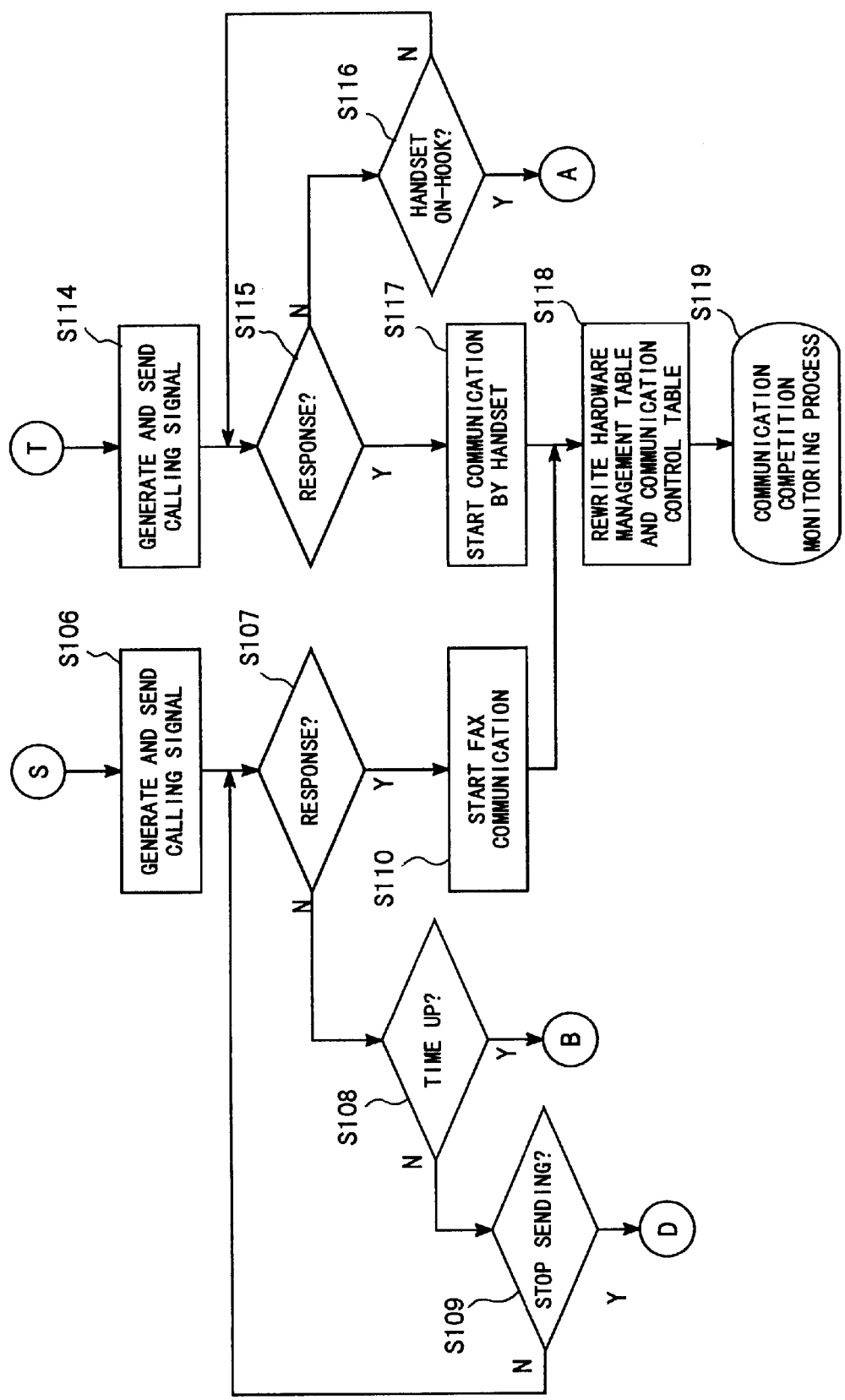

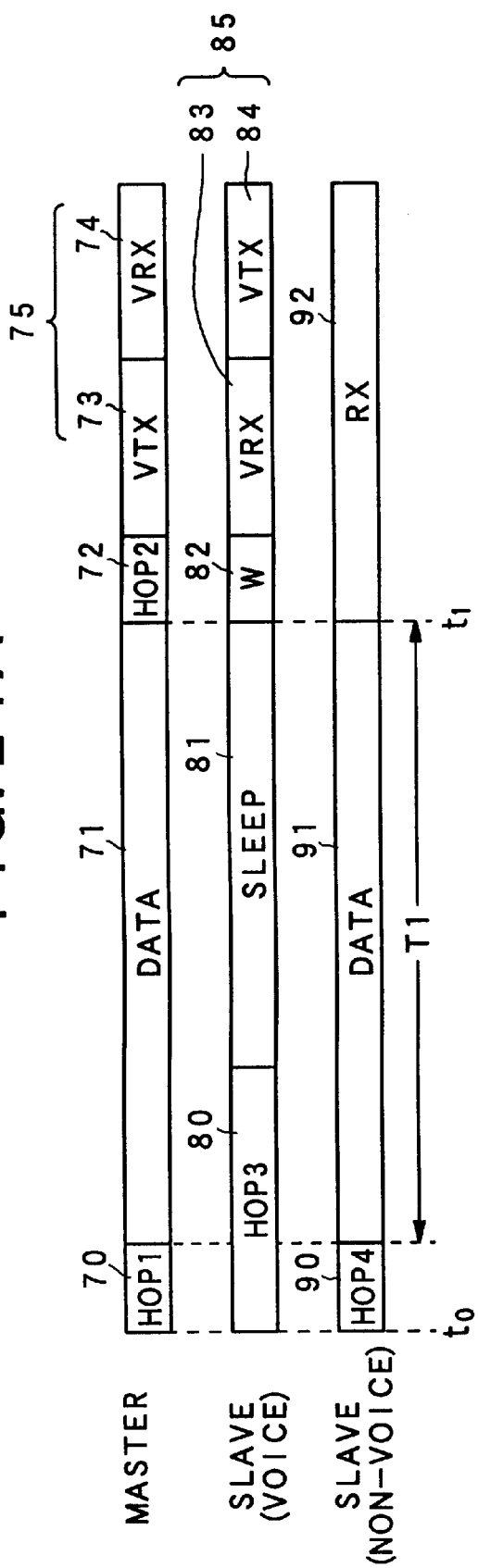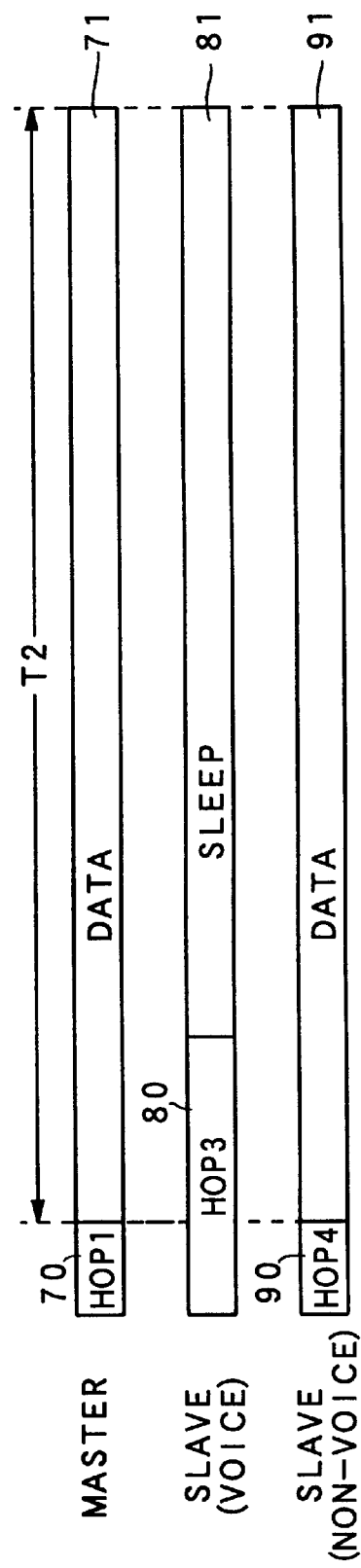

FIG. 25

| T4 | M | f |
|---|---|---|
| | 0 | h0 |
| | 1 | h1 |
| | 2 | h2 |
| | 3 | h3 |
| | 4 | ..... |
| | m | hm |

| T3 | M | f |
|---|---|---|
| | 0 | g0 |
| | 1 | g1 |
| | 2 | g2 |
| | 3 | g3 |
| | 4 | ..... |
| | m | gm |

| T2 | M | f |
|---|---|---|
| | 0 | f0 |
| | 1 | f1 |
| | 2 | f2 |
| | 3 | f3 |
| | 4 | ..... |
| | m | fm |

| T1 | M | f |
|---|---|---|
| | 0 | f0 |
| | 1 | g0 |
| | 2 | f1 |
| | 3 | g1 |
| | 4 | f2 |
| | | g2 |
| | | f3 |
| | | g3 |
| | 2m | fm |
| | 2m+1 | gm |

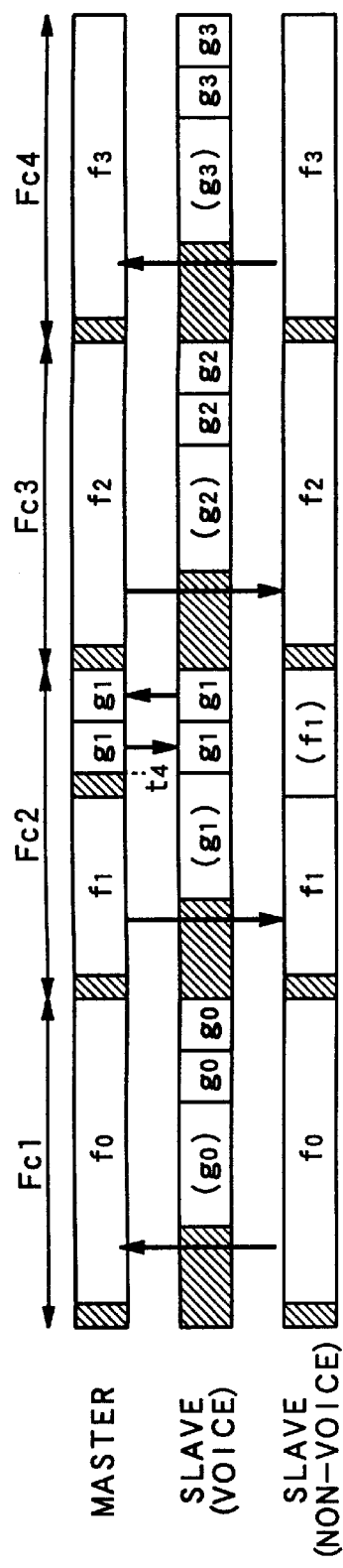
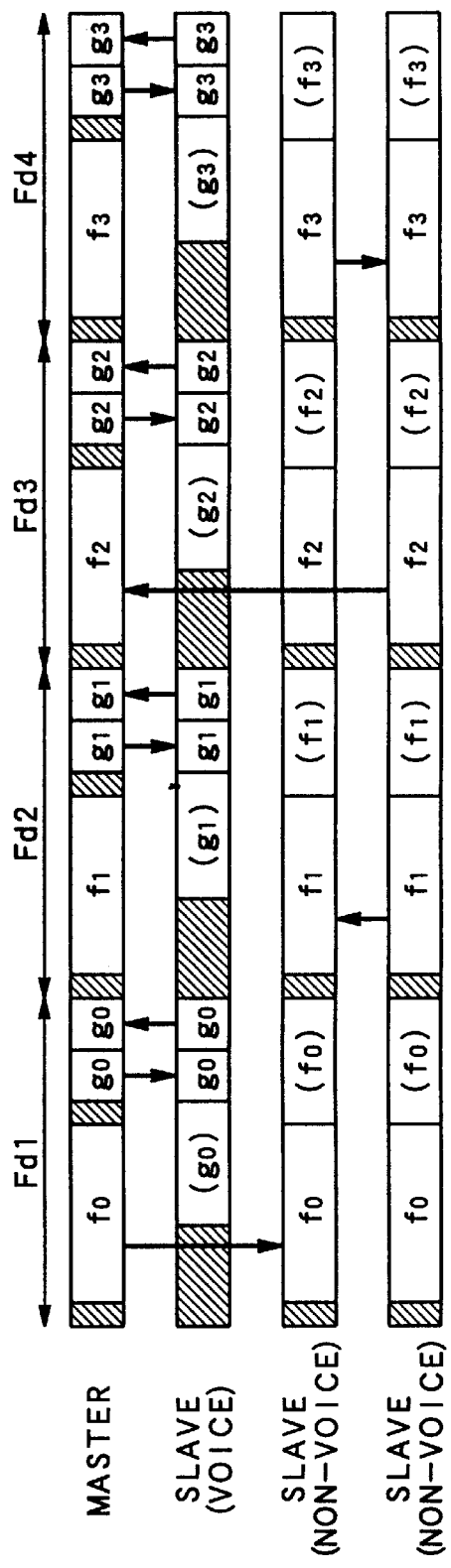
FIG. 26C
FIG. 26D

COMMUNICATION APPARATUS

BACKGROUND OF THE INVENTION

1. Field of the Invention

The present invention relates to a wireless communicating apparatus for performing a communication by using a spread spectrum communication method.

2. Description of the Related Art

In a communicating system using the spread spectrum communicating method, a communicating method using a frequency hopping method (hereafter, referred to as an FH method) is used in order to improve the effective utilization of a frequency and a security. The FH method performs the spreading by hopping a carrier frequency in accordance with a predetermined rule based on a spread spectrum code sequence. A sending and receiving device in a two-way communicating system using the spread spectrum communicating method by the FH method is constructed, for example, as shown in FIG. 30.

At first, when the sending operation is performed, a signal having a random frequency is outputted by a frequency synthesizer 206 in accordance with the spread spectrum code sequence outputted by a spread spectrum code sequence generator 205. On the other hand, a first modulation signal is inputted to a transmission data input terminal 220. An output frequency of the first modulation signal is determined by an up-converter 203 on the basis of the output of the frequency synthesizer 206. The transmission data which is frequency-converted by the up-converter 203 is amplified by an amplifier 208. Then, it is sent and outputted through a sharing element 210 to an antenna 211.

Next, when the receiving operation is performed, a signal received by the antenna 211 is separated from the transmission signal by the sharing element 210, amplified by an amplifier 209 and inputted to a down-converter 207. Then, it is frequency-converted on the basis of a signal specifying the frequency from the frequency synthesizer 206 by the down-converter 207, and demodulated by a demodulator 212 to thereby become the reception data. This reception data is outputted to a data operation circuit (not shown) and also outputted to a synchronization circuit 204. In the synchronization circuit 204, a phase of a hopping frequency is detected from the reception signal. A synchronization signal is outputted from the synchronization circuit 204 to the spread spectrum code sequence generator 205, which outputs the spread spectrum code sequence on the basis of the inputted synchronization signal. The spread spectrum code sequence outputted by the spread spectrum code sequence generator 205 is sent to the frequency synthesizer 206, which generates the output having the random frequency on the basis of the inputted spread spectrum code sequence.

The down-converter 207 multiplies the reception signal by the output from the frequency synthesizer 206 to thereby inverse-spread to the reception signal (Here, "inverse-spread" means to demodulate a signal modulated (spread) on the basis of a spread spectrum code by using the same spread spectrum code). The reception signal inverse-spread by the down-converter 207 is demodulated by the demodulator 212. The demodulated reception signal is outputted from a reception data output terminal 221.

Accordingly, the two-way communication is performed by the simultaneous operations in the sending and receiving sections as mentioned above.

The random frequency implies that the outputted spread spectrum code is randomly changed each time the synchronization signal is inputted by the spread spectrum code sequence generator 205. The sending and receiving operations are performed under the common utilization of this spread spectrum code sequence (frequency hopping pattern) between one combination of communicating apparatuses.

However, in the conventional apparatuses, the data treated as the transmission data and reception data is only voice data or only non-voice data. Thus, it is impossible to send and receive the mixture of the voice data and the non-voice data.

This is because the uniformly sending and receiving operation is performed independently of the data types although there are the differences between the data characteristics, as described below. Namely, as for the voice data, the data amount which is sent and received at one time is small, and the ability of the real time (the ability of immediate response) is highly required. As for the non-voice data, the data amount which is sent and received at one time is large, and the ability of the real time is not required so much.

Hence, in an apparatus having both functions of a facsimile function and a master and slave phone function, a spread spectrum digital communication, such as the frequency hopping method or the like, can not be performed between the master phone and the slave phone. As a result, it is impossible to improve the security and the frequency utilization efficiency.

Moreover, in the conventional apparatus, in order to perform the simultaneous communications between the master phone and a plurality of slave phones, a hopping frequency data pattern must be changed for each communicating pair, and a plurality of sending and receiving devices must be disposed on the master phone side, which results in the problem of a large-sized apparatus.

SUMMARY OF THE INVENTION

It is therefore a first object of the present invention to provide a communication apparatus for performing the spread spectrum digital communication, which can simultaneously perform the communications by using a plurality of communication pairs.

Further, it is a second object of the present invention to provide a communicating apparatus for performing the spread spectrum digital communication, which can simultaneously process both the voice data and the non-voice data.

Furthermore, it is a third object of the present invention to provide a communication apparatus for performing the spread spectrum digital communication, which can perform an effective communication under a simple configuration, and perform an excellent communications without the interference with the mutual communications.

According to the present invention, the above mentioned first object is achieved by a communication apparatus having a master device connected with a plurality of outside lines for performing an outside communication of communication data between the master device and the plurality of outside lines, and a plurality of slave devices wirelessly connected with the master device for performing a communication of the communication data between the master device and the plurality of slave devices by using a spread spectrum communication method, the communication of the communication data between the master device and the plurality of slave devices being performed for each communication frame which indicates an unit of the communication on the basis of the spread spectrum communication method, the master device having: a first communicating device for performing the outside communication of the communication data between the master device and the plurality of outside lines; a converting device for converting a first format of the communication data received from the plurality of outside lines into a second format which can be handled by the master device, and for converting the second format of the communication data received from the plurality of slave devices into the first format which can be handled by the plurality of outside lines; an allocating device for dividing the communication frame into at least a first slot and a second slot, for allocating the first slot to the communication data to be used for performing a first communication between the master device and a first slave device among the plurality of slave devices, and for allocating the second slot to the communication data to be used for performing a second communication between the master device and a second slave device among the plurality of slave devices; and a second communicating device for performing simultaneously the first communication of the communication data between the master device and the first slave device by using the first slot, and the second communication of the communication data between the master device and the second slave device by using the second slot, and each of the plurality of slave devices having: a generating device for generating the communication data to be sent to the master device; a selecting device for selecting a slot allocated to the communication data to be used for performing the first or second communication between the master device and each of plurality of slave devices from among at least the first slot and the second slot; and a third communicating device for performing the first or second communication of the communication data between the master device and each of plurality of slave device by using the selected slot.

In the communication apparatus, it is possible to perform a communication between the master device and each outside line, to perform a communication between the master device and each slave device, to perform a communication between each slave device and each outside line through the master device. The communication between the master device and the slave device is a digital communication using the spread spectrum communication method, and is performed for each communication frame. The communication frame is an unit of the digital communication. In addition, an analog communication is generally used for the communication between the master device and outside line, but a digital communication can be used for it.

Further, in the master device, the allocating device divides the communication frame into the first slot and the second slot. Further, the allocating device allocates the first slot to the communication data to be used for performing the first communication between the master device and the first slave device. Furthermore, the allocation device also allocates the second slot to the communication data to be used for performing the second communication between the master device and the second slave device. Then, the second communicating device performs the first communication between the master device and the first slave device by using the first slot, and the second communication between the master device and the second slave device by using the second slot, simultaneously.

Namely, the communication frame includes the first slot and second slot, and the first slot is allocated to the communication data to be used for the first communication between the master device and the first slave device, and the second slot is allocated to the communication data to be used for the second communication between the master device and the second slave device. Thus, the first communication by the first slot and the second communication by the second slot are simultaneously performed in one communication frame. That is to say, the first communication between the master device and the first slave device and the second communication between the master device and the second slave device are simultaneously performed in one communication frame.

On the other hand, in each slave device, the selecting device selects the slot to be used for performing the first or second communication, and the third communicating device performs the first or second communication by using the selected slot.

Thus, the communications by a plurality of communication pairs can be simultaneously performed.

Further, if the communication frame is divided into the at least a first sending slot, a first receiving slot, a second sending slot and a second receiving slot, the master device can send the communication data to the first slave device by using the first sending slot, and receive the communication data from the first slave device by using the first receiving slot. Further, the master device can send the communication data to the second slave device by using the second sending slot, and receive the communication data from the second slave device by using the second receiving slot. And, these sending and receiving operations are simultaneously performed in one communication frame.

Furthermore, if the communication frame is divided into the first slot, second slot and the third slot, the third slot can be allocated to the communication data to be used for the third communication between other two slave devices. Thus, the communications between the other two slave devices can be simultaneously performed in addition to the communications between the master device and the plurality of slave devices.

Further, if the length of each slot is changed in accordance with a type of the communication data to which each slot is allocated, an effective communication can be performed under a simple configuration.

According to the present invention, the aforementioned second object is achieved by a communication apparatus wherein the master device further has a determining device for determining whether the communication data received from the plurality of outside lines by the first communicating device is voice data or non-voice data and for determining whether said communication data received from the plurality of slave devices by the second communicating device is said voice data or said non-voice data, the allocating device allocates the first slot to the non-voice data and allocates the second slot to the voice data on the basis of a determination by the determining device, and the second communicating device simultaneously performs a first communication of the non-voice data between the master device and the first slave device by using the first slot, and a second communication of the voice data between the master device and the second slave device by using the second slot.

In this communication apparatus, the second communicating device performs the communication between the master device and at least the first and second slave devices for each communication frame. At this time, the communication frame includes the first slot and second slot, and the first slot is allocated to the non-voice data to be used for the first communication between the master device and the first slave device, and the second slot is allocated to the voice data to be used for the second communication between the master device and the second slave device. Thus, the communication of the non-voice data and the communication of the voice data are simultaneously performed in one communication frame.

Further, if the length of the first slot allocated to the non-voice data is made longer than the length of the second slot allocated to the voice-data, the communication of the voice data, in which the ability of real time is required, and the communication of the non-voice data having high bit rate can be performed simultaneously and efficiently.

Further, when the communication data used for communicating between the master device and the plurality of slave device includes only the non-voice data, the communication frame is not divided but the single slot is formed in this communication frame, and the single slot is allocated to the non-voice data. Thus, the communication of the non-voice data having high bit rate can be performed efficiently.

According to the present invention, the aforementioned third object is achieved by a communication apparatus wherein the communication of the communication data between the master device and the plurality of slave devices are performed by using a frequency hopping method, and a communication frequency used for the communication between the master device and the plurality of slave devices is shifted for each frame on the basis of the frequency hopping method, and the master device further has: a first hopping table in which a first hopping pattern is described; a second hopping table in which a second hopping pattern, which is different from the first hopping pattern, is described; a first shifting device for shifting the communication frequency in accordance with the first hopping pattern for each communication frame; a second shifting device for shifting the communication frequency in accordance with the second hopping pattern while the second communication is performed by using the second slot.

In this communication apparatus, the communication between the master device and each slave device is performed by using the frequency hopping method, which is a kind of the spread spectrum communication method. In this communication, the communication frequency is shifted (hopped) for each communication frame, and this frequency shift is performed in accordance with the first hopping pattern. Further, while the second communication is performed by using the second slot, the communication frequency is shifted in accordance with the second hopping pattern.

Here, note that at least the first slot and the second slot is included in the communication frame, and the first slot is allocated to the non-voice data and the second slot is allocated to the voice data. Further, the first communication of the non-voice data is performed by the first slot and the second communication of the voice data is performed by the second slot, as mentioned above. Thus, since the communication frequency is shifted for each communication frame in accordance with the first hopping pattern, the first communication of the non-voice data is performed under the frequency hopping according to the first hopping pattern. On the other hand, since the communication frequency is further shifted during the second communication in accordance with the second hopping pattern, the second communication of the voice data is preformed under the frequency hopping according to the second hopping pattern. Namely, in one communication frame, the frequency hopping is further carried out with respect to the voice data by using a different hopping pattern.

Thus, it is possible to perform an effective communication under a simple configuration and an excellent communications without the interference with the mutual communications.

Further, if the communication between two slave devices is performed by using the third hopping pattern, which is different from the first and second hopping patterns, this communication is not interfered with the communication between the master device and other slave devices.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a block diagram showing a configuration of a master terminal of a communicating apparatus in a first embodiment of the present invention;

FIG. 5 is a view explaining a hopping frequency table used in the sending and receiving device in the first embodiment of the present invention;

FIG. 8 is a view showing configurations of a voice terminal slot and a data terminal slot in the frame in the first embodiment of the present invention;

FIG. 10 is a view showing a configuration of a synchronous acquisition slot used in the synchronous acquisition process in the first embodiment of the present invention;

FIG. 11A is a view explaining an outside line management table managed by the master terminal in the communicating apparatus in the first embodiment of the present invention;

FIG. 11B is a view explaining a hardware management table managed by the master terminal in the communicating apparatus in the first embodiment of the present invention;

FIG. 11C is a view explaining a communication control table managed by the master terminal in the communicating apparatus in the first embodiment of the present invention;

FIGS. 18A and 18B are flowcharts showing a master terminal sending data process in the communicating apparatus in the first embodiment of the present invention;

FIGS. 24A and 24B are block diagrams showing a structure of a frame used in the communicating apparatus in the second embodiment of the present invention;

FIG. 25 are views showing one example of a hop tables in the wireless communicating section in the second embodiment of the present invention;

FIGS. 26A, 26B, 26C, 26D and 26E are timing charts showing a communicating process in the communicating apparatus in the second embodiment of the present invention;

DETAILED DESCRIPTION OF THE PREFERRED EMBODIMENTS

I. First Embodiment

Figure 1B:
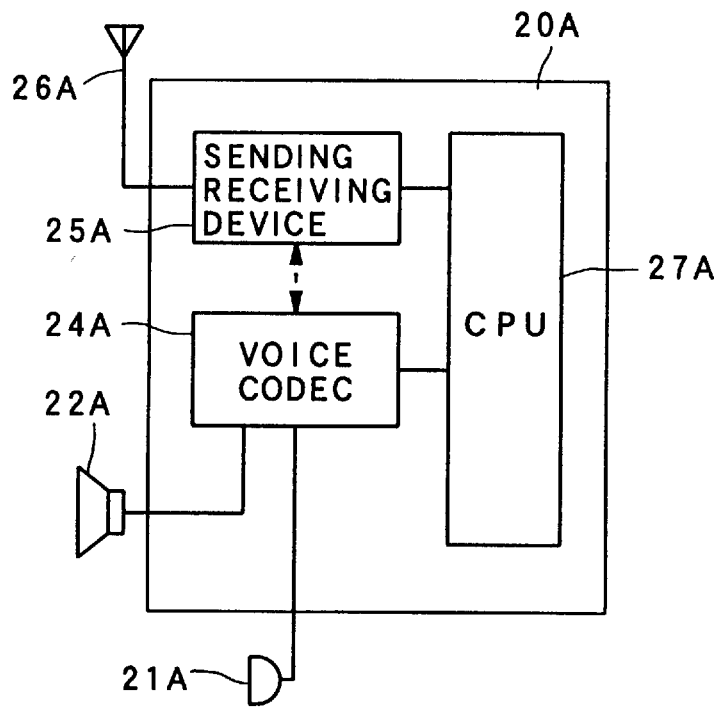
FIG. 1B is a block diagram showing a configuration of a voice slave terminal of the communicating apparatus in the first embodiment of the present invention.
Figure 1C:
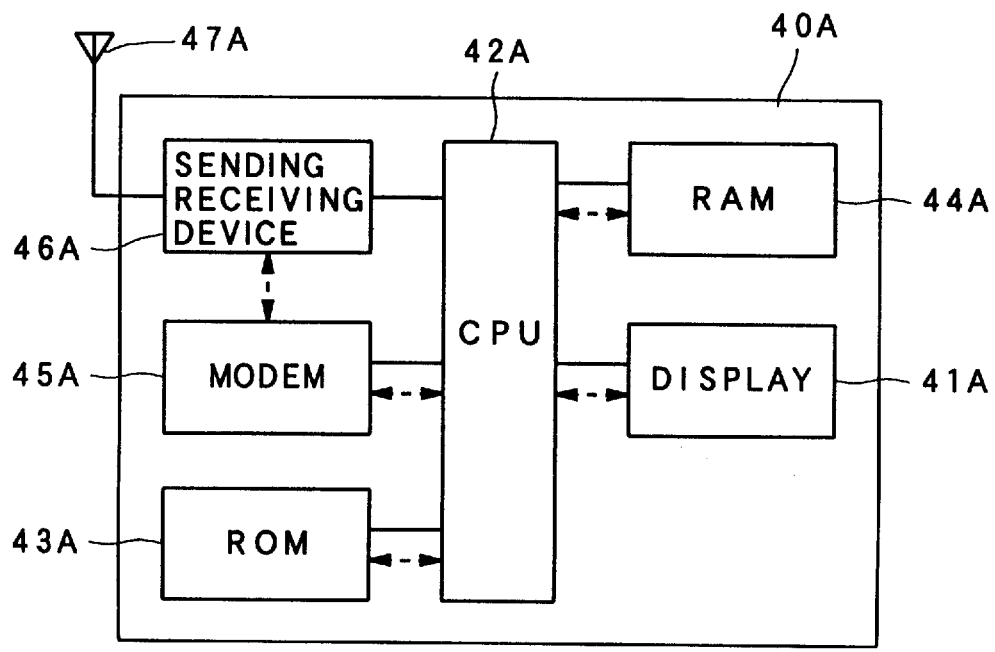
FIG. 1C is a block diagram showing a configuration of a data slave terminal of the communicating apparatus in the first embodiment of the present invention.
Figure 2:
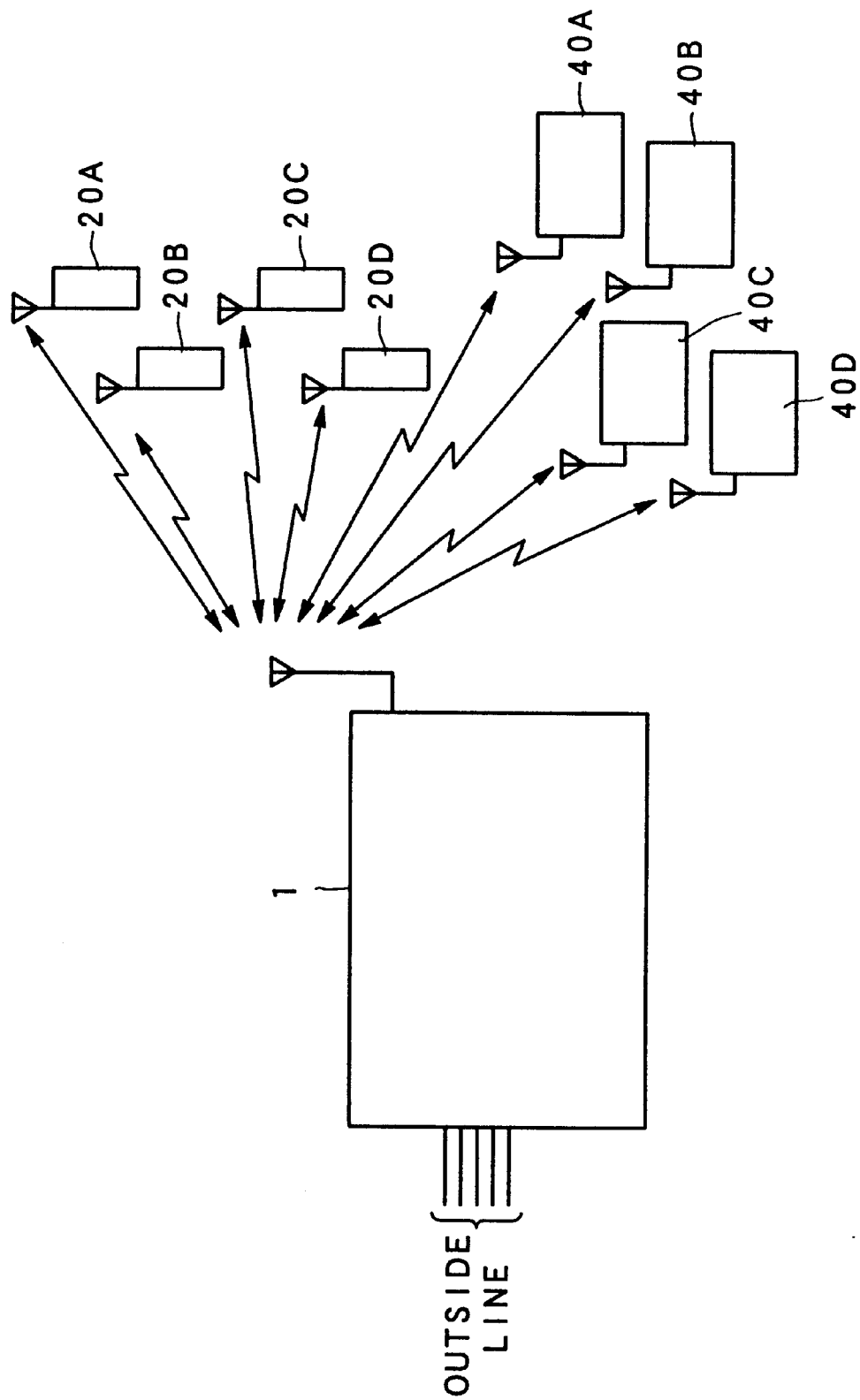
FIG. 2 is a block diagram showing a whole configuration of the communicating apparatus in the first embodiment of the present invention.

A first embodiment according to the present invention is explained with reference to FIGS. 1A to 23. FIG. 1A is a block diagram showing the schematic configuration of a master terminal constituting a communicating apparatus in a first embodiment of the present invention. FIG. 1B is a block diagram showing the schematic configuration of a voice slave terminal 20A. FIG. 1C is a block diagram showing the schematic configuration of a data slave terminal 40A. FIG. 2 is a block diagram showing the schematic configuration of the whole communicating apparatus in this embodiment.

The communicating apparatus in this embodiment is provided with a master terminal 1 wire-connected to a typically commercial analog telephone line, four voice slave terminals 20A to 20D wirelessly connected to the master terminal 1 by using the frequency hopping method and four data slave terminals 40A to 40D, as shown in FIG. 2.

At first, the configuration of the master terminal 1 is explained. The master terminal 1 is a complex telephone having a scanner function, a facsimile function, a printer function and a master and slave terminal function. As shown in FIG. 1A, the master terminal 1 is provided with: an NCU (Network Control Unit) 2 for controlling an external analog telephone line; voice codecs 3a, 3b and 3c for digitally coding voice data; a modem 5 having a sending and receiving function of a facsimile and a sending and receiving function of data for a personal computer communication; a sending and receiving device 6 for performing the wireless communication with the slave terminal by using the frequency hopping method described later; an image reading block 7 composed of a scanner and the like; an image output block 8 for creating an image on a record substrate; a handset 9 for performing a extension line call or an outside line call from the master terminal 1; a CPU 10 for performing a control of the above mentioned devices, a sending and a reception of data through an outside line, a determination a data type, a determination a communication type, a switching of devices, and so on; a ROM 11 in which the data or the program for actuating the CPU 10 is stored; and a RAM 12 for tentatively storing the operation process data when the CPU 10 is actuated.

The operational section composed of a switch and the like for actuating the master terminal 1 is not shown. In FIG. 1A, solid lines connecting between the respective means and devices indicate the control lines, and dotted lines indicate the data lines.

Next, the configuration of the respective devices and means constituting the master terminal 1 as mentioned above is explained in detail.

As shown in FIG. 1A, the NCU 2 for controlling the analog line is connected to five analog telephone lines of outside lines ① to ⑤, and is connected to any one of the voice codecs 3a, 3b and 3c and the modem 5 by the control of the CPU 10.

The voice codecs 3a, 3b and 3c are the means for converting the voice data between the analog data and the digital data by the control of the CPU 10, and perform the digitally coding operation in order to convert the voice data which is digitally coded and sent from the slave terminals 20A to 20D into the analog data, or receive through the CPU 10 from the handset 9, or send to the slave terminals 20A to 20D the analog voice data received through the NCU 2 from the outside line.

The modem 5 realizes the transmission procedure and the terminal characteristic employing the class 2 (EIA-592) presently defined as a FAX modem and the like. Then, the modem 5 performs a data compression coding operation by using an MH (Modified Huffman) method and the like, and further has a block of converting or inversely converting into the data form suited for the wireless sending and receiving operation.

Figure 3:
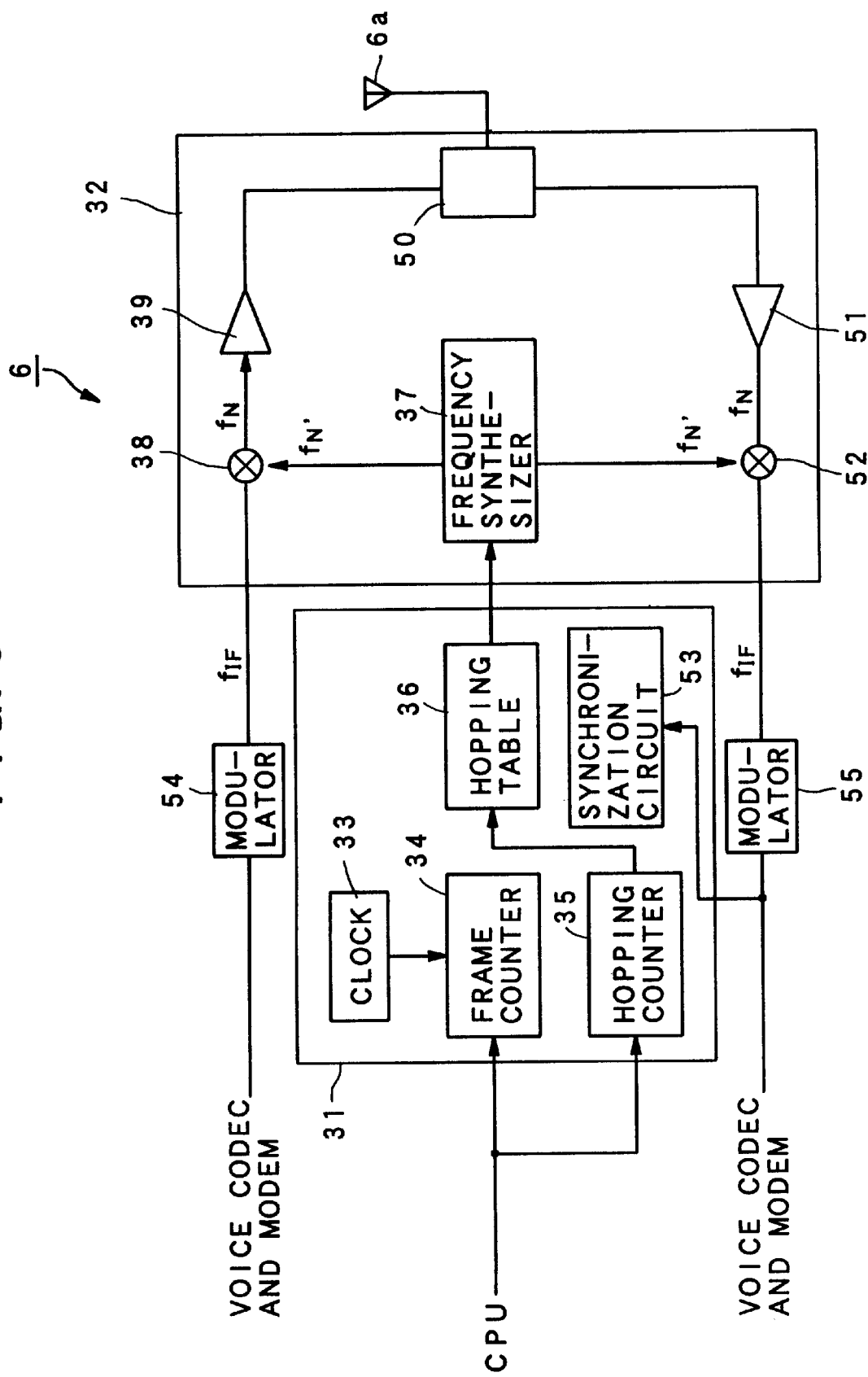
FIG. 3 is a block diagram showing a configuration of sending and receiving devices accommodated by the master terminal and the slave terminal of the communicating apparatus in the first embodiment of the present invention.

FIG. 3 shows the detailed configuration of the sending and receiving device 6. As shown in FIG. 3, the sending and receiving device 6 is provided with a hop frequency data generator 31 for generating the hop frequency data used to switch a frequency in a predetermined hopping pattern, and a communicating section 32 for spreading an input signal to thereby generate a transmission signal and for inverse-spreading a reception signal to thereby generate an output signal by using the hop frequency data given by the hop frequency data generator 31.

The hop frequency data generator 31 is provided with: a frame counter 34 counted up for each input of an output signal from a clock 33; a hopping counter 35 counted up for each input of a hopping start signal from the frame counter 34; and a hopping table 36 for storing a predetermined hop frequency data sequence (hopping pattern). Then, the hop frequency data generator 31 reads out the hop frequency data from the hopping table 36 on the basis of the sequentially varied input value from the hopping counter 35, and then generates the hop frequency data as the output signal. Incidentally, the frame counter 34, the hopping counter 35 and the hopping table 36 may be constructed as the above mentioned separate components. However, they may be replaced with an operation performed by the CPU 10.

The communicating section 32 has a frequency synthesizer 37, an up-converter 38, an amplifier 39, a sharing element 50, an amplifier 51 and a down-converter 52. When the hop frequency data is given by the hop frequency data generator 31, the frequency synthesizer 37 oscillates a signal at an oscillation frequency $f_N'$ based on the hop frequency data. Further, data sent from the voice codecs 3a, 3b and 3c or the modem 5 is modulated by a modulator 54, and thereby, the data is converted a transmission input signal of a frequency $f_{1F}$. Furthermore, the up-converter 38 mixes the signal of frequency $f_N'$ oscillated by the frequency synthesizer 37 and the transmission input signal of frequency $f_{1F}$ modulated by the modulator 54, and generates a transmission signal of frequency $f_N$. The transmission signal of the frequency $f_N$ outputted by the up-converter 38 is amplified by an amplifier 39. Then, the transmission signal is sent through a sharing element 50 from an antenna 6a. On the other hand, a signal with a frequency $f_N$ received by the antenna 6a is inputted through the sharing element 50 to an amplifier 51 and amplified thereby. The down-converter 52 mixes the signal of the frequency $f_N$ and the signal of frequency $f_N'$ supplied from the frequency synthesizer 37, and generates the reception output signal of the frequency $f_{1F}$.

The reception output signal of the frequency $f_{1F}$, after demodulated by a modulator 55, is outputted to the voice codecs 3a, 3b and 3c or the modem 5 shown in FIG. 1A, and also outputted to a synchronization circuit 53 to detect a phase of the hopping frequency from the reception output signal. Therefore, the synchronization signal is outputted from the synchronization circuit 53 to the hopping counter 35. The hopping counter 35 performs the output operation to the hopping table 36 in accordance with the inputted synchronization signal. Therefore, the hop frequency data is read out from the hopping table 36. Then, the hop frequency data is generated as the output signal.

Figure 4:
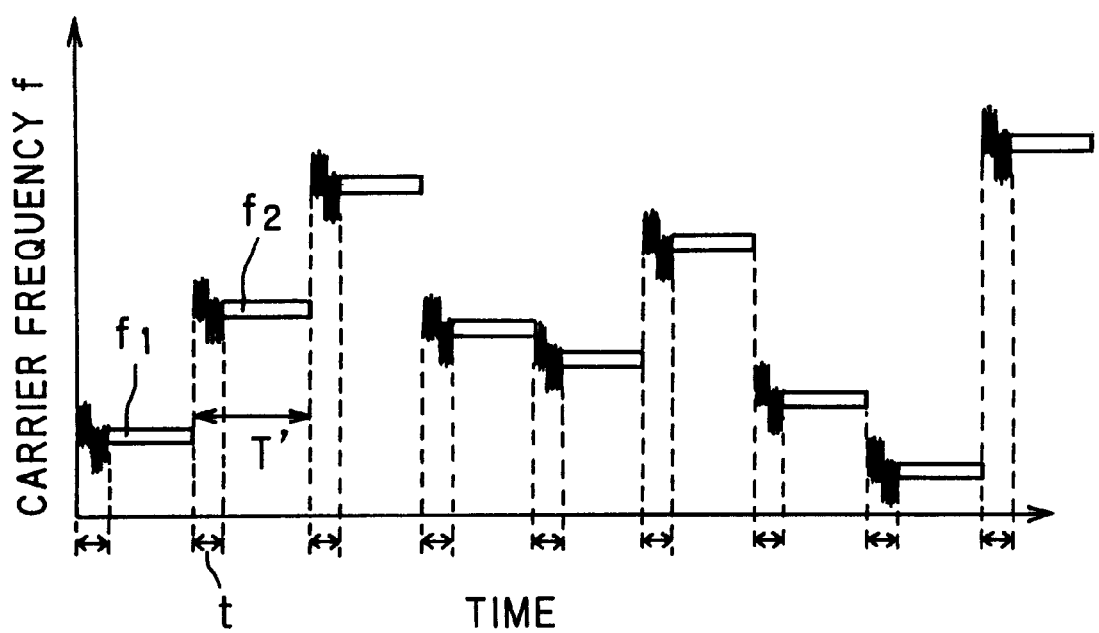
FIG. 4 is a graph showing an example of switching a hop frequency by using the sending and receiving devices in the first embodiment of the present invention.

FIG. 4 shows one example of the switching operation of the hop frequency performed by the sending and receiving device 6 as mentioned above. In the example shown in FIG. 4, the hop frequency (carrier frequency) is switched for each period T.

In this embodiment, the hopping table 36 has a hop frequency data sequence, as shown in FIG. 5. This embodiment uses three different hop frequency data sequences, such as channels 1 to 3, as shown in FIG. 5. Contents of frequency data constituting the respective frequency data sequences are different from each other. Thus, for example, even if the channel 1 is used for the communication between the master terminal and the slave terminal, the channel 2 can be used for the communication between other slave terminals, and the channel 3 can be also used for the communication between still other slave terminals. This enables the simultaneous communications between a plurality of devices due to a plurality of channel systems.

Next, the image reading block 7 has the image reading means such as the scanner and the like. The image data read by the image reading means is once stored in a buffer 7a, and printed out by the image output block 8 under the control of the CPU 10, or sent through the modem 5 to the side of the outside line or the slave terminal.

The image output block 8 is the means for printing out the data stored in the buffer 8a. For example, it is composed of the means using a photosensitive drum by means of an electro-photography and the like, the thermally transcribing means using a thermal head, the means having an ink jet head or the like. The data stored in the buffer 8a includes the facsimile data received through the outside line, or the image data sent by the slave terminals 40A to 40D, and further the image data read by the image reading block 7.

The handset 9 has a microphone, a speaker and the like which are not shown. Hence, this enables the outside line call from the master terminal 1 itself, or the extension line call to the slave terminals 20A to 20D.

The CPU 10 performs the communication control for the private and outside lines in accordance with the communication request from the outside line or the slave terminal, a slot allocation control within one frame which is one unit of a communication, a management of a communication control cable, a determination of a sent and received data type and the like. They are described later in detail.

In addition to the program for actuating the CPU 10, a hardware allocation table which is a base of a communication control table provision and the like are recorded on the ROM 11. The table is described later.

The data used for the operation process in actuating the CPU 10 and the like are tentatively stored in the RAM 12, and further the communication control cable is stored therein. The table is described later.

The master terminal 1 has the above mentioned configurations with regard to the respective means and devices. Next, the configurations of the voice slave terminals 20A to 20D are explained.

Each of the voice slave terminals 20A to 20D is a cordless telephone. Then, as shown in FIG. 1B, each voice slave terminal is provided with: a microphone 21A for inputting a voice; a speaker 22A for outputting a voice; a voice codec 24A for converting analog voice data inputted from the microphone 21A into digital voice data and further converting digital voice data into analog voice data to thereby output to the speak 22A; a sending and receiving device 25A for sending and receiving data through an antenna 26A; and a CPU 27A for controlling them.

The microphone 21A and the speaker 22A are accommodated in a body of the cordless telephone so as to function as a transmitter and a receiver. The voice inputted from the microphone 21A is converted into a voice data signal by the voice codec 24A having the configuration similar to those of the voice codecs 3a, 3b and 3c in the master terminal 1, and converted into a predetermined signal by the sending and receiving device 25A having the configuration similar to that of the sending and receiving device 6 in the master terminal 1 in order to perform the sending and receiving operation according to the frequency hopping method, and then sent from the antenna 26A. On the other hand, as for the predetermined signal received by the antenna 26A, only the voice data signal is extracted by the sending and receiving device 25A, converted into the analog voice signal by the voice codec 24A, and then outputted to the speaker 22A. The CPU 27A performs a slot allocation control, a table management of the slave terminal and the like, similarly to the CPU 10 in the master terminal 1. The detailed explanation is described later. Incidentally, the voice slave terminals 20B to 20D have the configurations similar to that of the voice slave terminals 20A.

Next, the configuration of the data slave terminal 40A is explained. The data slave terminal 40A is a data terminal for treating non-voice data from a personal computer, PDA (Personal Digital Assistants) or the like. As shown in FIG. 1C, the data slave terminal 40A is provided with: a display 41A using a liquid crystal and the like; a CPU 42A for performing various operations or a data process and further a data sending and receiving process; an ROM 43A in which the data or the program for actuating the CPU 42A is stored; an RAM 44A in which the operation process data and the like are tentatively stored when the CPU 42A is actuated; a modem 45A having a data sending and receiving function; and a sending and receiving device 46A for performing a data sending and receiving operation by using the frequency hopping method through an antenna 47A between the data slave terminal 40A and the master terminal 1. Incidentally, an operational section composed of a switch and the like for actuating the data slave terminal 40A is not shown. The data slave terminals 40B to 40D have the configurations similar to that of the data slave terminal 40A.

The sending and receiving device 46A of the data slave terminal 40A has the configuration similar to that of the sending and receiving device 6 in the master terminal 1, and performs the data sending and receiving operation by using the frequency hopping method. The modem 45A has the configuration different from that of the modem 5 in the master terminal 1. This is a block for converting a digital signal into the data form suited for the wireless sending and receiving operation, and a block for performing the inverse conversion thereof. This enables the reading operation of the facsimile data, the image data and the like sent from the outside line through the master terminal 1, or the sending operation through the master terminal 1 of the image data and the facsimile data prepared on the data slave terminal 40A.

As shown in FIG. 2, the communicating apparatus of this embodiment has the single master terminal 1, the four voice slave terminals 20A to 20B servicing as the voice data terminals and the four data slave terminals 40A to 40D servicing as the non-voice data terminals, as mentioned above, and has the functions described below:

(1) the outside line call performed by the master terminal 1 alone by using the handset 9;
(2) the FAX sending and receiving operation performed by the master terminal 1 alone by using the image reading block 7 and the image output block 8;
(3) the extension line call between the master terminal 1 and any one of the voice slave terminals 20A to 20B;
(4) the outside line call performed by the voice slave terminals 20A to 20B through the master terminal 1;
(5) the image output performed by the master terminal 1 by using the image output block 8 with regard to the output data from the data slave terminals 40A to 40D, or the FAX sending operation through the master terminal 1 with regard to the data;
(6) the reading operation performed by the data slave terminals 40A to 40D with regard to the data inputted by the master terminal 1 through the FAX receiving operation or the image reading block 7; and
(7) the outside line communication performed by the data slave terminals 40A to 40D through the master terminal 1.

In short, the master terminal 1 determines, in accordance with a communication request performed by each of the slave terminals or an indicated input from the operational section in the master terminal 1, a type of data to be processed by the request or the input and further selects the means, the device or the line within the master terminal 1 to be used in accordance with the data to thereby carry out the adequately communicating process.

The type of the treated data includes the FAX data and the voice data received through the external analog telephone line, or the data in the personal computer communication line, and the like. All the data are sent and received wirelessly between the master terminal 1 and the respective slave terminals.

In the communicating apparatus of this embodiment, when performing the two-way communication under the frequency hopping method by using TDD (Time Division Duplex), in order to enable to communicate simultaneously between a plurality of slave terminals, one frame servicing as one unit in the sending and receiving operation is divided into a plurality of sending and receiving slots, and then the slots is allocated for each communication pair constituted by the master terminal and the slave terminal.

Further, when performing the two-way communication under the frequency hopping method, in order to enable to perform simultaneously the communication using the voice data and the communication using the non-voice data between the master terminal and the slave terminals, one frame servicing as one unit in the sending and receiving operation is divided into slots to be used for the voice data and slots to be used for the non-voice data, and then the slots is allocated in accordance with a kind of the data.

Further, there are the slots allocated to the voice data and the slots allocated to the non-voice data in one frame. As for the non-voice data, either of the sending operation and the receiving operation is usually performed every one communication. Hence, the slot length of any one of the sending slot and the receiving slot is changed in accordance with the condition of a communication.

Figure 6:
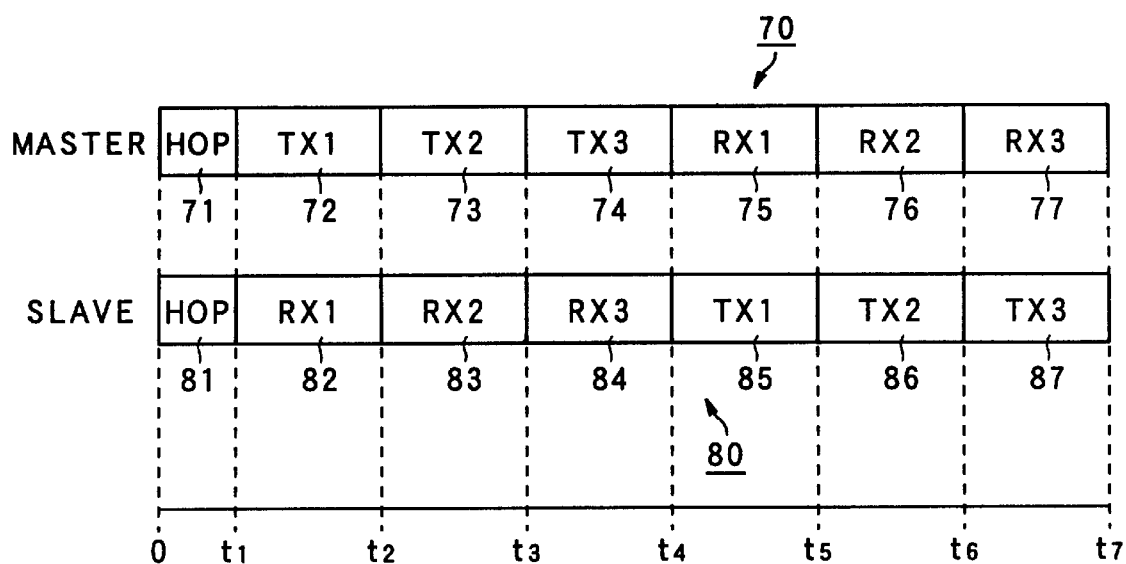
FIG. 6 is a view showing a configuration of a frame used in the communicating apparatus in the first embodiment of the present invention.

The configuration of the frame used in this embodiment is explained with reference to FIGS. 6, 7A, 7B and 7C. As shown in FIG. 6, a frame 70 used in the master terminal 1 has an holding time slot 71, a first sending slot 72, a second sending slot 73, a third sending slot 74, a first receiving slot 75, a second receiving slot 76 and a third receiving slot 77. On the other hand, a frame 80 used in the slave terminals 20A to 20B and 40A to 40D has a first sending slot 82, a second sending slot 83, a third sending slot 84, a first receiving slot 85, a second receiving slot 86 and a third receiving slot 87.

The sending and receiving operation between the master terminal and the plurality of the slave terminal is performed every frame including the aforementioned slots. The slots are managed on the basis of an elapsed time from a start time of sending and receiving operation with respect to each frame. Namely, the master terminal and the slave terminals are synchronized with each other, and therefore, the start time of sending and receiving operation with respect to each frame is the same time between the master terminal and the slave terminals. Thus, the sending and receiving operation between the master terminal and the slave terminals can be performed by time sharing.

Next, the actual example of the sending and receiving operation when using the frame having the above mentioned slots.

In FIG. 6, the sending and receiving operation is started at 0. At first, in the holding slots 70 and 81 during 0 to t1, any data is not sent and received between the master terminal and the slave terminal. The holding time implies a time until the stabilization under a frequency after the hop in the frequency hopping method shown as a term t in FIG. 4. Namely, any data is not sent and received until the completion of the holding time, in order to accurately perform the data sending and receiving operation.

Next, in the first sending slot 72 on the master terminal side and the first receiving slot 82 on the slave terminal side during t1 to t2, data sent by the master terminal is received by a first slave terminal. Hereafter, at a period between t2 and t3 and a period between t3 and t4, data sent by the master terminal is similarly received by a second slave terminal and a third slave terminal, respectively.

And, in the first receiving slot 75 on the master terminal side and the first sending slot 85 on the slave terminal side during t4 to t5, data sent by a first slave terminal is received by the master terminal. Hereafter, at a period between t5 and t6 and a period between t6 and t7, respective data sent by a second slave terminal and a third slave terminal is similarly received by the master terminal.

In this embodiment, the communication is performed by using the frame having a plurality of sending slots and a plurality of receiving slots as mentioned above. Thus, it is possible to perform simultaneously the communications between the master terminal and a plurality of slave terminals. Therefore, the efficiency of the communication can be improved. Further, the frame counter 34 is counted up for each frame, and the frequency is sequentially hopped. Hence, it is possible to realize the effective utilization of the frequency and also possible to make the security higher.

Furthermore, in this embodiment, the communication is performed by using the frame having the slots to be used for the voice data and the slots to be used for the non-voice data as mentioned above. Thus, it is possible to perform simultaneously the voice data communication between the master terminal and the voice slave terminal and the non-voice data communication between the master terminal and the data slave terminal (non-voice slave terminal).

Here, the voice data and the non-voice data are different in characteristics from each other. In case of the voice data, the ability of the real time (ability of processing data immediately and speedy) is required, and thereby, a high speed communication is required. On the other hand, in case of the non-voice data, the ability of the real time is not required, but it is required to perform the communication by a packet.

Figure 7A:
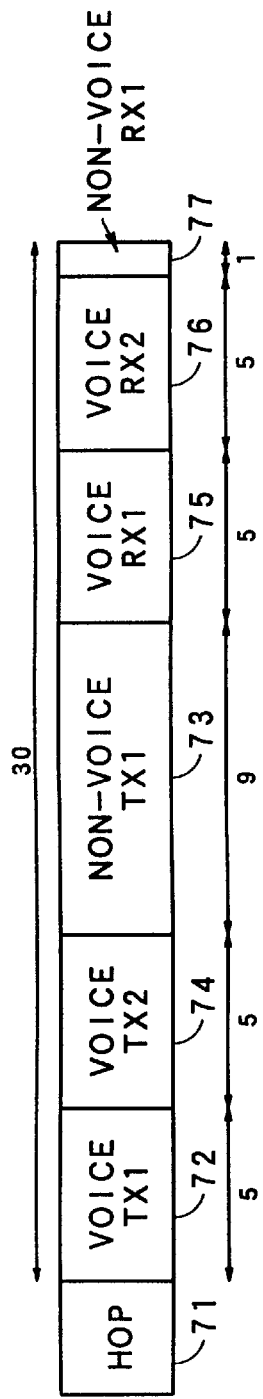
FIGS. 7A, 7B and 7C are configuration views showing a utilization example of the frame used in the communicating apparatus in the first embodiment of the present invention.
Figure 7B:
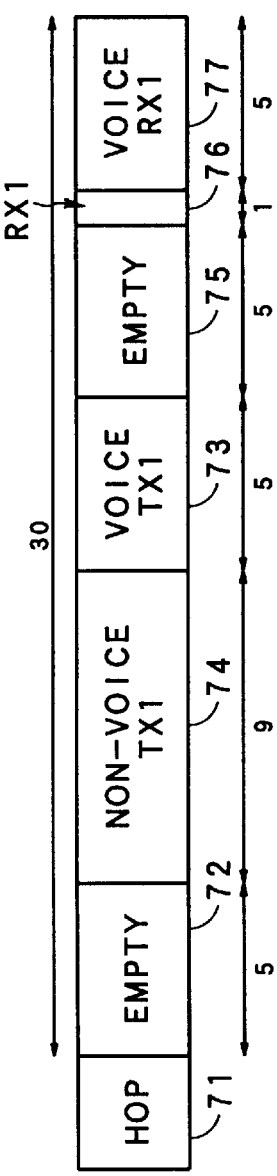

Thus, in the embodiment, as shown in FIGS. 7A and 7B, the slot to be used for the voice data is relatively shot, and the slot to be used for the non-voice data is relatively long. Further, with respect to the voice data, a pair of a sending slot and a receiving slot is always included in one frame. Therefore, the simultaneous two-way communication can be performed. On the other hand, with respect to the non-voice data, a necessity of the simultaneous two-way communication is low. Thus, either one of the sending slot and a receiving slot is included in one frame, and either one of a sending operation and a receiving operation is performed.

Further, in the embodiment, as shown in FIGS. 7A and 7B, the slot of the non-voice data is positioned between the sending and receiving slots of the voice data. Thus, there is an advantage that a switching the sending operation and the receiving operation is not performed continuously.

Moreover, as mentioned above, as for the non-voice data, either of the sending operation and the receiving operation is usually performed at one communication. Therefore, in the case of the non-voice data, the slot length of any one of the sending slot and the receiving slot is changed. An actual example of this slot allocation is explained with reference to FIGS. 7A to 7C.

Figure 7C:
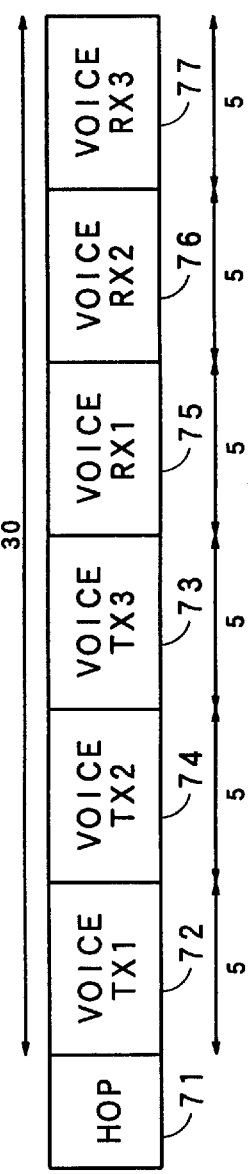

FIGS. 7A to 7C show respective slot lengths in a case of assuming a length of one frame to be 30. In FIG. 7A, the first sending slot 72 and the second sending slot 73 are respectively allocated to the voice data, and the third sending slot 74 is allocated to the non-voice data. The frame having these slots is used, for example, in the case that both the voice slave terminals 20A and 20B perform the external line calls through the master terminal and further the data slave terminal 40A receives the non-voice data from the external line through the master terminal. In this case, as shown in FIG. 7A, both the slot lengths of the sending slot and the receiving slot allocated to the voice data are 5, and the slot lengths of the receiving slot and the sending slot are identical to each other. However, the slot length of the third sending slot allocated to the non-voice data is 9, and the slot length of the third receiving slot 77 corresponding to the third sending slot 74 is 1. Accordingly, it is possible to carry out the communication of the voice data performed by each voice slave terminal without the loss of the ability of the real time and also possible to effectively carry out the communication of the non-voice data.

Next, in an example shown in FIG. 7B, the first sending slot 72 and the first receiving slot 75 corresponding thereto are not respectively allocated to any data, the second sending slot 73 the second receiving slot 76 is allocated to the non-voice data, and the third sending slot 74 and the third receiving slot 77 are respectively allocated to the voice data. If the communications with the master terminal are carried out only between it and two slave terminals such as that example, a pair of slots is kept empty. Accordingly, even if a communication request is performed from the slave terminal or the external line, the request can be accepted.

Next, in an example shown in FIG. 7C, all slots are respectively allocated to the voice data. In a case of this example, three voice slave terminals simultaneously carry out the communications with the master terminal.

Next, the data structure of the above mentioned slot is explained in detail with reference to FIG. 8. In this embodiment, the structure of the slot 90 allocated to the voice data and the structure of the slot 100 allocated to the non-voice data are different from each other.

At first, a slot 90 allocated to the voice data has a preamble 91, a control data 92, a sending side terminal identification ID 93, a receiving side terminal identification ID 94 and a voice data 95 including a correction code. Incidentally, although this embodiment has the configuration of performing the wireless sending and receiving operation without compressing the voice data, it may be compressed depending on the relation with a communication speed. In this case, a compression and expansion are performed by the voice codec. And, the correction code may be not include in the voice data 95.

The preamble 91 insures that all configuration components on the communication line are correctly adjusted such that subsequent data is transmitted without the loss.

The control data 92 has a slot length information and a data identification information.

The slot length information indicate a length of each slot. Information of an interval or a partition between the respective slots, for example, such as values of times t2 to t7 shown in FIG. 6 can be obtained from the slot length information. In this embodiment, the length of the slot allocated to the non-voice data is change with a condition of a communication. In this case, the length of the slot is recognized on the basis of the slot length information included in the control data 92. Thus, on the receiving side, the synchronization can be kept and the data can be correctly received. Incidentally, a time margin to consider a transmission delay is provided between the respective slots.

The data identification information is information to identify whether the data to be sent through this slot is the voice data or the non-voice data or the data for the synchronizing operation or the control data. The data for the synchronizing operation is the data to be sent in a synchronization acquisition described later. This is described in detail when explaining the synchronization acquisition. The control data is the data to indicate the information, such as a communication request, or an admission or a rejection with regard to that request and the like.

The sending side terminal identification ID 93 is an ID number added to each device on the sending side. This information enables the receiving side to recognize the sending side and identify the kind of the transmission data.

The receiving side terminal identification ID 94 is an ID number added to each device on the receiving side. This information enables the receiving side to correctly select only the data sent to the receiving side itself to thereby perform the proper communication.

The voice data 95 is data after coded by the voice codec as mentioned above. An error correction code is added to the data. This correction code implies the data of adding a predetermined redundant bit to the voice data to be sent in accordance with a predetermined error coding method. For example, it may include an error correction coding which uses a BCH (Bose-Chaudhuri-Hocquenghem) code or an RS (Read-Solomon) code.

Next, the configuration of a slot 100 allocated to the non-voice data has a preamble 101, a control data 102, a sending side terminal identification ID 103, a receiving side terminal identification ID 104 and a data 105 to which an error correction code is added.

The control data 102 included in the slot 100 for the non-voice data is different from the control data 92 included in the slot 90 for the voice data. Namely, the control data 102 further has a next sending terminal information. The next sending terminal information is information indicating a terminal sending the non-voice data in the next frame. As mentioned above, either one of the sending operation and the receiving operation is performed in one frame. Thus, in order to determine a direction of the sending data between the devices communicating each other, the next sending terminal information is referred.

It is necessary that the respective devices are synchronous with each other in the communication between the master terminal and the slave terminal and in the communication between the slave terminals. For this end, the synchronous acquisition process as described below is performed in the communicating apparatus of this embodiment. This synchronous acquisition process implies that the sending and receiving operation is performed between the master terminal and the slave terminal at a control frequency existing for a certain period. The master terminal sends to a slave terminal registered on the master terminal the data to confirm that the slave terminal is synchronous with the master terminal.

Figure 9:
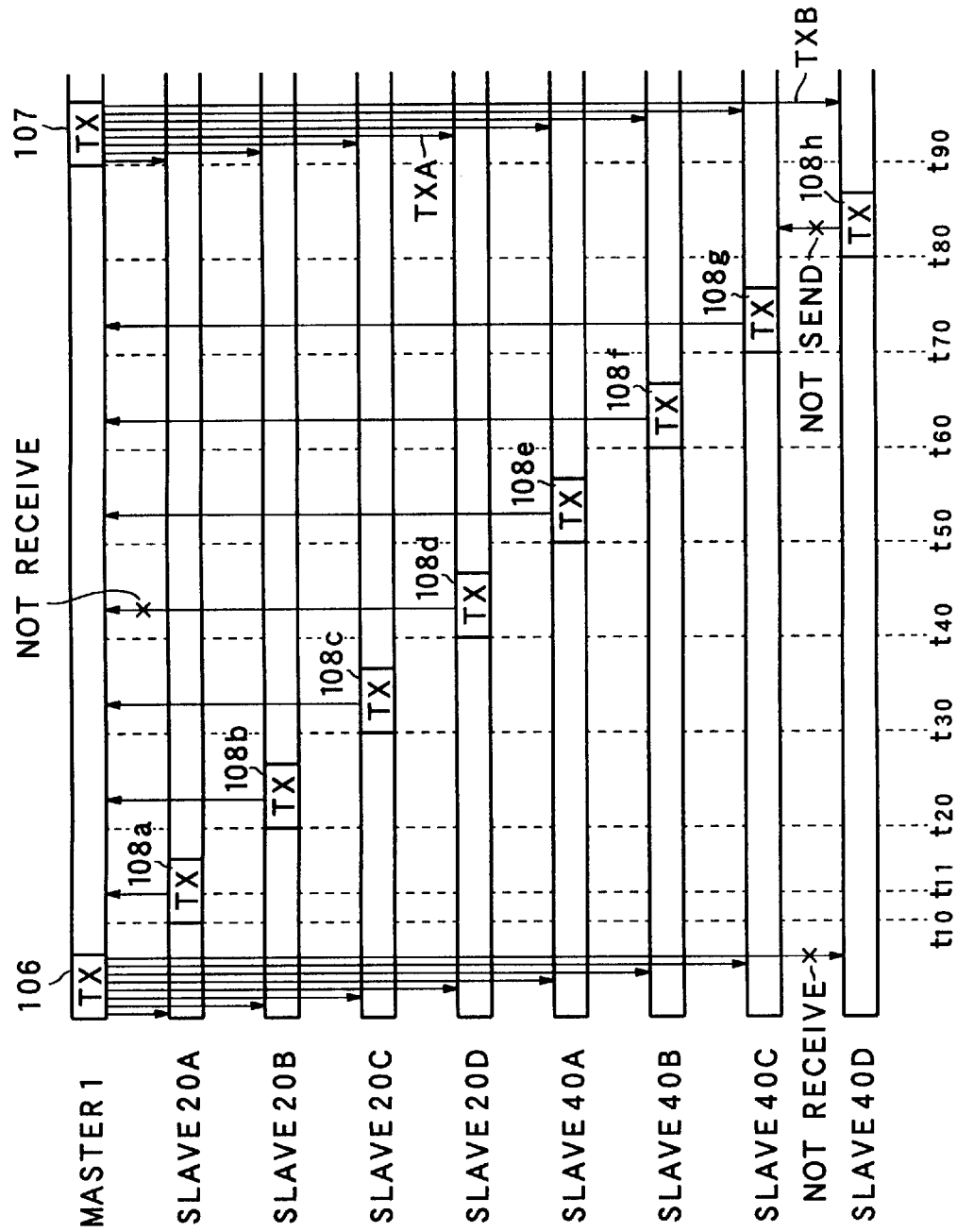
FIG. 9 is a timing chart showing a synchronous acquisition process performed by the communicating apparatus in the first embodiment of the present invention.

FIG. 9 is a timing chart of explaining this synchronous acquisition process. The master terminal 1 sends data for the synchronous acquisition to each slave terminal by using synchronous acquisition sending frames 106 and 107. Then, each slave terminal sends response data to the master terminal 1 by using response frames 108a to 108h which imply the timings specified by the master terminal 1.

A synchronous acquisition slot as shown in FIG. 10 is used within the synchronous acquisition sending frame. As shown in FIG. 10, a synchronous acquisition slot 110 sent to the slave terminal from the master terminal is composed of respective data such as a preamble 111, a control data 112, a sending side terminal identification ID 113, a receiving side terminal identification ID 114 and a synchronous acquisition data 115. The configurations of the preamble 111, the control data 112, the sending side terminal identification ID 113 and the receiving side terminal identification ID 114 are similar to those in the slot for sending and receiving the normal data as shown in FIG. 8.

However, information with regard to a time when performing the synchronizing operation, a next channel and a next slot is sent in the synchronous acquisition data 115. The time when performing the synchronizing operation implies a sending start time based on the synchronous acquisition sending frame. Then, it is each of times of t10, t20, t30, t40, t50, t60, t70 and t80 in FIG. 9.

The next channel implies any of the channels shown in FIG. 5. The next slot implies a sending timing within one frame. For example, in the example of FIG. 9, in the frame 108 in which the sending operation is started from the time t10, the response data from the slave terminal is sent at the time t11. Then, this time t11 corresponds to the next slot.

As mentioned above, the responses from the respective slave terminals are performed through the response frames 108a to 108h as shown in FIG. 9. However, a response slot 120 shown in FIG. 9 is used within the response frame. As shown in FIG. 10, the response slot 120 sent from the slave terminal to the master terminal is composed of respective data such as a preamble 121, a control data 122, a sending side terminal identification ID 123, a receiving side terminal identification ID 124 and a response data 125. The configurations of the preamble 121, the control data 122, the sending side terminal identification ID 123 and the receiving side terminal identification ID 124 are similar to those in the slot for sending and receiving the normal data as shown in FIG. 8.

However, information with regard to a reception level, a communication partner terminal, a request channel, a request slot and a present state is sent in the response data 125.

The reception level implies information whether or not the synchronous acquisition data is correctly received from the master terminal 1. When the master terminal 1 receives the information indicating that the reception level is normal from the slave terminal at a specified channel and timing, the master terminal 1 determines that it is synchronous with the slave terminal.

The communication partner terminal is used when the slave terminal sends the communication request to the outside line in addition to the information of the reception level. Thus, the communication partner level is not always sent. For example, this is the information indicating the outside line, the master terminal, the other slave terminals and the like.

The request channel and the request slot are used only when the slave terminal sends the communication request. However, the allocations of the channel and the slot with regard to the communication request from the slave terminal are usually performed by the master terminal 1, as described later. Hence, the allocations are not used in this embodiment.

The present state implies the present communication state of the slave terminal, and may include a state of a waiting state, a state of a communication between slave terminals and a state of a communication between a master terminal and a slave terminal.

Next, an actual example of the synchronous acquisition process using the above mentioned frame and slot is explained.

At first, the master terminal 1 sends the synchronous acquisition data to all of the voice slave terminals 20A to 20D and the data slave terminals 40A to 40D, in the synchronous acquisition frame 106. This sending operation may be performed as described below. That is, the receiving side ID 114 in the synchronous acquisition slot 110 shown in FIG. 10 is further divided into a plurality of elements, and then the IDs in the respective slave terminals are continuously sent, and furthermore the synchronous acquisition data 115 is also divided into a plurality of elements, and then the synchronous acquisition data to the respective slave terminals is continuously sent. Or, the receiving side ID 114 and the synchronous acquisition data 115 may be constructed as a pair, and this pair may be repeatedly constructed for each slave terminal to thereby send.

The slave terminal side receiving the data sent by the master terminal 1 by the above mentioned manner sends information whether or not the reception level through the response slot 120 is correct, at a time specified by the master terminal 1. Further, when the slave terminal side requires a communication request to the master terminal side, the slave terminal side sends the communication request when responding thereto. If there is no communication request, the slave terminal side sends only the present state.

Then, the master terminal, when receiving the data through the above mentioned slot 120 from the slave terminal, determines that the master terminal is synchronous with the slave terminal if the reception level is correct, and determines that it is not synchronous if the reception level is not correct. Then, a communication control table described later is re-written.

A communicating process described later is applied to a synchronous slave terminal, if the slave terminal sends a communication request. After that, the master terminal performs a response to the slave terminal through a communicating process slot 130 shown in FIG. 10. This communicating process slot 130 includes a preamble 131, a control data 132, a sending side terminal identification ID 133, a receiving side terminal identification ID 134 and a communicating process data 135. The control data 132, the sending side terminal identification ID 133 and the receiving side terminal identification ID 134 are similar to those mentioned above.

However, the communicating process data 135 includes information with regard to an admission or a rejection of the communication request from the slave terminal, and information with regard to the next channel and the next slot.

This communicating process slot 130 enables the communicating process data to be sent to each slave terminal, in the sending frame 107 shown in FIG. 9. Accordingly, the communication between the slave terminal and the other devices is controlled.

However, when the transmission data from the master terminal 1 is interfered with as in the case of the slave terminal 40D shown in FIG. 9 or when the transmission data from the slave terminal is interfered with as in the case of the slave terminal 20D, the master terminal 1 repeats the sending operation to the slave terminal 20D and the slave terminal 40D through the synchronous acquisition slot 110 shown in FIG. 10, in the second sending frame 107.

In contrast with this, the slave terminals 20D and 40D which do not receive the signal sent by the master terminal 1 do not output any transmission signal to the master terminal 1, and then monitor a control signal outputted by the master terminal 1. Thus, when the interference condition is solved, the communication becomes possible in the slave terminals 20D and 40D.

Next, an allocating process of the respective lines to the voice codecs 3a, 3b and 3c or the modem 5, or an allocating process to each slot of the communication frame for the voice data or the non-voice data is explained when a communication request is required by each slave terminal in the above mentioned synchronous acquisition, or when a communication request is required from the outside line, or when a communication request is required through a handset of the master terminal itself.

In this embodiment, the voice codecs 3a, 3b and 3c and the modem 5 can not be connected to two lines, simultaneously. Moreover, the number of the slot pairs in the communication frame is 3. Thus, the above mentioned various allocating processes are performed in accordance with the present communication condition and the type of the data to be sent or received.

Actually, the CPU 10 of the master terminal 1 manages the communication condition, the connection state of each hardware and the allocation of the slot, by using a table generated on the RAM 12 as shown in FIGS. 11A and 11B.

The RAM 12 has a table area, in addition to a FAX data store area, a data store area and a voice memory store area. The table is stored in this table area.

FIG. 11A is an outside line management table indicating a connection state of the outside line. This is divided into an area 140 indicative of types of the outside lines and an area 141 indicative of connection states to the outside lines. An outside line ①, an outside line ②, an outside line ③, an outside line ④ and an outside line ⑤ are allocated to the area 140 indicative the types of the outside lines. The connection states of the respective outside lines are stored in the area 141 indicative of the connection states to the outside lines. Hence, it is possible to refer to this outside line management table to thereby know which hardware is connected to each outside line. In the state shown in FIG. 11A, the outside line ① is IDLE, namely, in a waiting state, and is not used. The outside line ② is connected to the voice codec 3a, the outside line ③ is connected to the modem 5, the outside line ④ is IDLE, namely, in a waiting state, and the outside line ⑤ is connected to the voice codec 3c.

Next, FIG. 11B is a hardware management table indicating a connection states between hardwares of the master terminal and data input/output terminals. This is divided into an area 142 indicative of types of the hardwares of the master terminal and an area 143 indicative of the connection states of hardwares. The voice codecs 3a, 3b and 3c and the modem 5 are allocated to the area 142 indicative of the types of the hardwares. The connections states of the respective hardwares are stored in the area 143 indicative of the connection states within the master terminal. Hence, it is possible to refer to this hardware management table to thereby know a data input/output terminal to which each hardware is connected. In the state shown in FIG. 11B, the voice codec 3a is connected to the slave terminal 20A. The voice codec 3b is IDLE, namely, in a waiting state. The voice codec 3c is connected to the slave terminal 20D. The modem 5 is connected to the image output block 8 and the slave terminal 40C.

Therefore, by referring to the outside line management table and the hardware management table as mentioned above, it can be understood that the slave terminal 20A is being used for the outside line call by the outside line ② through the voice codec 3a, the slave terminal 20D is being used for the outside line call by the outside line ⑤ through the voice codec 3c, and further the FAX data received from the outside line ③ is outputted through the modem 5 to the image output block 8 within the master terminal and also sent to the slave terminal 40C.

Next, FIG. 11C is a communication control table to manage the communication states of the master terminal and the slave terminals, the slot allocation, the utilization channel and the synchronous acquisition state. The table has an area 144 indicative of the master terminal and the slave terminals, an area 145 indicative of the communication partner terminals, an area 146 indicative of the allocation situations of the slots, an area 147 indicative of utilization frequency channels and an area 148 indicative of information about the synchronous acquisitions.

The master terminal 1, the voice slave terminals 20A to 20D and the data slave terminals 40A to 40D are allocated to the area 144 indicative of the master terminal and the slave terminals. The area 145 indicative of the communication partner terminals, the area 146 indicative of the allocation situations of the slots, the area 147 indicative of the utilization frequency channels and the area 148 indicative of the information about the synchronous acquisitions are separated so as to correspond to the respective voice slave terminals 20A to 20D and the data slave terminals 40A to 40D are allocated to the area 144.

In the area 145 indicative of the communication partner terminal, information of the communication partner terminals, such as the master terminal 1, the voice slave terminals 20A to 20D and the data slave terminals 40A to 40D, is stored. Further, when the communication is not performed, information indicative of IDLE is stored. In a case of the outside line call, the information indicative of the outside line call is also added. The information is re-written on the basis of the sending side terminal identification ID or the receiving side terminal identification ID within the slot for the above mentioned voice data or non-voice data. In the state shown in FIG. 11C, the master terminal 1 communicates with the voice slave terminal 20A for the outside line call of the voice slave terminal 20A, and communicates with the data slave terminal 40C for the outside line call of the data slave terminal 40C and for the output of the master terminal, and further communicates with the voice slave terminal 20D for the outside line call of the voice slave terminal 20D. Moreover, the voice slave terminal 20A communicates with the master terminal 1, the voice slave terminal 20B communicates with the voice slave terminal 20C, and the voice slave terminal 20C communicates with the voice slave terminal 20B, respectively. The voice slave terminal 20D communicates with the master terminal 1. Furthermore, the data slave terminal 40A communicates with the data slave terminal 40B, and the data slave terminal 40B communicates with the data slave terminal 40A, respectively. The data slave terminal 40C communicates with the master terminal 1, and the data slave terminal 40D is in the waiting state.

In the area 146 indicative of the allocation condition of the slots, information of types of data allocated to the first sending slot and the first receiving slot, the second sending slot and the second receiving slot and the third sending slot and the third receiving slot, respectively, is stored. Further, the information indicating that the allocated slot is a single slot is also stored in the area 146. The information stored in the area 146 indicates the utilization of slots in each communication between the devices specified by the area 144 and 145. In FIG. 11C, [voice 1] implies that [voice] is the voice data and [1] is the first sending and receiving slots. That is, from this information, it is understood that the first sending slot and the first receiving slot are respectively allocated to the voice data. This slot information is referred when the communication request is required by the outside line, the slave terminal or the master terminal, and it is used to determine whether or not the slot is being used. In the example of FIG. 11C, the first sending slot and the first receiving slot are respectively allocated to the voice data, and these slots are used for the outside line call by the voice slave terminal 20A. Further, the second sending slot and the second receiving slot are respectively allocated to the non-voice data, and these slots are used for the outside line communication by the data slave terminal 40C and the output in the master terminal. Furthermore, the third sending slot and the third receiving slot are respectively allocated to the voice data, and these slots are used for the outside line communication by the voice slave terminal 20D.

A single slot different from the communication slot between the master terminal and the slave terminal is used for the communication between the voice slave terminals 20B and 20C. Moreover, a different single slot is used for the communication between the data slave terminals 40A and 40B.

The area 147 indicative of the utilization frequency channel indicates the channel allocated for the communication between the respective devices. This information is determined and stored when processing a slot allocation described later. It is possible to refer to the content of the area 147 to thereby know the empty state of the channel. In the example of FIG. 11C, it is known that a channel 1 is allocated for the communication between the master terminal 1 and the voice slave terminal 20A for the outside line call of the voice slave terminal 20A, the communication between the data slave terminal 40C and the master terminal 1 and the communication between the voice slave terminal 20D and the master terminal 1, respectively. The reason why the communication is possible through even the same channel is that the types of the slots allocated to the slave terminals 20A, 40C and 20D are different from each other. A channel 2 is allocated for the extension line call between the voice slave terminals 20B and 20C. A channel 3 is allocated to the extension line call between the data slave terminals 40A and 40B.

In the area 148 indicative of the information with regard to the synchronous acquisition, the information indicative of ○ when the correct reception level data can be received at a predetermined timing in the synchronous acquisition and X when it can not be received are stored. It is possible to refer to the content of this area 148 to thereby determine whether or not a communication admission signal can be sent to the slave terminal requiring the communication request.

By referring to the communication control table, it is possible to recognize the communication partner of each of the master terminal and the slave terminals, and slots and channel used for each communication by the master terminal and the slave terminals. Therefore, when a new communication is requested, it is possible to decide the slots and the channel to be allocated for the device which the new communication is requested.

The communicating process including the allocating processes of the slot and the channel in this embodiment are explained with reference to flowcharts in FIGS. 12 to 23.

Figure 12:
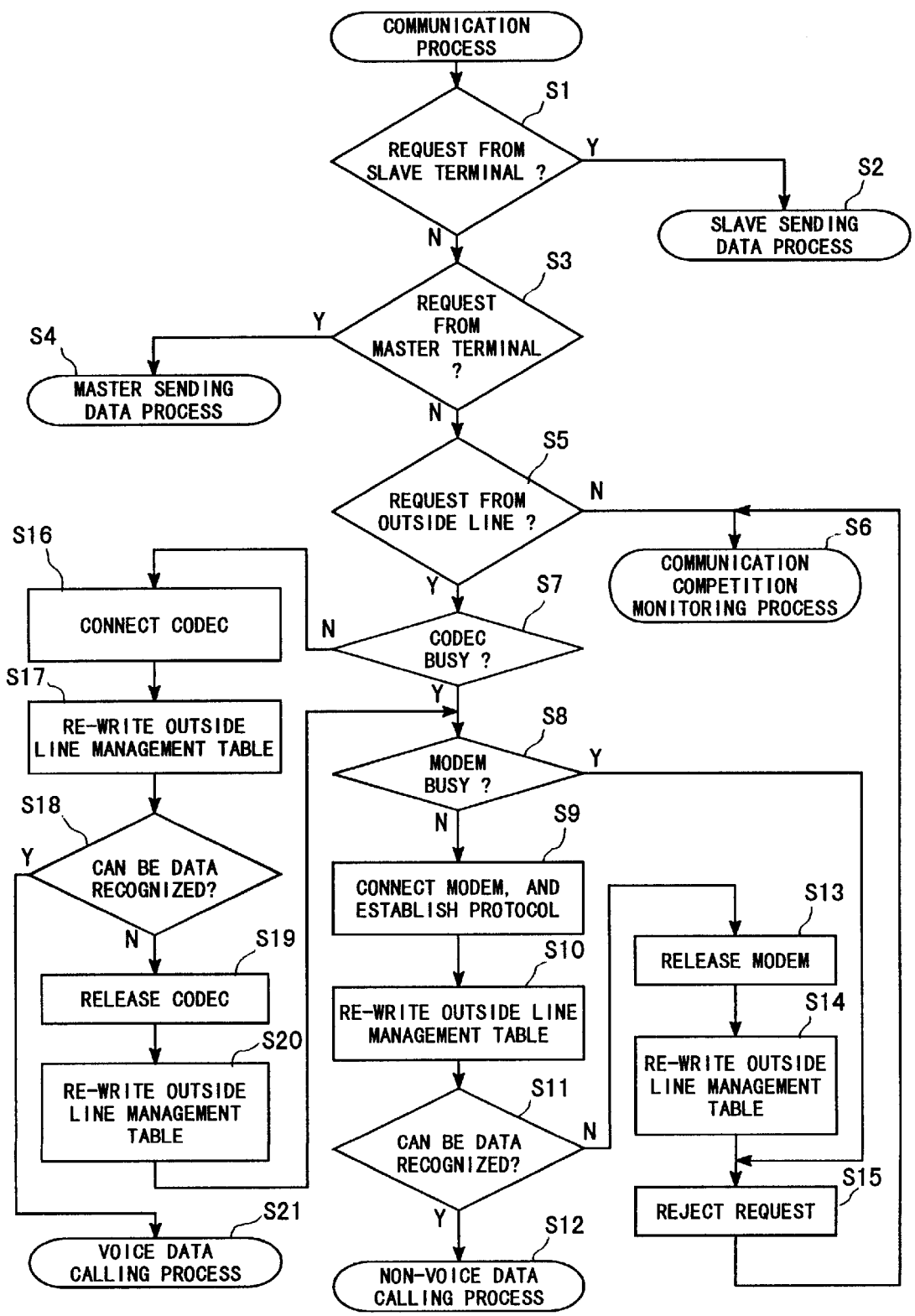
FIG. 12 is a flowchart showing a communicating process in the communicating apparatus in the first embodiment of the present invention.
Figure 15:
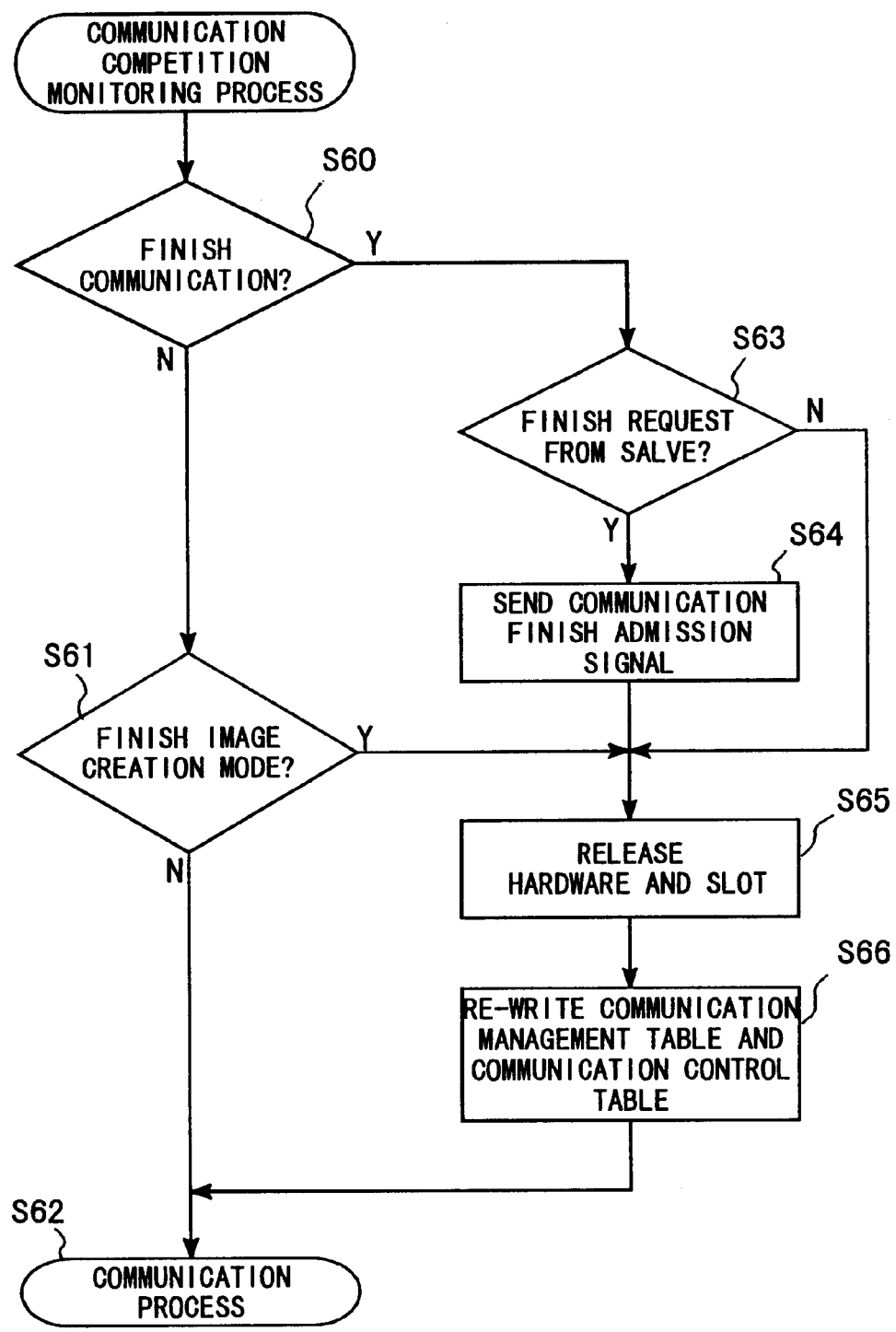
FIG. 15 is a flowchart showing a communication completion monitoring process in the communicating apparatus in the first embodiment of the present invention.

If the communication request is not required by any slave terminals (Step S1=NO), the communication request is not required by the handset of the master terminal and the like (Step S3=NO) and further the communication request is not required from the outside line (Step S5=NO), the operational flow proceeds to a communication completion monitoring process (Step S6). This communication completion monitoring process is shown in FIG. 15. If the communication is not presently performed and further an operation performed by the master terminal alone is not performed (Step S60=NO and Step S61=NO), the operational flow again proceeds to the communicating process (Step S62). Then, a presence or absence determining process with regard to the communication request from each device as shown in FIG. 12 is performed (Steps S1, S3 and S5), and the operational flow becomes in the waiting state.

Now, the case in which the communication request is required from the outside line (Step S1=NO, Step S3=NO and Step S5=YES) is explained. In this case, in order to determine whether the data sent from the outside line is the non-voice data, such as the FAX data and the like, or the voice data, the CPU 10 connects the outside line to any one of the voice codecs 3a, 3b, 3c and the modem 5 in order to receive the data sent from the outside line.

Then, it is determined by the hardware management table whether or not any of the voice codecs 3a, 3b and 3c is being used (Step S7). As a result, if all the voice codecs are being used (Step S7=YES), it is similarly determined by the hardware management table whether or not the modem 5 is being used (Step S8). As a result, if the modem 5 is being used (Step S8=YES), the data sent from the outside line can not be received. Hence, a signal of rejecting the communication request is sent to the outside line (Step S15). Then, the operational flow proceeds to the communication completion monitoring process (Step S6).

Figure 13:
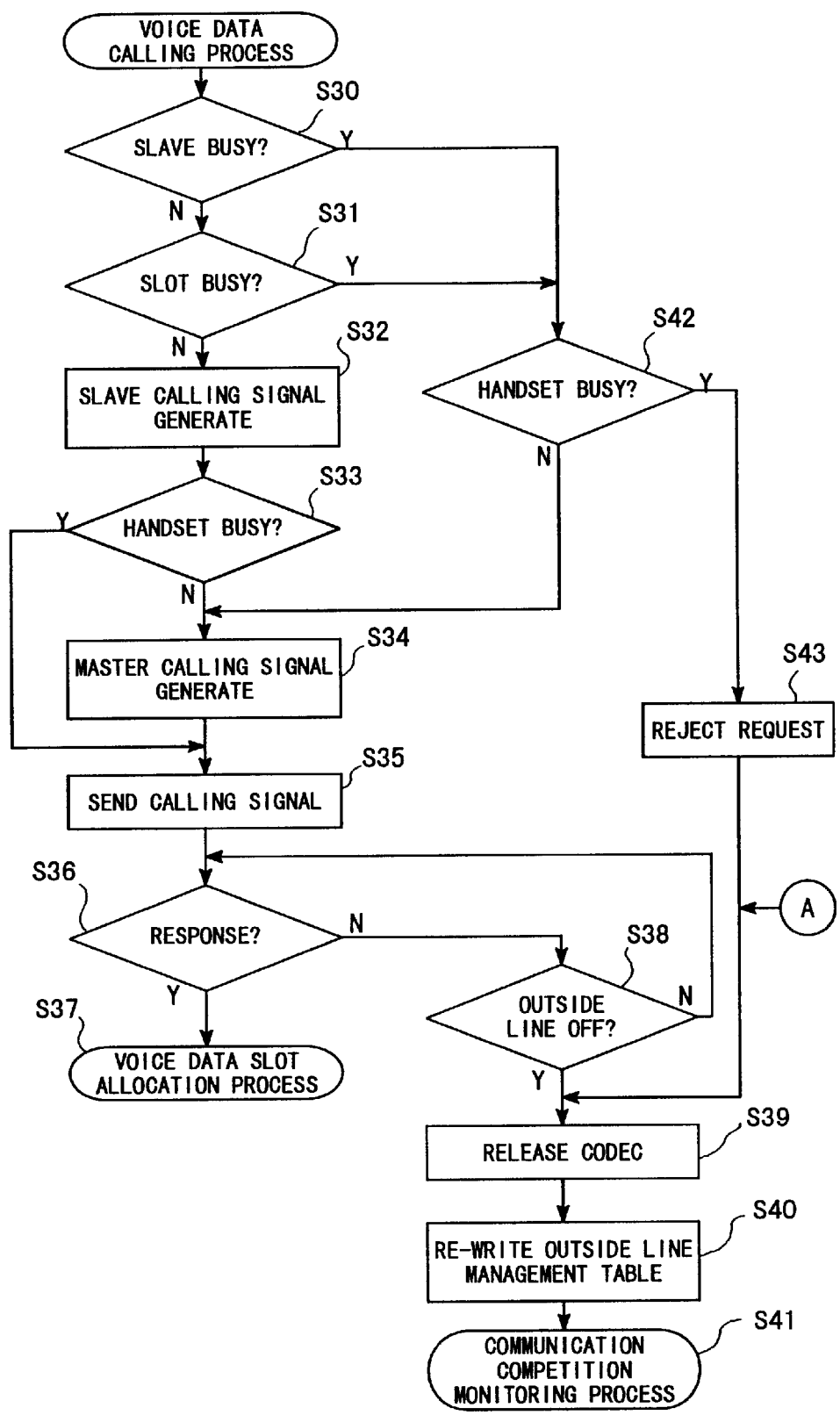
FIG. 13 is a flowchart showing a voice data calling process in the communicating apparatus in the first embodiment of the present invention.

However, if any one of the voice codecs is usable (Step S7=NO), the usable voice codec is connected to the outside line (Step S16), and the content of the outside line management table is re-written (Step S17). Namely, the information corresponding to the usable voice codec is stored in the area corresponding to the outside line through which the communication request is required, among the areas 141 of the outside line management table. Then, the data sent from the outside line is received to the CPU 10 through the usable voice codec, and the received data is analyzed. Then, it is determined whether or not this data can be recognized as the voice data (Step S18). As a result, if this data can be recognized as the voice data (Step S18=YES), the operational flow proceeds to a voice data calling process (Step S21). This voice data calling process is shown in FIG. 13, and described later in detail.

On the other hand, if it can not be recognized as the voice data (Step S18=NO), the voice codec connected to the outside line is released (Step S19), and the previously re-written area of the outside line management table is re-written and changed into IDLE (Step S20). Here, there is the possibility that the data sent from the outside line may be the FAX data or another non-voice data even when it is not the voice data. Then, it is determined whether or not the modem 5 is being used (Step S8). Incidentally, the operational flow also proceeds to this determining process even if all the voice codecs are being used (Step S7=YES), as mentioned above. Then, if the modem 5 is usable (Step S8=NO), the modem 5 is connected to the outside line, and a protocol is established (Step S9). And, the content of the outside line management table is re-written (Step S10), similarly to the case of the voice codec. Next, the data sent from the outside line is received by the modem 5, and the received data is analyzed. Then, it is determined whether or not the received data can be recognized as one of the FAX data and other non-voice data (Step S11). As a result, if the received data cannot be recognized as the FAX data or other non-voice data (Step S11=NO), the modem 5 is released (Step S13), and the previously re-written content of the outside line management table is re-written and changed into IDLE (Step S14). A request rejection signal is sent to the outside line (Step S15), and the operational flow proceeds to the communication completion monitoring process (Step S6).

Figure 16:
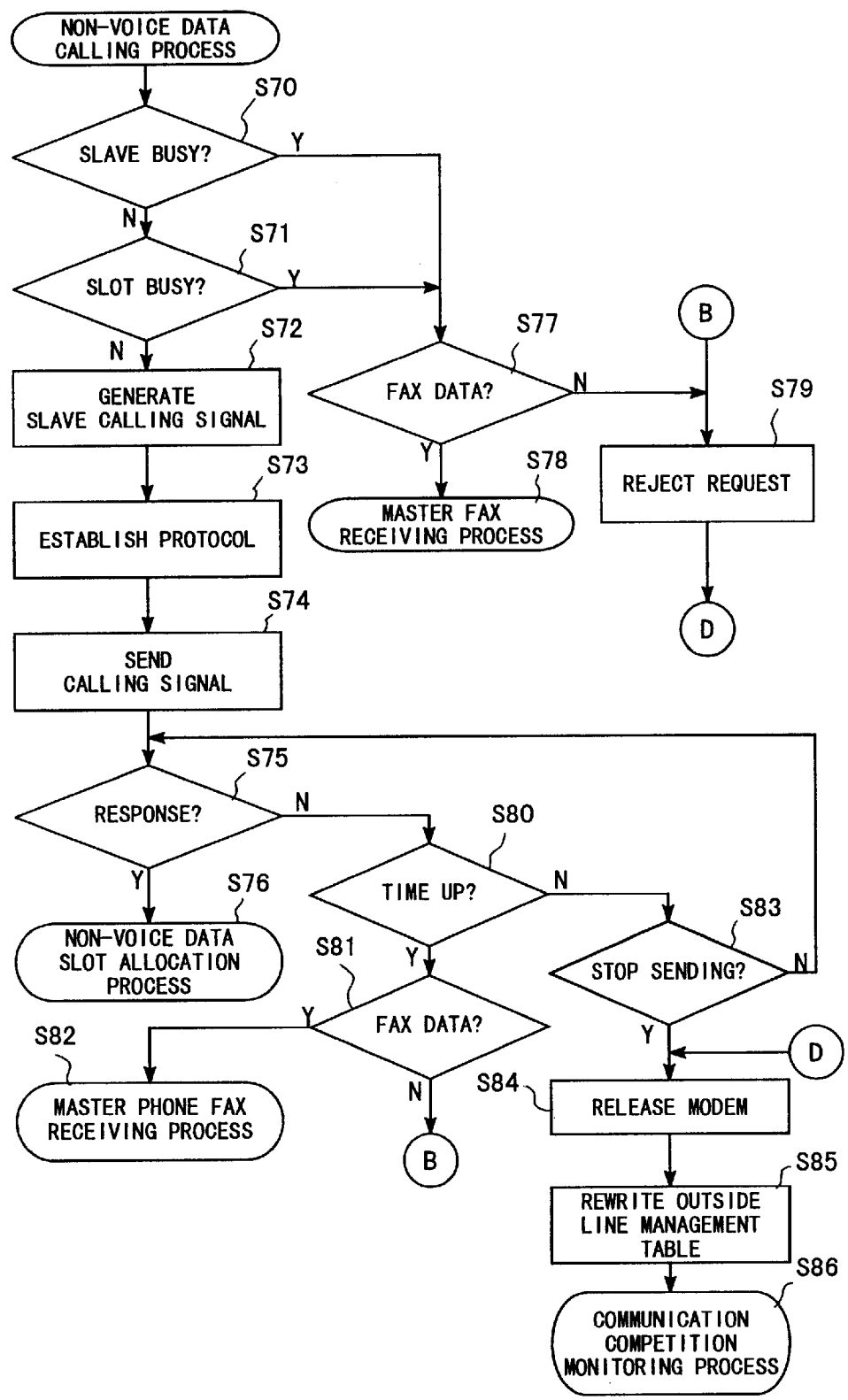
FIG. 16 is a flowchart showing a non-voice data calling process in the communicating apparatus in the first embodiment of the present invention.

However, if it can be recognized as the FAX data or another communication data (Step S11=YES), the operational flow proceeds to a non-voice data calling process (Step S12). This non-voice data calling process is shown in FIG. 16, and described later in detail.

Next, the voice data calling process executed when the data sent from the outside line is recognized as the voice data (Step 21) and is explained with reference to FIG. 13.

At first, in order to call the slave terminal, it is determined on the basis of the communication control table whether or not all the slave terminals are being used (Step S30). If all the slave terminals are being used (Step S30=YES), it is determined on the basis of a hook signal within the master terminal 1 and the like whether or not the handset 9 of the master terminal 1 is being also used (Step S42). Then, if the handset 9 is being also used (Step S42=YES), a signal of rejecting the communication request is sent to the outside line (Step S43). The voice codec previously connected to the outside line is released (Step S39). The corresponding portion of the outside line management table is re-written and changed into IDLE (Step S40). Then, the operational flow proceeds to the communication completion monitoring process (Step S41).

On the other hand, if any one of the slave terminals is usable (Step S30=NO), it is determined whether or not the slot is usable (Step S31). Namely, it is checked whether or not the voice data sent from the outside line can be wirelessly sent to any one of the slave terminal by using any one of the slots in order to perform the outside line call by the slave terminal. Then, it is determined on the basis of the area 146 in the communication control table whether or not all the slots are being used. If all the slots are being used (Step S31=YES), it is determined whether or not the handset 9 is being used as mentioned above (Step S42). Then, the process similar to the above mentioned cases is performed.

However, if the slot is usable (Step S31=NO), a slave terminal call signal to be used for calling up a slave terminal is generated (Step 32). At this time, in order to call up the handset 9 simultaneously, it is determined whether or not the handset 9 is being used (Step S33). If the handset 9 can be used (Step S33=NO), a master terminal call signal to be used for calling up the master terminal is generated (Step S34). This process of generating the master terminal call signal is also performed if it is determined that the handset 9 is usable (Step S42=NO), when all the slave terminals can not be used or when the slot is being used.

The call signal generated as mentioned above is sent to the slave terminal and/or the master terminal (Step S35), and the operational flow waits for the response from each device (Step S36). If no response from any device (Step S36=NO), the operational flow waits until the communication request from the outside line side is canceled (Step S38). If the communication request from the outside line side is canceled (Step S38=YES), the voice codec previously connected to the outside line is released (Step S39), and the corresponding portion of the outside line management table is re-written and changed into IDLE (Step S40). Then, the operational flow proceeds to the communication completion monitoring process (Step S41).

Figure 14:
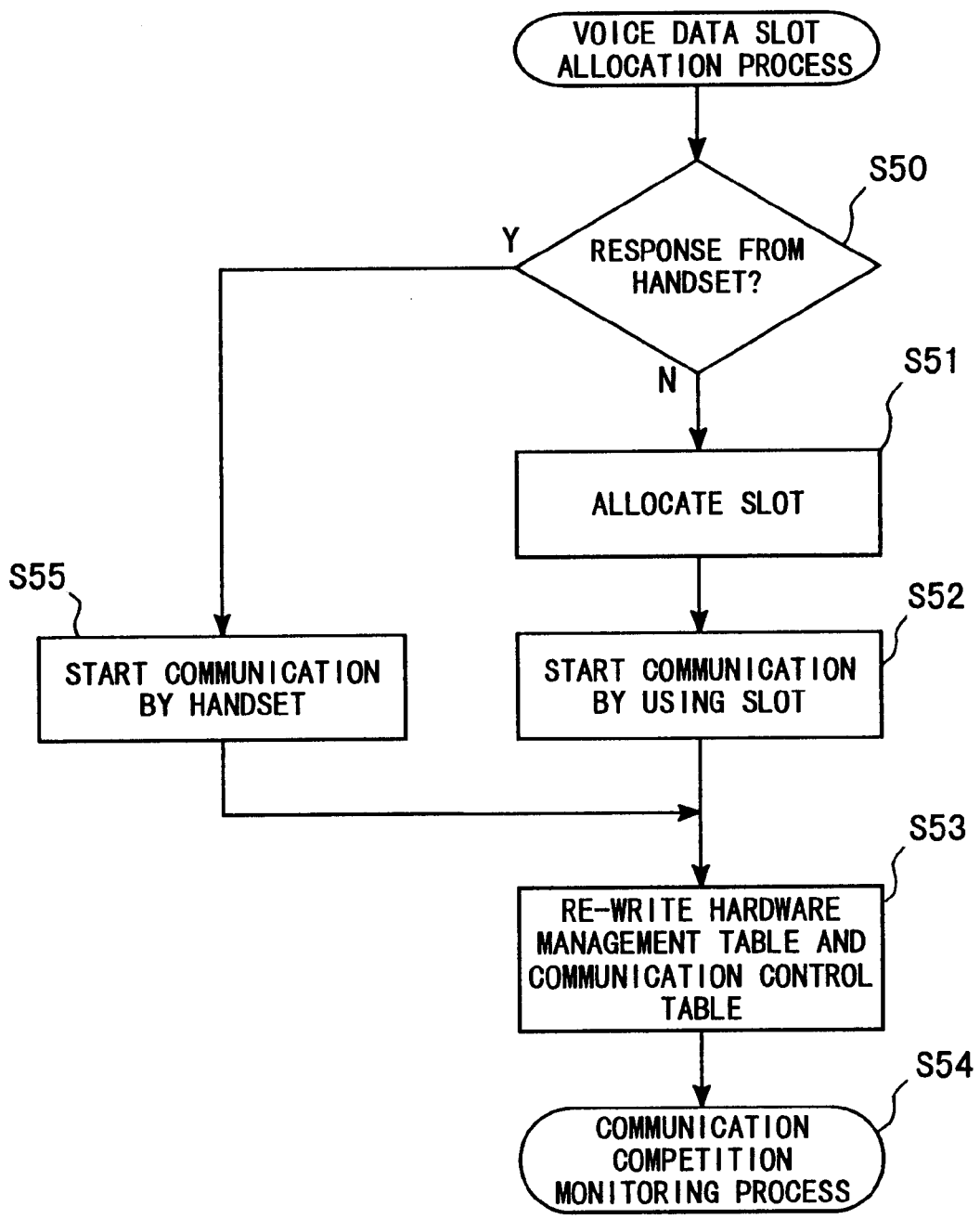
FIG. 14 is a flowchart showing a voice data slot allocating process in the communicating apparatus in the first embodiment of the present invention.

However, if there is the response (Step S36=YES), the operational flow proceeds to a voice data slot allocating process (Step S37). This process is shown in FIG. 14. It is firstly determined whether or not the responding device is the handset 9 (Step S50). If the response from the handset 9 (Step S50=YES), the outside line call through the handset 9 is started without connecting the slave terminal to the outside line (Step S55). On the other hand, if the response from the slave terminal and not from the handset 9 (Step S50=NO), the slot is allocated for the wireless communication between the slave terminal and the master terminal (Step S51). After selecting one channel from the empty channels and determining the sending ID and the receiving ID within the slot, the information with regard to the channel and the slot determined in the above mentioned synchronous acquisition is sent to the slave terminal of the communication partner. Then, the communication between the master terminal and the slave terminal is started (Step S52).

Next, the hardware management table and the communication control table are re-written (Step S53). For example, in a case of the outside line call through the handset 9, the information indicating that the connected device is the handset 9 is stored in the area 143 corresponding to any of the voice codecs 3a, 3b and 3c. However, since the slot is not used in this case, the content of the communication control table is not re-written.

On the other hand, in a case of the outside line call through the slave terminal, the information indicating that the connected device is the slave terminal is stored in the area 143 corresponding to any of the voice codecs 3a, 3b and 3c, similarly to the case of the handset 9. As for the communication control table, the information indicative of [slave terminal 20A (outside line)] is stored in the area 145 indicative of the communication partner terminal of the master terminal 1, and the information indicative of the voice data is stored in the area 146 indicative of the slot. Moreover, [1] implying an empty channel at that time is stored in the area 147 indicative of the channel. Then, the communication between the outside line and the handset 9 or the slave terminal is performed.

In a case of the outside line call through the slave terminal, the voice data coded by the voice codec connected to the outside line is outputted to the sending and receiving device 6 at the timing that the sending slot corresponding to this voice data managed by the CPU 10, and this voice data wirelessly sent to the slave terminal by the sending and receiving device 6. Then, voice data sent from the slave terminal is wirelessly received by the sending and receiving device 6 of the master terminal 1 at the timing that the receiving slot next to the sending slot in the communication frame is managed by CPU 10. Such a sending and receiving operation of the voice data is performed in one communication frame, and the communication frequency is switched each communication frame. This results in the wireless communication with a high security and a high frequency efficiency. The data which is sent by the master terminal and received by the slave terminal is decoded by the voice-codec of the slave terminal, and recognized as the voice signal by the slave terminal. Moreover, in the slave terminal, the data is coded by the voice codec of the slave terminal and sent to the master terminal. Then, when the data is received by the master terminal, the data is decoded by the voice codec of the master terminal, and sent to the outside line.

The sending and receiving process of the data under communication are parallel executed through an interruption routine and the like, apart from the slot allocating process explained above. When the re-writing of the table is ended (Step 53), the operational flow proceeds to a communication completion monitoring process shown in FIG. 15 (Step S54).

As shown in FIG. 15, if the call finish request is required from the slave terminal (Step S60=YES and Step S63=YES), for example, in the condition of the outside line call performed by the slave terminal, the master terminal sends a communication finish admission signal to the slave terminal (Step S64). The voice codec used for the communication with the slave terminal and the slot are released (Step S65). Processes such as clearing operations of the respective tables and the like are performed (Step S66). Again, the operational flow returns to the waiting state (Step S304=NO and Step S62). Accordingly, the empty slot as shown in FIG. 7B is generated.

If it is determined on the basis of an on-hook signal and the like that the communication finish request is required by the handset 9, the similar table management process is performed. In this case, the operation of sending the communication finish admission signal is not sent to the slave terminal. And then the operational flow again returns to the waiting state. Moreover, the similar process is performed even when the communication finish request is required from the outside line.

Next, the non-voice data calling process executed when the communication request is required from the outside line and the non-voice data is sent from the outside line (Step S12) is explained with reference to FIG. 16.

In this process, as shown in FIG. 16, in order to call the data slave terminals 40A to 40D, it is determined by referring to the communication control table whether or not these slave terminals are usable (Step S70). If usable (Step S70=NO), it is determined by referring to the communication control table whether or not the slot used for the wireless communication between the master terminal and the slave terminal is being used (Step S71). If the slot is usable (Step S71=NO), a call signal to be used for calling up the slave terminal is generated (Step S72), and a protocol is established (Step S73). Actually, after the synchronous acquisition is checked through the control slot as shown in FIG. 10, the present state of the slave terminal is checked to thereby specify the channel and the slot used for the communication with the slave terminal. Next, the call signal is sent to the slave terminal (Step S74). Then, the operational flow waits for a response from the slave terminal (Step S75).

Figure 17:
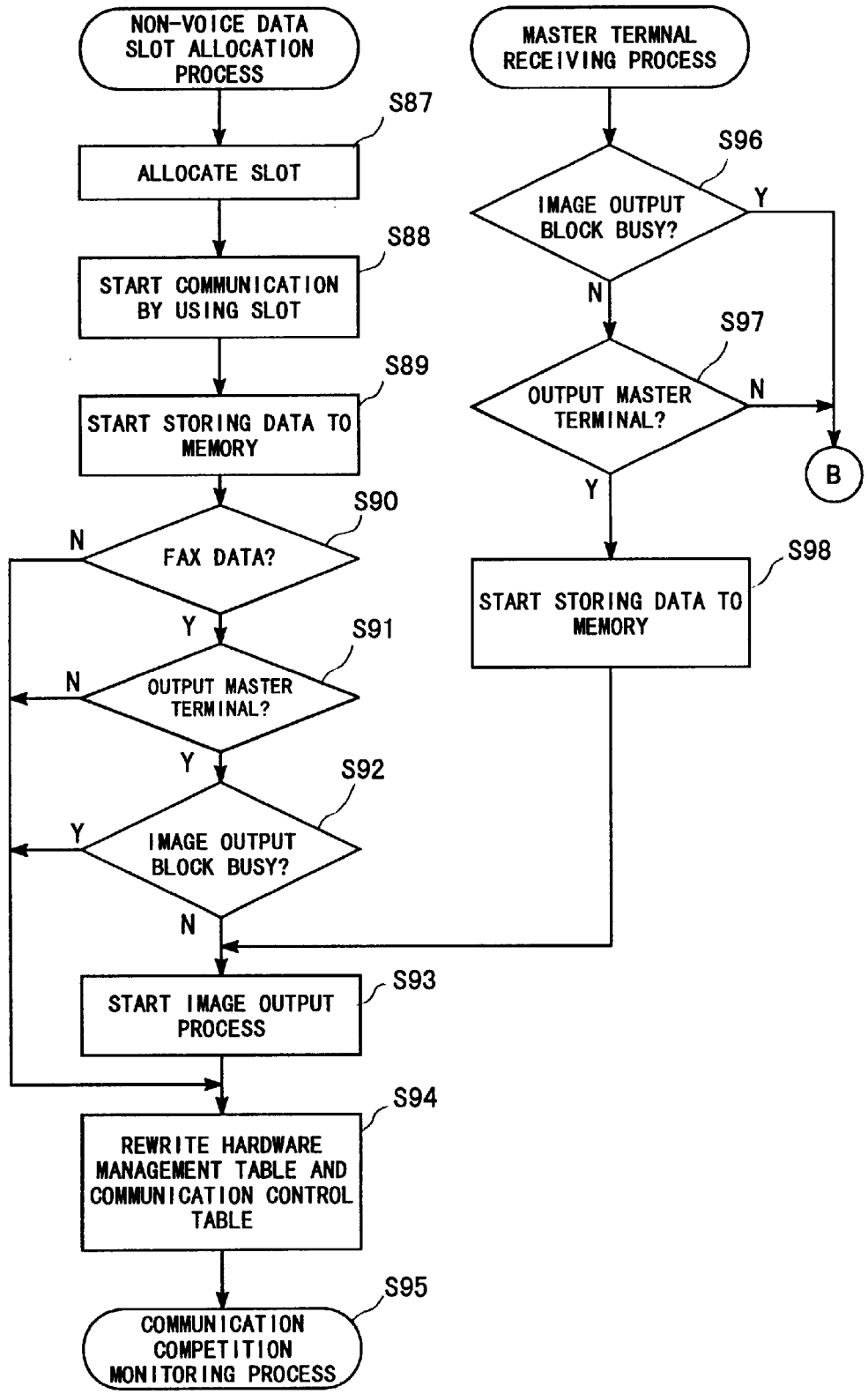
FIG. 17 is a flowchart showing a non-voice data slot allocating process and a master terminal FAX receiving process in the communicating apparatus in the first embodiment of the present invention.

If there is the response from the slave terminal (Step S75=YES), a non-voice data slot allocating process is performed (Step S76). In this process, as shown in FIG. 17, the allocation to the slot of the data received from the outside line is performed (Step S87). Actually, the length of the transmission data in one frame is determined by considering the length of the data received from the outside line and the like, and further the channels used for a sending start timing and the sending operation are determined. Then, the above mentioned information is sent to the slave terminal when carrying out the synchronous acquisition.

At a stage at which the communication with the slave terminal becomes possible as mentioned above, the wireless communication between the master terminal 1 and the slave terminal is started at the timing of the allocated slot (Step S88). Then, the storing process that the data received from the outside line is stored into the memory of the master terminal 1 is started (Step S89).

Accordingly, the data received from the outside line is once stored in the memory by the CPU 10 while maintaining its coded state without the decoding by the modem 5. After that, the stored data is outputted to the sending and receiving device 6 at the timing of the data terminal sending slot by the control of the CPU 10, and wirelessly sent to the slave terminal by the sending and receiving device 6 under the frequency hopping manner. In the slave terminal, the data sent from the outside line is decoded by a modem of the slave terminal and read into the slave terminal.

Next, it is determined whether or not the data sent from the outside line is the FAX data (Step S90). In a case that the data sent from the outside line is the FAX data, the FAX data is send to the slave terminal and the FAX data is also outputted as a FAX image by the master terminal 1.

The determination about the FAX data is performed by the process of determining the data type, and the determination about the data read in through the modem 5 is performed on the basis of a calling tone. Then, when performing the process of determination the data type, this determination result is stored in the RAM 12 by the CPU 10, which enables the above mentioned determination.

If the data is not the FAX data as the result of the above mentioned determination (Step S90=NO), the area corresponding to the modem 5 in the hardware management table and the respective areas of the master terminal and the slave terminal in the communication control table are re-written (Step S94). Then, the operational flow proceeds to the communication completion monitoring process (Step S95).

As mentioned above, the data received from the outside line is communicated to the slave terminal at a unit of one frame, and the hopping frequency is switched for each frame to thereby perform the wireless communication with the high security and the high frequency efficiency.

On the other hand, if the data sent from the outside line is the FAX data (Step S90=YES), it is determined whether or not the image output is performed by the master terminal 1, in addition to the data sending operation to the slave terminal (Step S91). This image output performed by the master terminal is selected in advance by the operational section of the master terminal 1 and the like. Then, it can be determined by checking an inner flag and the like. If the image output performed by the master terminal is selected (Step S91=YES), it is checked on the basis of an inner signal within the master terminal 1 whether or not the image output block 8 is usable (Step S92). If the image output block 8 is usable (Step S92=NO), the CPU 10 decodes at the modem 5 the data sent from an analog line, stores in the buffer 8a, and then starts the image output through the image output block 8 (Step S93). After that, the hardware management table and the communication control table are re-written as mentioned above (Step S94).

Next, the process is explained if the response from the slave terminal is not obtained at the step S75 shown in FIG. 16 (Step S75=NO). In this case, it is firstly determined whether or not a predetermined time is elapsed after sending a call signal to the slave terminal (Step S80). If the predetermined time is elapsed (Step S80=YES), it is determined whether or not the data sent from the outside line is the FAX data (Step S81). If it is not the FAX data (Step S81=NO), the signal of rejecting the communication request is sent through the outside line (Step S79). The modem 5 is released (Step S84), the outside line management table is re-written (Step S85), and then the operational flow proceeds to the communication completion monitoring process (Step S86). If the data sent from the outside line is the FAX data (Step S81=YES), the operational flow proceeds to a master terminal FAX receiving process (Step S82). This operation is described later in detail.

If the predetermined time is not elapsed (Step S80=NO), it is determined whether or not the sending operation from the outside line is stopped (Step S83). If the sending operation is not stopped (Step S83=NO), a response waiting operation from the slave terminal is continued. If the sending operation is stopped (Step S83=YES), the modem 5 is released (Step S84), the outside line management table is re-written (Step S85), and then the operational flow proceeds to the communication completion monitoring process (Step S86).

Next, the process is explained if all the slave terminals are being used at the step S70 of FIG. 16 (Step S70=YES), or if the slot is already used at the step S71 (Step S71=YES) although any of the slave terminals is being used. In this case, before rejecting the communication request from the outside line, it is determined whether or not the data sent from the outside line is the FAX data (Step S77). This is because the data can be processed by the master terminal alone, even when the data terminal is being used, if the FAX data. The determination whether or not the data sent from the outside line is the FAX data is performed as mentioned above. As a result, if not the FAX data (Step S77=NO), the communication request to the outside line is rejected (Step S79). The modem 5 is released (Step S84), the outside line management table is re-written (Step S85), and then the operational flow proceeds to the communication completion monitoring process (Step S86).

On the other hand, if the FAX data (Step S77=YES), the operational flow proceeds to the master terminal FAX receiving process (Step S78). This process is similarly performed if the response from the slave terminal is not performed within the predetermined time (Step S80=YES), and it is shown in detail in FIG. 17. It is firstly determined on the basis of the signal in the master terminal 1 whether or not the image output block 8 of the master terminal 1 is being used (Step S96). If the image output block 8 is being used (Step S96=YES), the process of rejecting the request (Step S79), the process of releasing the modem 5 (Step S84) and the like are performed as mentioned above. If the image output block 8 is usable (Step S96=NO), it is determined whether or not the image output in the master terminal is selected (Step S97). If the image output in the master terminal is not selected (Step S97=NO), the process of rejecting the request (Step S79) and the like are performed as mentioned above. If selected (Step S97=YES), the process of storing in the memory the data received from the outside line is started (Step S98). Next, while transferring from the memory to the buffer 8a, the image output process performed by the image output block 8 is started (Step S93). The hardware management table and the communication control table are re-written (Step S94). The operational flow proceeds to the communication completion monitoring process (Step S95).

In this way, in this embodiment, if the request of sending the FAX data is required from the outside line, the master terminal alone can perform the FAX receiving operation and the image output even when the slave terminal is not in the receivable condition.

Next, the case is explained if the communication request is required by the master terminal at the step S3 shown in FIG. 12 (Step S3=YES). In this case, the operational flow proceeds to a master terminal sending data process (Step S4). This process is shown in detail FIGS. 18A and 18B.

Now, the case when the communication request is requested by the master terminal implies a case when there is a request from the master terminal of directly performing an outside line communication and a case when there is a extension line communication request from the master terminal to the slave terminal. Moreover, each of the cases has a case through the voice data and a case through the non-voice data.

At first, the case is explained when an outside line communication request through the voice data is required by the master terminal. It is selected on the basis of a button (not shown) mounted in the handset 9 whether a communication partner is the outside line or the extension line. The selection signal from the handset 9 is read in by the CPU 10 to thereby enable the determination. If the communication partner is the outside line as the result of the determination (Step S100=YES), it is determined whether or not the communication request is required from the handset 9 (Step S102). This is performed in order to determine whether the data used in the communication is the voice data or the non-voice data. As a result, if the communication request from the handset 9 (Step S102=YES), it is determined by referring to the hardware management table whether or not the voice codecs 3a, 3b and 3c are usable (Step S111). When all the voice codecs are being used, the voice data from the handset 9 can not be sent to the outside line. Thus, the communication request to the handset 9 is rejected (Step S130). Then, the communication completion monitoring process is performed (Step S131). However, if any voice codec is usable (Step S111=YES), the usable voice codec is connected to the outside line (Step S112). The outside line management table is re-written (Step S113). In short, information corresponding to the usable voice codec is stored in the area 141 corresponding to an empty outside line, in the table. Then, a call signal to the communication partner through the outside line is generated, and further the call signal is sent (Step S114). After that, the operational flow waits for the response from the communication partner (Step S115). If the handset 9 becomes in an on-hook state during waiting for this response (Step S116=YES), as shown in FIG. 13, the connected voice codec is released (Step S39), the outside line management table is re-written (Step S40), and then the operational flow proceeds to the communication completion monitoring process (Step S41).

On the other hand, if there is the response from the communication partner (Step S115=YES), the outside line communication through the handset 9 is started (Step S117), and the content of the hardware management table is re-written (Step S118). Namely, information indicating that the connected device is the handset 9 is stored in the area 143 corresponding to the connected voice codec, in the hardware management table. Then, the operational flow proceeds to the communication completion monitoring process (Step S119). The outside line call is performed by the master terminal 1, in this way.

Next, the process is explained when performing the outside line sending operation by using the non-voice data from the master terminal 1, that is, performing the FAX data sending operation. Also in this case, the FAX data sending operation is selected on an operational panel (not shown) of the master terminal 1. It is possible to determine as the FAX data sending operation on the basis of the selection signal read by the CPU 10 (Step S100=YES, Step S101=YES and Step S102=NO). Next, it is determined by referring to the hardware management table whether or not the modem 5 is usable (Step S103). If the modem 5 is being used (Step S103=YES), the communication request is rejected (Step S130). The operational flow proceeds to the communication completion monitoring process (Step S131). However, if the modem 5 is usable (Step S103=NO), the modem 5 is connected to the outside line, and a protocol is established (Step S104). Actually, a sending command is sent and a reception preparation check command is received, in accordance with a G3 standard.

Then, the outside line management table is re-written (Step S105). A call signal to the communication partner is generated, and the call signal is sent (Step S106). After that, the operational flow waits for the response from the communication partner (Step S107). If there is not the response from the communication partner (Step S108=YES) even when a predetermined time is elapsed after sending the call signal, the communication request to the master terminal 1 is rejected as shown in FIG. 16 (Step S79). The connected modem 5 is released (Step S84). The outside line management table is re-written (Step S85). Then, the operational flow proceeds to the communication completion monitoring process (Step S86). Also if a sending operation stop request is outputted by the master terminal side as shown in FIG. 18B (Step S109=YES), as shown in FIG. 15, the modem 5 is released (Step S84), and the outside line management table is re-written (Step S85).

However, if the response is outputted by the communication partner within the predetermined time as shown in FIG. 18B (Step S107=YES), the FAX sending operation is started (Step 110). The hardware management table and the communication control data are re-written (Step S118). Namely, information indicating that the connected device is the master terminal is stored in the area 143 corresponding to the modem 5 of the hardware management table.

This FAX sending operation is applied to the data which is sent from the data slave terminals 40A to 40D and stored in the memory in the master terminal. In any case, the image data is outputted from the CPU 10 to the modem 5, coded and then sent to the outside line. As mentioned above, the apparatus according to this embodiment can be used as the usual FAX sending machine.

Figure 18A:
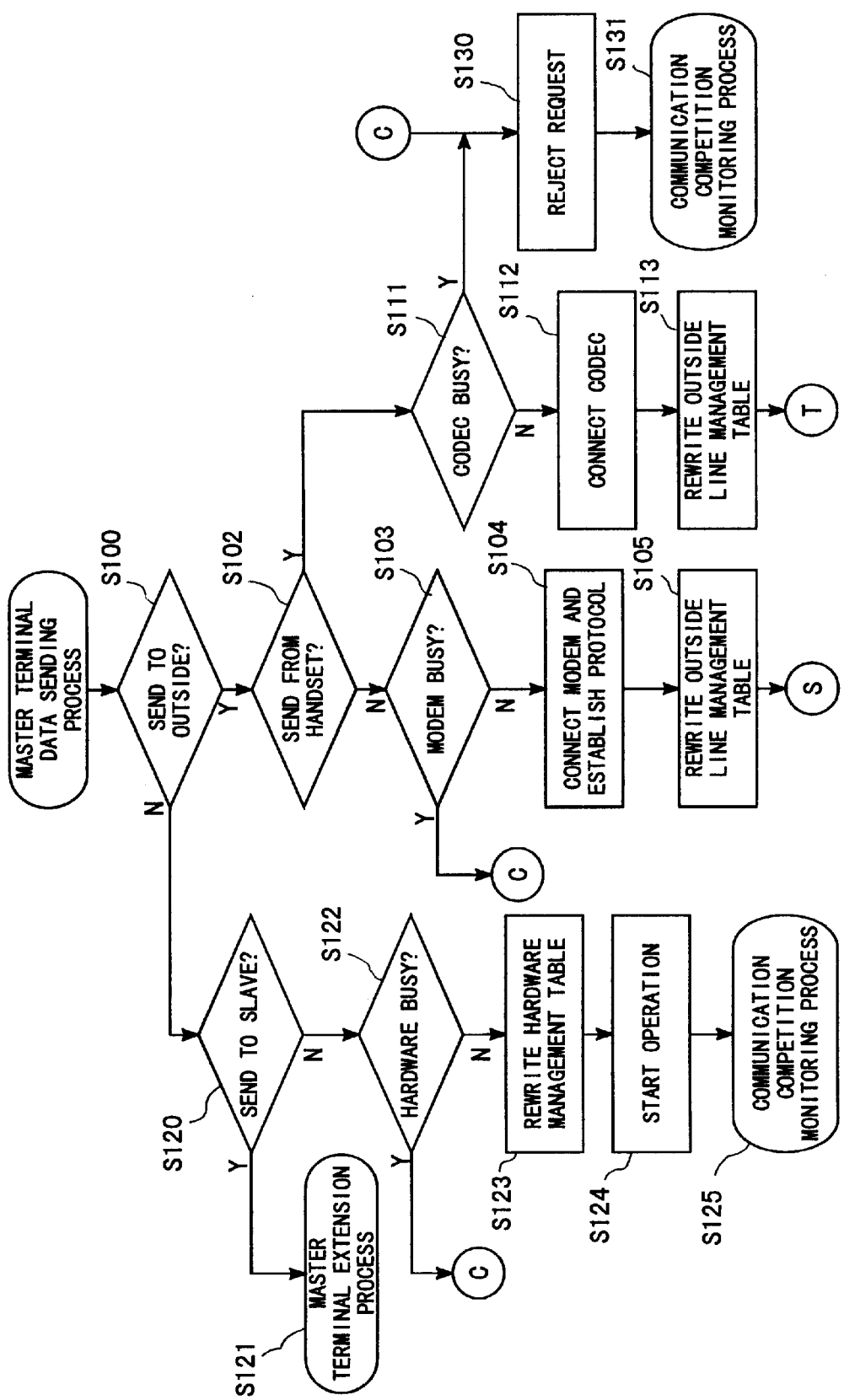
Figure 19A:
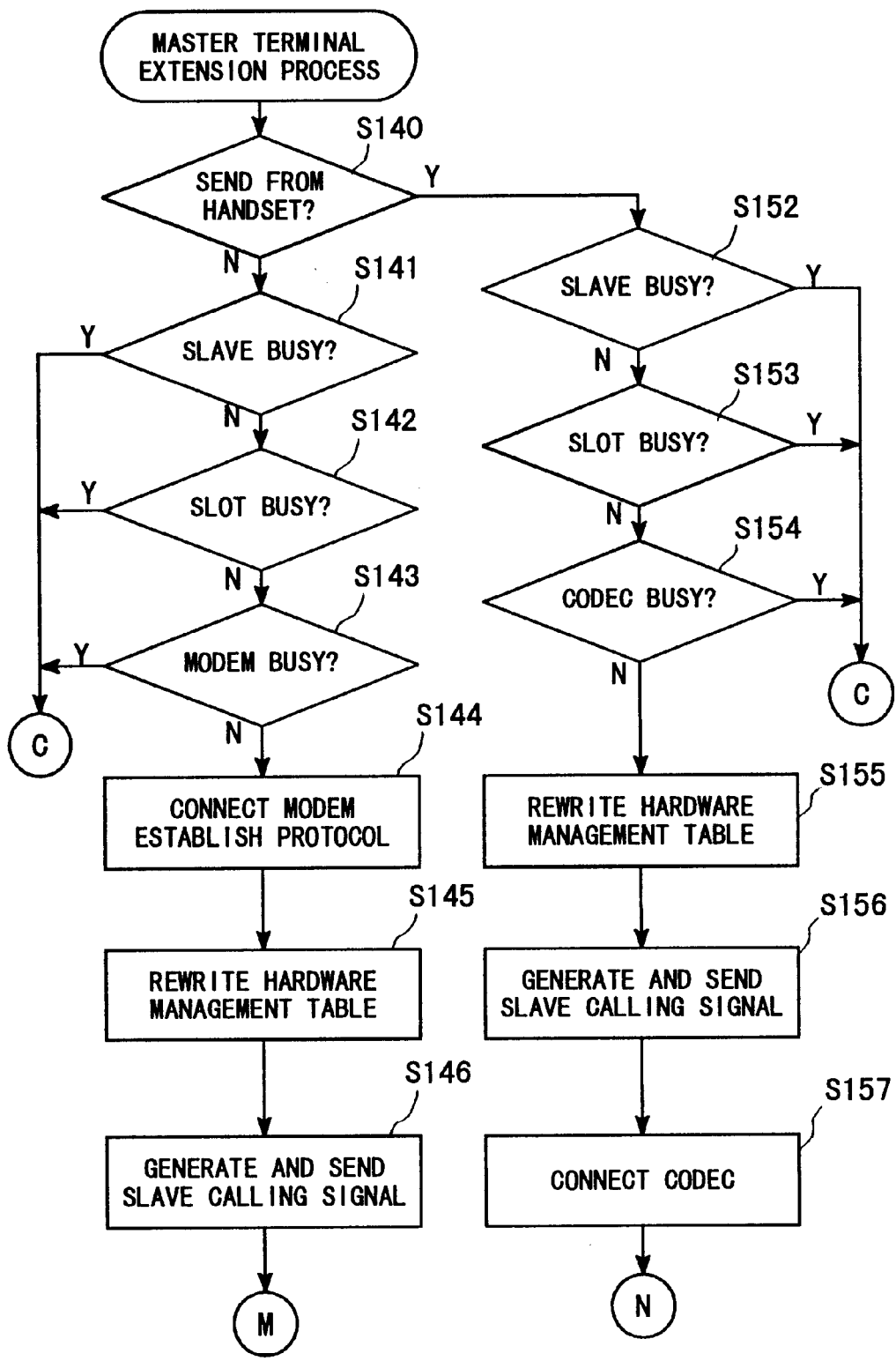
FIGS. 19A and 19B are flowcharts showing a master terminal extension line process in the communicating apparatus in the first embodiment of the present invention.
Figure 19B:
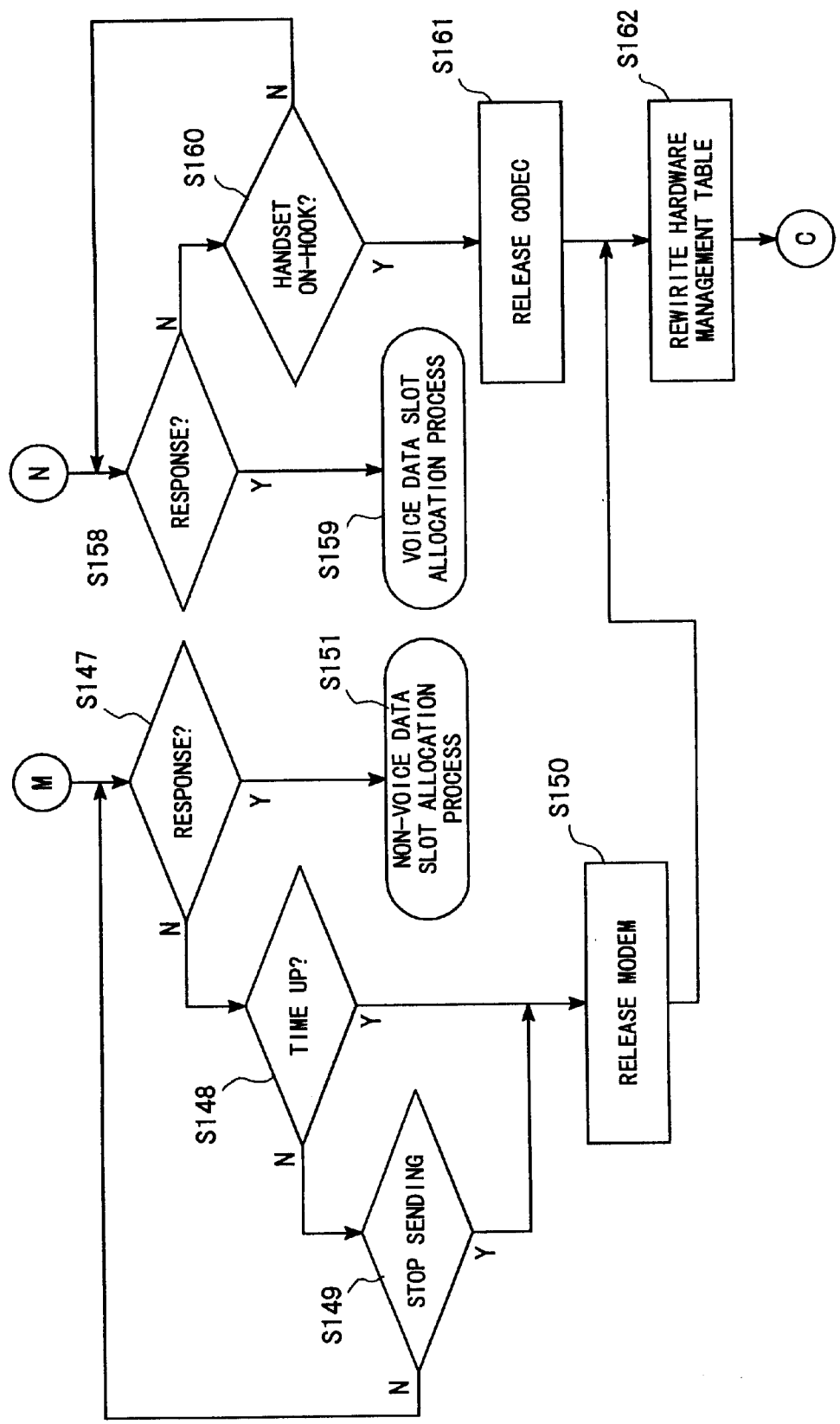

Next, the case is explained when the extension line communication request to the slave terminal is required by the master terminal 1 at the step S100 of FIG. 18A (Step S100=YES). As mentioned above, also in this case, the request can be determined by pressing a button on the operational panel of the master terminal 1 and the like. It can be also selected on the basis of a button whether the communication partner is the slave terminal or the master terminal itself. Then, if there is no partner and the master terminal is used in the manner of a copier (Step S120=NO), it is determined on the basis of a signal within the master terminal whether or not the hardwares such as the image reading block 7 and the image output block 8 are usable (Step S122). If the hardwares are being used (Step S122=YES), the request is rejected (Step S130). Then, the operational flow proceeds to the communication completion monitoring process (Step S131). However, if the hardwares are usable (Step S122=NO), a copying operation is started (Step S124), and the operational flow proceeds to the communication completion monitoring process (Step S125).

On the other hand, if the communication partner is the slave terminal (Step S120=YES), the operational flow proceeds to a master terminal extension line process (Step S121). As detailed in FIGS. 19A and 19B, it is firstly determined whether or not the sending operation is required by the handset 9 of the master terminal (Step S140), and it is determined whether the data to be treated is the voice data or the non-voice data. As a result, if the sending operation is required by the handset 9 (Step S140=YES), it is determined by referring to the communication control table whether or not the voice slave terminals 20A to 20D are usable (Step S152). If the slave terminals are usable (Step S152=NO), it is next determined by referring to the communication control table whether or not the slot is usable (Step S153). If usable (Step S153=NO), it is next determined by referring to the hardware management table whether or not the voice codec is usable (Step S154). If the voice codec is usable, the voice codec is connected to the CPU 10.

However, all the slave terminals or the slots or the voice codesc are being used (Steps S152=YES, Step S153=YES and Step S154=YES), as shown in FIG. 18A, the request is rejected(Step S130). The operational flow proceeds to the communication completion monitoring process (Step S131).

When the voice codec is connected to the CPU 10 (Step S155), information indicating that the connected device is the usable slave terminal is stored in the area 143 corresponding to the voice codec of the hardware management table (Step S156). A call signal corresponding to the slave terminal is generated, and the call signal is sent (Step S157).

After that, the operational flow waits for the response from the slave terminal (Step S158). If the handset 9 becomes in the on-hook state during waiting for this response (Step S160=YES), the connected voice codec is released (Step S161), the hardware management table is re-written (Step S162). However, if the response is outputted by the slave terminal (Step S185=YES), the operational flow proceeds to the voice data slot allocating process (Step S159). This process is identical to that explained with reference to FIG. 13. Namely, the slot is allocated, and the communication is started. Then, the communication control table is re-written (Steps S50 to S54).

Next, the case is explained if the extension line communication request from the master terminal is not required by the handset 9 (Step S140=NO). This implies the case when the FAX data once accumulated in the master terminal is later sent to the slave terminal. In this case, it is firstly determined by referring to the communication control table whether or not any one of the data slave terminals 40A to 40D is usable (Step S141). If the slave terminal is usable (Step S141=NO), it is next determined by referring to the communication control table whether or not the slot is usable (Step S142). If the slot is usable (Step S142=NO), it is next determined whether or not the modem 5 is usable (Step S143). If usable (Step S143=NO), the modem 5 is connected to the CPU 10, and then a protocol is established between it and the slave terminal (Step S144).

However, if all the data slave terminals or the slots or the modem 5 are being used (Steps S141=YES, Step S142=YES and Step S143=YES), as shown in FIG. 18A, the request is rejected (Step S130). The operational flow proceeds to the communication completion monitoring process (Step S131).

After the modem 5 is connected to the CPU 10, information indicating that the connected device is the usable slave terminal is stored in the area 143 corresponding to the modem 5 of the hardware management table (Step S145). A slave terminal call signal is generated, and the call signal is sent (Step S147).

After that, the operational flow waits for the response from the slave terminal (Step S147). If the response is not outputted when a predetermined time is elapsed after sending the call signal (Step S148=YES), or if stopping the sending operation from the master terminal (Step S149=YES), the connected modem 5 is released (Step S150), and then the hardware management table is re-written (Step S162).

However, if the response from the slave terminal is outputted within the predetermined time (Step S147=YES), the operational flow proceeds to the allocating process of the non-voice data slot (Step S151). Similarly to the process explained with reference to FIG. 17, the slot is allocated to the data sent from the master terminal, the wireless communication with the slave terminal is started, and then the content of the communication control table is re-written (Steps S87 to S95). As mentioned above, in this embodiment, it is possible to carry out the extension line communication using the voice data and the non-voice data between the master terminal and the slave terminal.

Figure 20A:
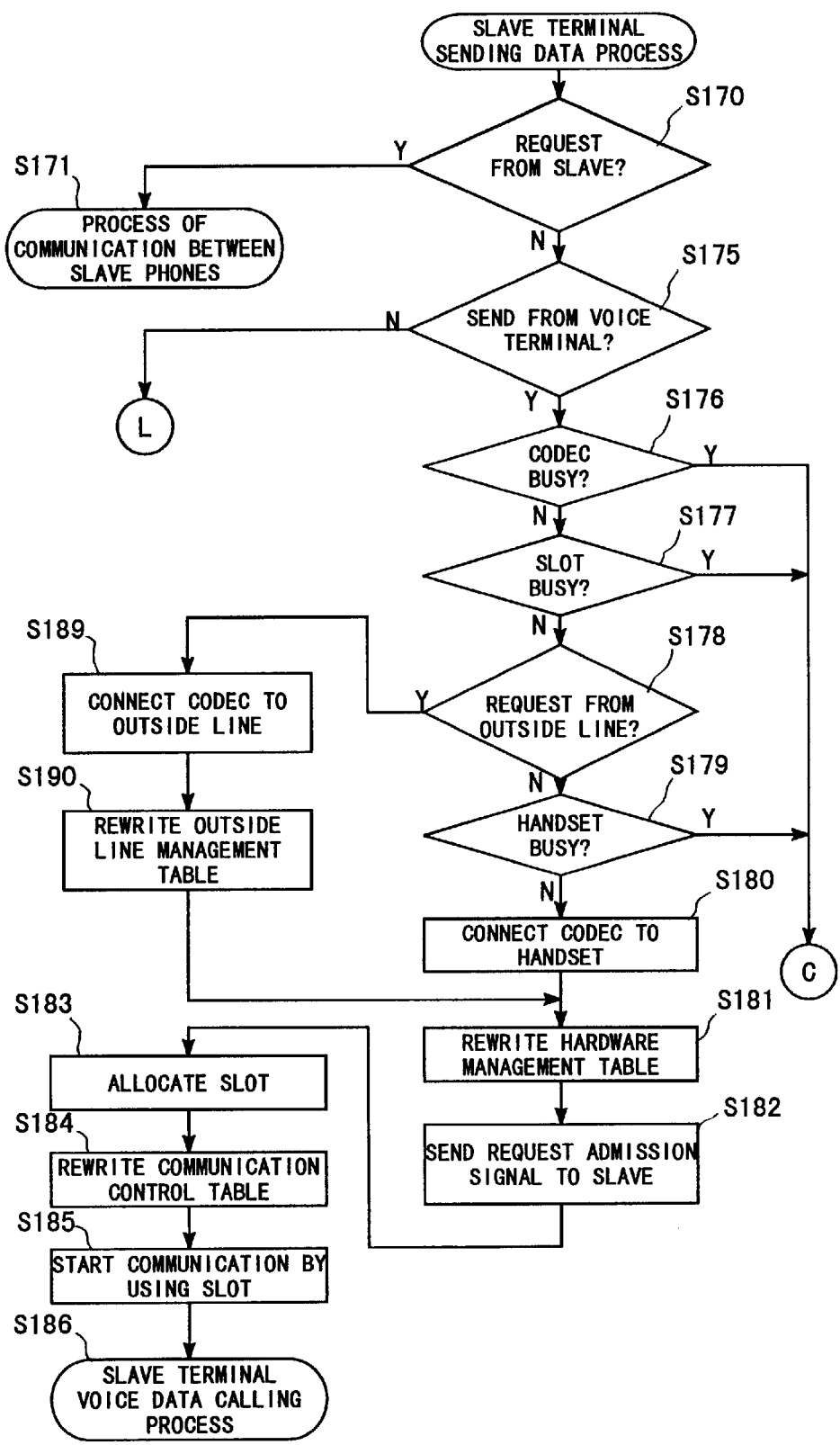
FIGS. 20A and 20B are flowcharts showing a slave terminal transmission data process in the communicating apparatus in the first embodiment of the present invention.
Figure 20B:
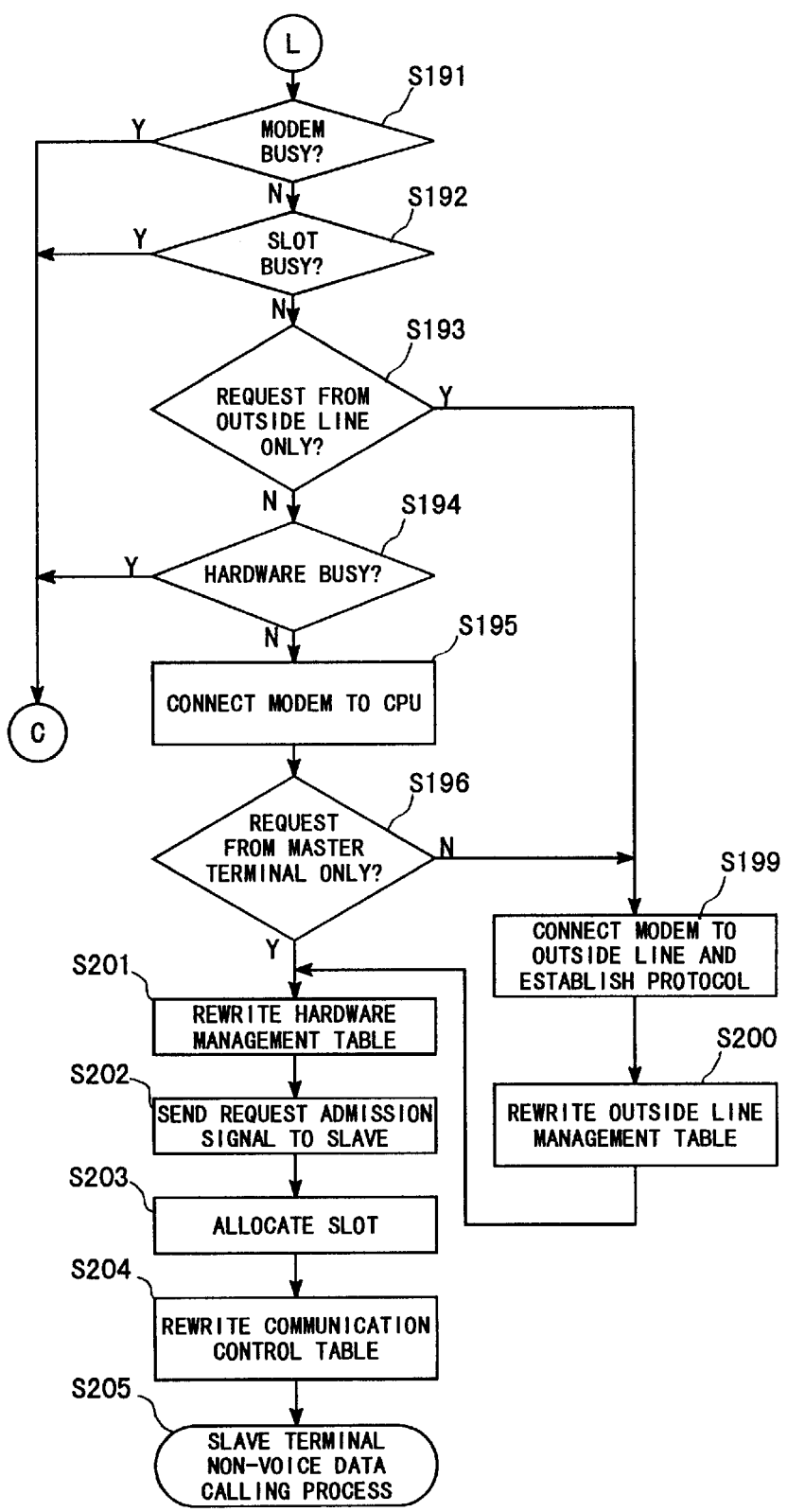

Next, the case is explained when the communication request is required by the slave terminal at the step S1 of FIG. 12 (Step S1=YES). In this case, the operational flow proceeds to a slave terminal sending data process (Step S2). As shown in FIGS. 20A and 20B, it is firstly determined whether or not a communication partner required by the slave terminal is a slave terminal (Step S170). Information with regard to the communication partner is information included in the response data 125 within the response slot 120 shown in FIG. 10. The master terminal obtains this information at a time of the synchronous acquisition, and then performs the determination. If the communication partner is not the slave terminal (Step S170=NO), it is determined by the sending side ID 123 of the response slot 120 shown in FIG. 10 whether or not a sending source is a voice slave terminal (Step S175).

If the slave terminal of the sending source is the voice slave terminal (Step S175=YES), it is determined by referring to the hardware management table whether or not the voice codec is usable (Step S176). If the voice codec is usable (Step S176=NO), it is next determined by referring to the communication control table whether or not the slot is usable (Step S177). If the slot is usable (Step S177=NO), it is determined on the basis of the information included in the response data 125 whether or not a communication partner required by the slave terminal of the sending source is the outside line (Step S178). If the communication partner is not the outside line (Step S178=NO), this implies the extension line call to the master terminal 1. Then, it is determined on the basis of a hook signal whether or not the handset 9 is being used (Step S179). If the handset 9 is usable (Step S179=NO), the master terminal connects the voice codec to the CPU 10 (Step S180).

On the other hand, if a communication partner required by the slave terminal is the outside line (Step S178=YES), the voice codec of the master terminal is connected to the outside line (Step S189). The outside line management table is re-written (Step S190).

However, if all the voice codecs, or the slot or the handset are being used at the processes to this point (Step S176=YES, Step S177=YES and Step S179=YES), the extension line call between the slave terminal and the master terminal can not be performed. Thus, a request rejection signal is sent to the slave terminal, as shown in FIG. 18A (Step S130). Then, the operational flow proceeds to the communication completion monitoring process (Step S131).

As mentioned above, if the voice codec of the master terminal is connected to the CPU 10 of the master terminal or the outside line, the area corresponding to the voice codec of the hardware management table is re-written (Step S181), and a request admission signal is sent to the slave terminal (Step S182). This information is sent to the slave terminal as the communicating process data 135 of the communicating process slot 130 shown in FIG. 10. Then, a length of the slot is determined by considering the presence or absence of the non-voice data and the channel used for the communication with the slave terminal. The slot is allocated for the communication with the slave terminal (Step S183). The communication control table is re-written (Step S184). In short, information indicative of the slave terminal is stored in the area 145 of the communication partner terminal of the master terminal, information indicative of the voice is stored in the slot, and information indicative of the selected channel is stored in the channel. Moreover, information indicative of the master terminal is stored in the area 145 of the communication partner terminal of the slave terminal, information indicative of the voice is stored in the slot, and information indicative of the same channel as the previous case is stored in the channel.

Figure 21:
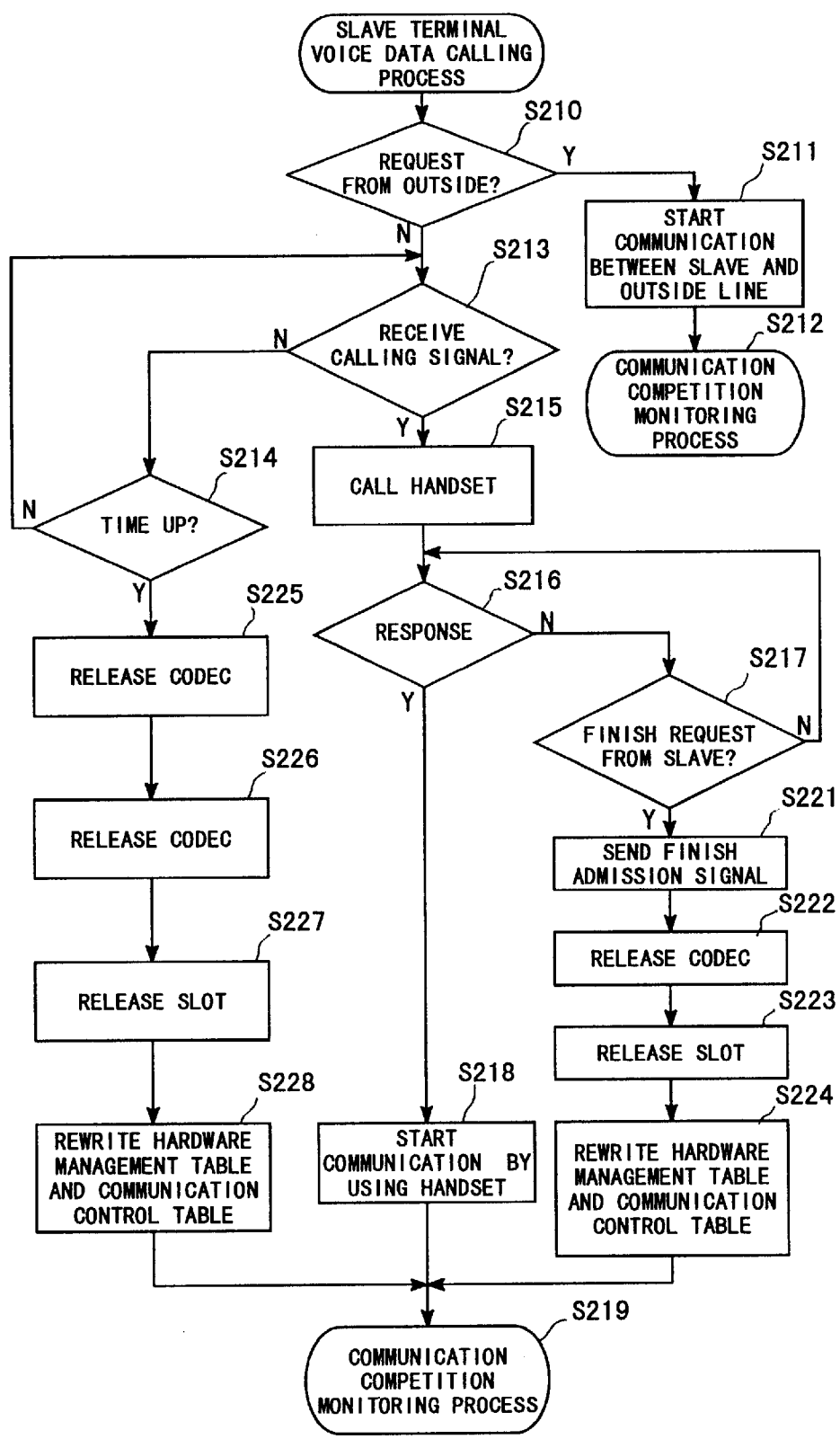
FIG. 21 is a flowchart showing a slave terminal voice data calling process in the communicating apparatus in the first embodiment of the present invention.

Then, the communication using the slot is started (Step S185). The operational flow proceeds to a slave terminal voice data calling process (Step S186). As shown in FIG. 21, at first, the master terminal, if a communication partner of the slave terminal is not the outside line (Step S210=NO), determines whether or not a call signal sent by the slave terminal can be received (Step S213). If the call signal sent by the slave terminal can be received within a predetermined time (Step S214=YES), the master terminal sends the call signal to the handset 9 to thereby call the handset 9 (Step S215), and waits for the response (Step S216). As a result, if the response is outputted by the handset 9 (Step S216=YES), the extension line call between the handset 9 and the slave terminal is started (Step S218), and then the operational flow proceeds to the communication completion monitoring process (Step S219). At this time, the voice data outputted by the slave terminal is coded by a voice codec 24A of the slave terminal and the like, a slot is allocated thereto by a sending and receiving device 25A of the slave terminal and sent to the master terminal. Then, the voice data received by the master terminal is outputted through the voice codec of the master terminal to the CPU 10 of the master terminal, decoded by a voice codec 4 and identified by the handset 9. The output data from the handset 9 is also sent through the same route to the slave terminal.

On the other hand, in a state of waiting for the response from the handset 9 (Step S216), if a communication finish request is required by a slave terminal side of the sending source (Step S217=YES), a communication finish admission signal is sent to the slave terminal (Step S221). Then, the connected voice codec is released (Step S222), the slot is released (Step S223), the hardware management table and the communication control table are re-written (Step S224), and the operational flow proceeds to the communication completion monitoring process (Step S219).

If the call signal to the master terminal from the slave terminal is not received within the predetermined time (Step S213=NO and Step S214=YES), the connected voice codec is released (Step S225), the slot is released (Step S226), the hardware management table and the communication control table are re-written (Step S227), the request rejection signal is sent to the slave terminal (Step S228), and the operational flow proceeds to the communication completion monitoring process (Step S219).

Moreover, after the wireless communication with the slave terminal is started, if the outside line is the determined result with regard to the communication partner required by the slave terminal (Step S210=YES), a slave terminal outside line process is performed (Step S211). The operational flow proceeds to the communication completion monitoring process (Step S212). This slave terminal outside line process perform the normal outside line call through the voice codec connected to the outside line.

Next, the case is explained when the slave terminal of the sending source is a data slave terminal at the step S175 of FIG. 20A (Step S175=NO). In this case, it is firstly determined by referring to the hardware management table whether or not the modem 5 is usable (Step S191). If usable (Step S191=NO), it is determined by referring to the communication control table whether or not the slot is usable (Step S192). If the slot is usable (Step S192=NO), it is determined whether or not the communication partner required by the slave terminal is only the outside line (Step S193). If in addition to the outside line, the image output and the like are also performed by the master terminal (Step S193=NO), it is determined on the basis of an inner signal and the like whether or not the hardware such as the image reading block 7 or the image output block 8 of the master terminal used for the image output and the like is usable (Step S194). As a result, if the hardware is usable (Step S194=NO), the modem 5 is connected to the CPU 10 (Step S195).

If the required communication partner is not only the master terminal (Step S196=NO), or if the communication partner required at the step S193 is only the outside line (Step S193=YES), the modem 5 is connected to the outside line, a protocol is established (Step S199), and the outside line management table is re-written (Step S200).

However, if the modem 5 or the slot or the hardware of the master terminal is being used at the processes to this point (Step S191=YES, Step S192=YES and Step S194=YES), the request rejection signal is sent to the slave terminal, as shown in FIG. 18A (Step S130). Then, the operational flow proceeds to the communication completion monitoring process (Step S131).

Figure 22:
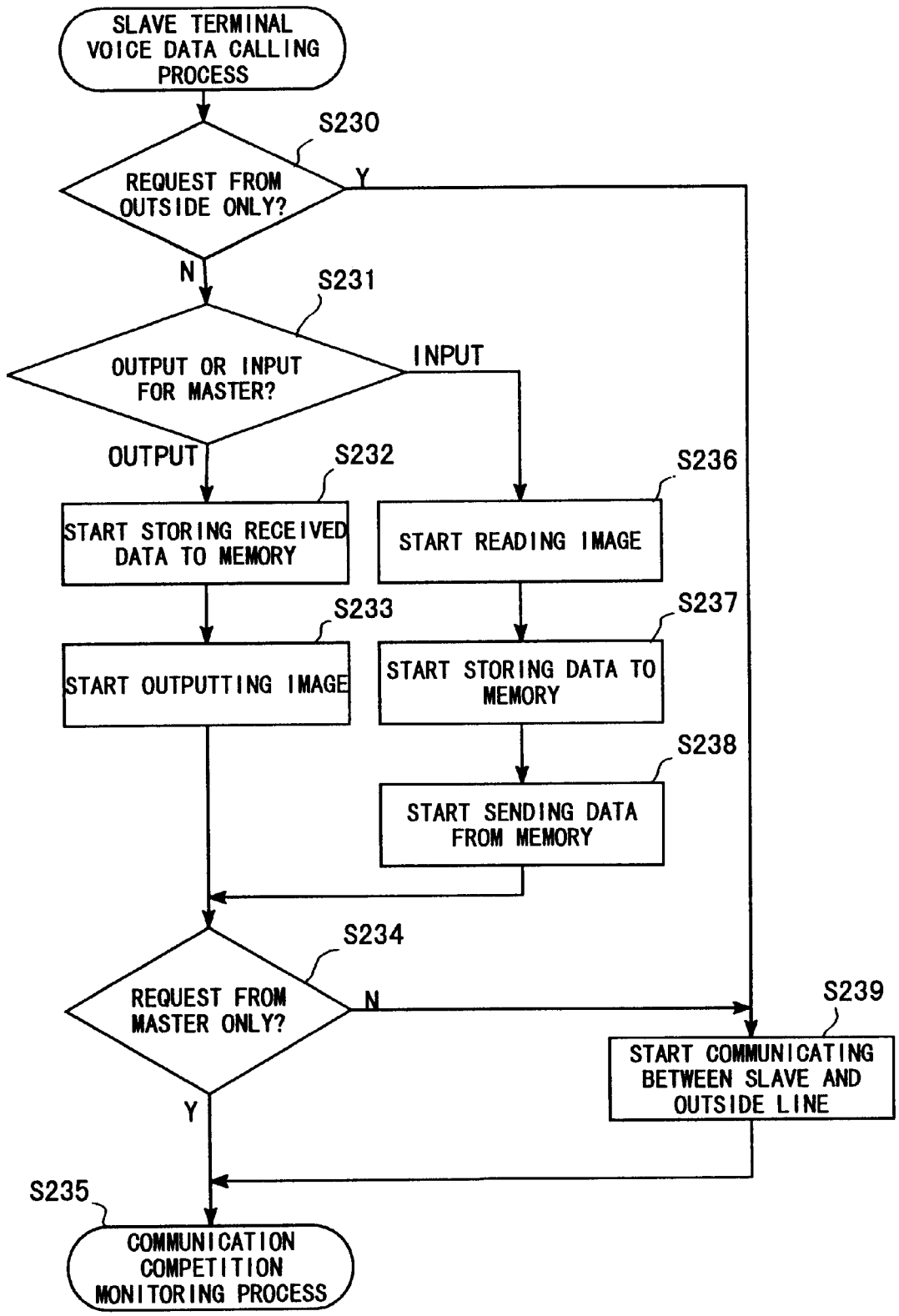
FIG. 22 is a flowchart showing a slave terminal non-voice data calling process in the communicating apparatus in the first embodiment of the present invention.

After the connected destination of the modem 5 is determined as mentioned above, the content of the area corresponding to the modem 5 of the hardware management table is re-written (Step S201). The communication request admission signal is sent to the slave terminal (Step S202). The slot is allocated for the wireless communication with the slave terminal (Step S203). The communication control table is re-written (Step S204). The operational flow proceeds to a slave terminal non-voice data calling process (Step S205). Then, as shown in FIG. 22, it is firstly determined whether or not a communication partner terminal required by the slave terminal is only the outside line (Step S230). As a result, if in addition to the outside line, the image output and the like are also performed by the master terminal (Step S230=NO), it is determined whether the master terminal performs the output of the data or the input (Step S231). This information is sent to the master terminal from the slave terminal as the information within the response data of the response slot 120 shown in FIG. 10. If outputted to the master terminal (Step S231=OUTPUT), the process of storing the data, which is sent by the slave terminal and received by the master terminal, in the memory of the master terminal is started (Step S232), and the image output by the image output block 8 is started (Step S233). On the other hand, if the data is inputted to the master terminal (Step S231=INPUT), the image reading operation is started by the image reading block 7 (Step S236). The process of storing the read data in the memory of the master terminal is started (Step S237). Then, the process of sending the data stored in the memory to the slave terminal by using the slot is started (Step S236).

After the process of starting the output of the data or the input in the master terminal is performed as mentioned above, it is determined whether or not the communication partner required by the slave terminal is only the master terminal (Step S234). If the required communication partner is not only the master terminal (Step S234=NO), or if the communication partner required at the step S230 is only the outside line (Step S230=YES), a slave terminal outside line process is started (Step S239). This slave terminal outside line process performs the normal FAX communication or data communication through the modem 5 connected to the outside line. Incidentally, after the above mentioned processes, the operational flow proceeds to the communication completion monitoring process (Step S235), similarly to the aforementioned other communicating processes.

As explained above, according to this embodiment, it is possible to perform the extension line communication between the slave terminal and the master terminal required by the slave terminal, or the outside line communication. These communications are possible for both the voice data and the non-voice data.

Figure 23:
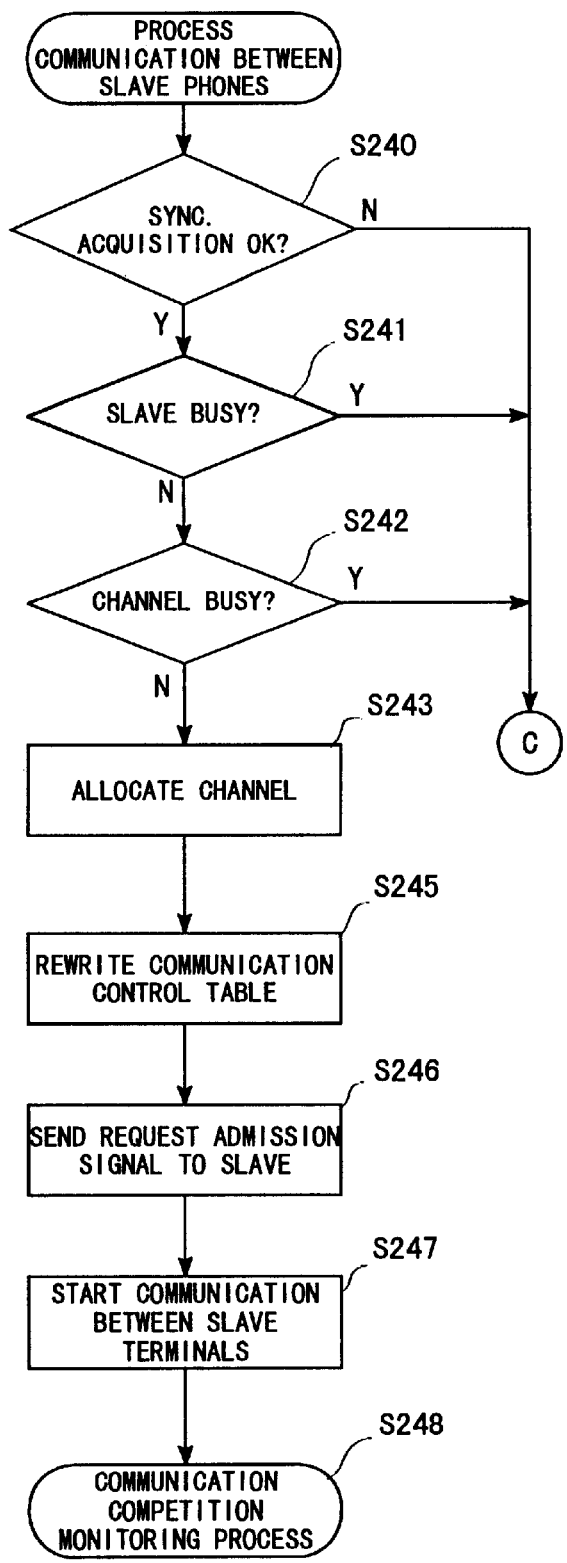
FIG. 23 is a flowchart showing a communicating process between the slave terminals in the communicating apparatus in the first embodiment of the present invention.

Next, the case is explained when a communication partner required by the slave terminal is another slave terminal (Step S170=YES). In this case, the operational flow proceeds to a process of a communication between the slave terminals (Step S171). As shown in FIG. 23, it is firstly determined by referring to a synchronous acquisition information area 148 whether or not the master terminal and the slave terminal of the communication partner are synchronous with each other (Step S240). This is because a correct response can not be obtained from these slave terminals, even when the synchronous acquisition process is performed by the master terminal, if the extension line communication between the slave terminals is started. If they are synchronous with each other (Step S240=YES), it is determined by referring to the communication control table whether or not the slave terminal of the communication partner is usable (Step S241). If usable (Step S241=NO), the presence or absence of an unused channel is determined by referring to the communication control table (Step S242). This is performed in order to enable the communication between the slave terminals by selecting between the slave terminals an unused channel for the communication between the master terminal and the slave terminal, even if a slot of a certain channel is used between the master terminal and the slave terminal. If there is an empty channel as the result of the determination, the channel is allocated for the communication between the slave terminals (Step S243). Then, a channel information area 147 to both the slave terminals of the communication control table is re-written (Step S244).

If the master terminal and the slave terminal of the communication partner are not synchronous with each other (Step S240=NO), or if the slave terminal is being used (Step S241=YES) or if there is no empty channel (Step S242=YES), the request rejection signal is sent to the slave terminal (Step S130) as shown in FIG. 18 Then, the operational flow proceeds to the communication completion monitoring process (Step S131).

After ending the allocation of the channel, the communication request admission signal together with this channel information is sent (Step S245). The master terminal recognizes the start of the communication between the slave terminals (Step S246).

On the other hand, the slave terminal, when receiving the communication request admission signal, sends the communication request to another slave terminal of the communication partner. Then after obtaining the communication admission from the slave terminal, the communication is started between them. Although this communication is performed by using the frequency hopping method, the frame structure and the slot structure which are used may be similar to those used between the master terminal and the slave terminal or may be different from them. However, it is possible to use the frame and the slot having the above mentioned configurations to thereby perform the wireless communication even between the slave terminals, in which the voice data and the non-voice data are mixed with each other.

After the above mentioned processes, the operational flow proceeds to the communication completion monitoring process (Step S247). However, if the communication admission can not be received from another slave terminal as the result of the communication request sent to another slave terminal from the slave terminal, the communication finish request is sent from the slave terminal to the master terminal. If this is recognized at the step S63 shown in FIG. 15, the master terminal sends the communication finish admission signal to the slave terminal (Step S64). Then, the slot and the channel are released, and the table is re-written (Steps S65 and S66).

The communication finish requests in the communications between the slave terminals are sent in accordance with a priority order of the slave terminal registered in advance on the master terminal. That is, if the priority order of the slave terminal 20A is higher than that of the slave terminal 20B, the slave terminal 20A sends the communication finish request signal to the master terminal earlier than the slave terminal 20B. However, the slave terminal B does not know that a finish admission signal is sent by the master terminal for the finish request signal sent by the slave terminal A and that the admission signal is received by the slave terminal A. Hence, the slave terminal B sends the communication finish request signal to the master terminal, whether or not the communication finish admission signal is received by the slave terminal A. Then, these signals are continued to be sent and received, until both of the slave terminal A and the slave terminal B recognize that the master terminal finally admits the communication finish request signal.

This communication between the slave terminals is performed between the voice slave terminals or the data slave terminals. Accordingly, it is possible to parallel simultaneously perform the communication between the voice slave terminals and the communication between the data slave terminals.

As mentioned above, according to this embodiment, while performing the wireless communication between the master terminal and the slave terminal by using the frequency hopping method, it is also possible to perform the wireless communication between the slave terminals by using the frequency hopping method.

As explained above, according to this embodiment, it is possible to send and receive both the voice data and the non-voice data by using one frame. Hence, this enables the communication with the high efficiency. That is, while the outside line call is carried out by the slave terminal, the data from another slave terminal can be printed out by the master terminal, and further the data from the slave terminal can be sent through the outside line. This communication performed by using the frequency hopping method improves the security of the communication and the utilization efficiency of the frequency.

Moreover, since the plurality of the sending slots and the plurality of the receiving slots in each one frame are used for the communication between the master terminal and the plurality of the slave terminal, it is possible to perform the simultaneous communications between the master terminal and a plurality of slave terminals to thereby provide the communication environment with the high efficiency.

Incidentally, in this embodiment, the number of the sending and receiving slots in one frame is assumed to be 3. However, the present invention is not limited thereto. The number may be suitably increased or decreased in accordance with the hardware environment and the like.

Furthermore, this embodiment is explained such that the data slave terminal has both the data generating means and the wireless sending and receiving means. However, the present invention is not limited thereto. Then, it may have a configuration that the slave terminal has the wireless sending and receiving means and the data input means and further the slave terminal can be connected to the external data generating means.

II. Second Embodiment

Next, a second embodiment of the present invention is explained with reference to FIGS. 24 to 29. The hardware configuration of a communication apparatus in the second embodiment is same as that of the communication apparatus of the first embodiment. In the second embodiment, the same constitutional elements as the first embodiment carry the same reference numbers, and the explanations thereof are omitted.

In the communication apparatus of the second embodiment, the frequency hopping is performed for each one frame, similar to the communication apparatus of the first embodiment. Further, in the communication apparatus of the second embodiment, in a case that the voice data and the non-voice data are included in one frame, another frequency hopping is further performed immediately before a sending and a receiving operation of the voice data in one frame. That is to say, a communication frequency used for the communication between the master terminal and the slave terminals is shift in accordance with another frequency hopping process while the communication of the voice data is performed between the master terminal and the slave terminals in one frame.

Here, the voice data, the FAX data and other non-voice data sent from a personal computer and the like are different in a characteristic from each other.

Namely, as for the voice data, it is allowable that the communication speed thereof is slow. However, a real-time two-way communication is required, and it is also necessary to protect a listening obstruction resulting from a wave interference. On the other hand, as for the FAX data, it is a data rate of approximately 14.4 kbs, and thereby the real-time two-way communication is not required. Moreover, as for the fast non-voice data which is inputted or outputted by the personal computer and the like, a high throughput by a fast transfer or a packet communication is needed, and thereby a data rate of 64 kbs or more is required.

However, the wireless communication using the frequency hopping method requires a time to stabilize the frequency in the hopping operation. This has influence on the data rate, depending on the number of the hops per unit time.

Namely, the large number of the hops per unit time decreases the data rate. This is not proper for the fast non-voice data. Conversely, the small number of the hops per unit time increases the data rate. On the other hand, when one frequency is subjected to the interference, this results in the acoustically recognized listening obstruction. Hence, this is not desirable.

If it is constructed so as to change the number of the hops per unit time based on the data type, the hopped frequencies can not be synchronous with each other between the devices. Especially, the configuration of the communication apparatus becomes complex for processing both the voice data and the non-voice data.

Then, the frequency is basically hopped at a unit of a frame, in this embodiment. Moreover, when sending or receiving the non-voice data and sending and receiving the voice data within one frame, it is constructed so as to also hop the frequency immediately before sending and receiving the voice data.

As shown in FIGS. 24A and 24B, the frame in the master terminal 1 has a first hop slot 70 indicative of a first sending and receiving operation waiting period, a data slot 71 indicative of a first sending and receiving operation executing period to send or receive the non-voice data, a second hop slot 72 indicative of a second sending and receiving operation waiting period, and a voice slot 75 indicative of a second sending and receiving operation executing period to send and receive the voice data. The voice slot 75 is divided into a sending slot 73 and a receiving slot 74. In addition, the data slot means a slot allocated to the FAX data or other non-voice data, and the voice slot means a slot allocated to the voice data.

In each of the voice slave terminals 20A to 20D, one frame has a hop slot 80 to start to wait for the sending and receiving operation at a timing synchronous with the hop slot 70, a sleep slot 81, a wake slot 82 and a voice slot 85. A length of the frame is similar to that of the master terminal. Moreover, the voice slot 85 is divided into a receiving slot 83 and a sending slot 84 so as to be synchronous with the frame of the master terminal.

Moreover, in each of the data slave terminal 40A to 40D, one frame has a hop slot 90 to start to wait for the sending and receiving operation at a timing synchronous with the hop slot 70, a data slot 91 to send or receive the non-voice data in synchronization with the master terminal, and a waiting slot 92 not to perform the sending and receiving operation. A length of the frame is similar to that of the master terminal.

The hop slots 70, 72, 80 and 90 shown in FIGS. 24A and 24B are the periods for the stabilization of the hopped frequencies. The sending and receiving operation of the data is not performed in these periods.

However, the hop slot 80 of each of the voice slave terminals 20A to 20D is constructed so as to be longer than the hop slots 70, 72 of the master terminal 1 or the hop slot 90 of each of the data slave terminals 40A to 40D. The hop slot 80 can be sufficiently long within a range that it does not overlap with the voice slot 85. This is because the voice slot 85 in each of the voice slave terminals 20A to 20D is set at a back half of the frame. Such a configuration enables a margin to be included in the time to stabilize the frequency of the frequency synthesizer 37. Hence, it is not necessary to use an expensive fast frequency synthesizer, such as fast PLL local oscillator.

The data slots 71, 91 are used to send and receive the FAX data having a data rate of approximately 14.4 kbps and the non-voice data having a fast data rate of 64 kbps or more. These data slots 71, 91, when performing the communication with the master terminal 1 and the voice slave terminals 20A to 20D, have a length of a period T1, as shown in FIG. 24A. However, when not communicating between the master terminal 1 and the voice slave terminals 20A to 20D, the length is changed to a period T2, as shown in FIG. 24B. Such information of the variation of the data slot length is transmitted from the master terminal 1 to the data slave terminals 40A to 40D.

The voice slots 75, 85 are used to transmit the voice data of 32 kbps or 64 kbps or less. However, since the voice slot requires the real-time two-way communication, the sending and receiving operation is switched by using TDD (Time Division Duplex).

In the sleep slot 81, it is possible to actuate only a timer for a time measurement to thereby turn off most of the power supplies in the wireless communicating section. This can reduce the consumption of the electric power. After the sleep slot 81 is ended, the power source is turned on in the wake slot 82 and is ready for the communication.

In this embodiment, the communication is performed by using the frame having the above mentioned configuration. However, as shown in FIGS. 24A and 24B, the hop of the frequency in the master terminal 1 is performed at a timing t0 when the frame is switched and at a timing t1 when the data slot 71 is ended. The hop at the timing t0 and the hop at the timing t1 are performed by using a hop table constituted by different frequency data sequences.

Also in the voice slave terminals 20A to 20D, the hop of the frequency is performed at t0 equal to the frame switch timing of the master terminal. The frequency table used in this hop uses a table having the same frequency data sequence as the table used in the hop at the timing t1 in the master terminal.

Moreover, in the data slave terminals 40A to 40D, the hop of the frequency is performed at the frame switch timing t0, in order to synchronize with the master terminal. A table used in this hop uses the same table as the table used in the hop at the timing t0 of the master terminal.

More concretely, a table TB1 shown in FIG. 25 is used in the sending and receiving operation by the data slot of the master terminal. A frequency data sequence composed of f0 to fm and a frequency data sequence composed of g0 to gm are alternatively listed in this table TB1. It is selected in an order of f0, g0, f1 . . . in accordance with a value M of the hopping counter 35. Incidentally, the frequency data of these frequency data sequences are listed in random.

Moreover, it is designed that the master terminal does not read out the hoping table TB1 from the output of the hopping counter 35 when M=2m+1. Hence, this enables only one frequency hop to be performed within one frame, as shown in FIG. 24B.

A table TB2 shown in FIG. 25 is used in the data slave terminals 40A to 40D. This table TB2 has a frequency data sequence composed of f0 to fm.

A table TB3 shown in FIG. 25 is used by the voice slave terminals 20A to 20D. This table TB3 has a frequency data sequence composed of g0 to gm.

A table TB4 shown in FIG. 25 is a table used in a communication between the voice slave terminals.

Next, the communicating process in this embodiment is actually explained with reference to a timing chart in FIG. 26 and flowcharts in FIGS. 27A to 29.

Figure 27A:
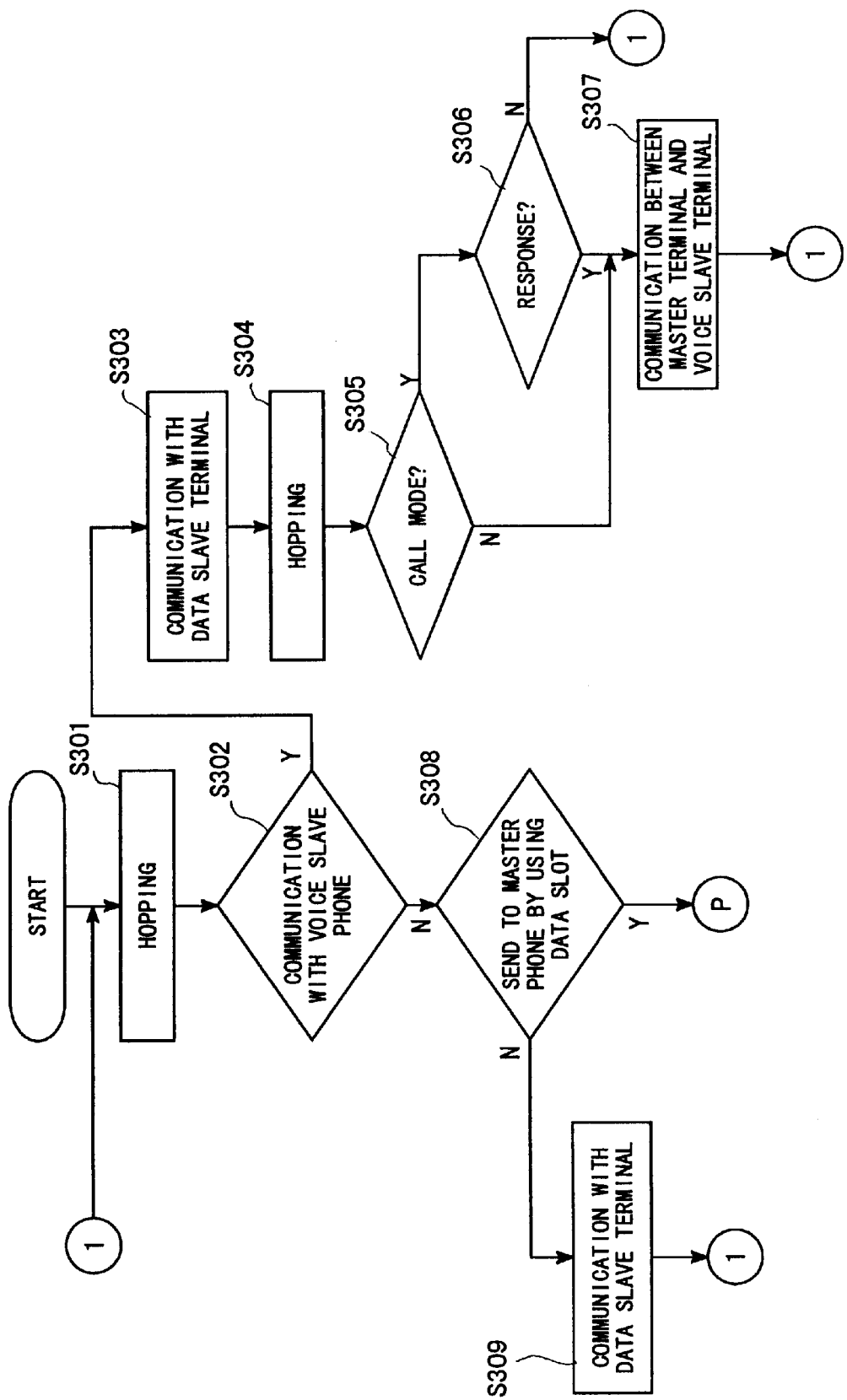
FIGS. 27A, 27B and 27C are flowcharts showing a communicating process of a master telephone in the communicating apparatus in the second embodiment of the present invention.
Figure 27B:
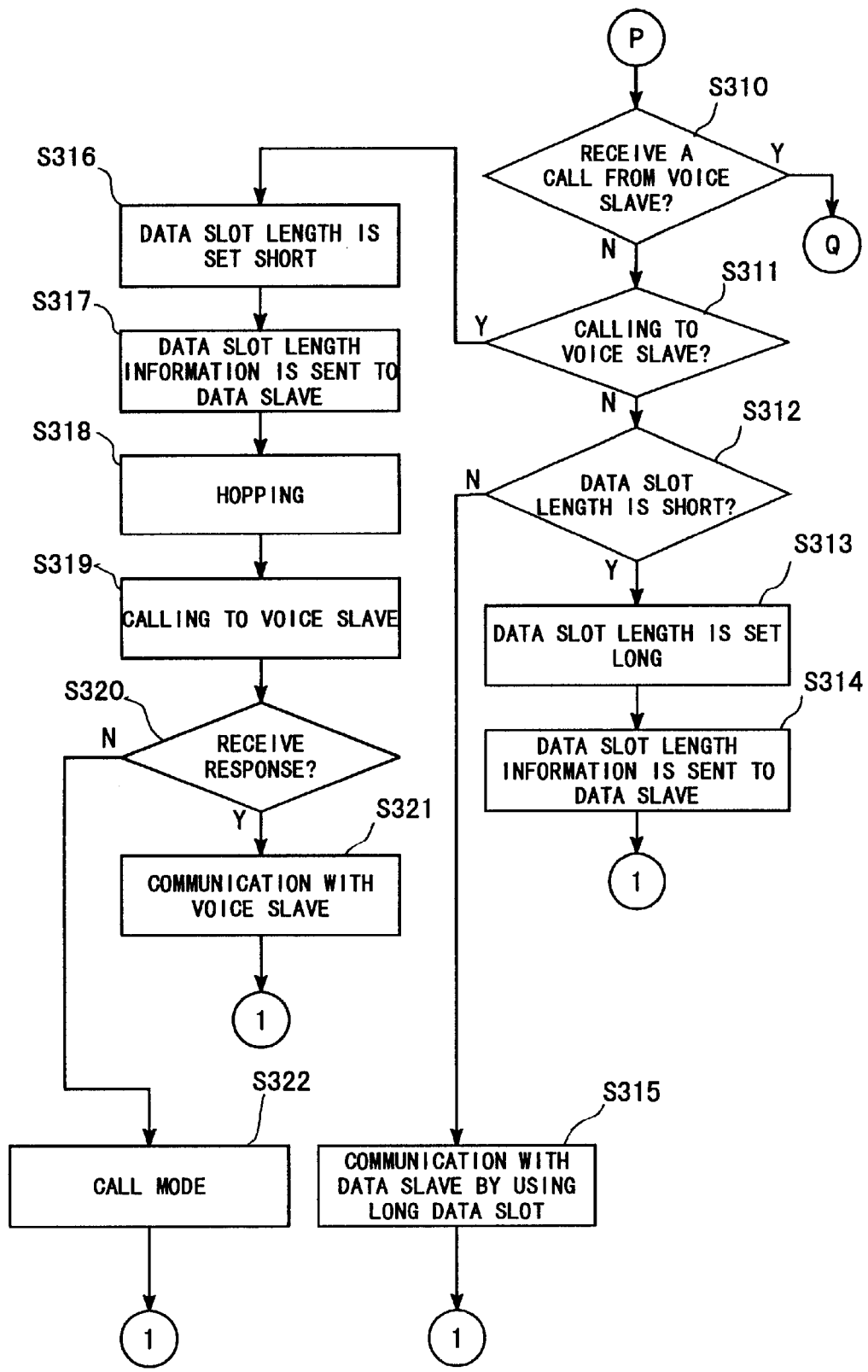
Figure 27C:
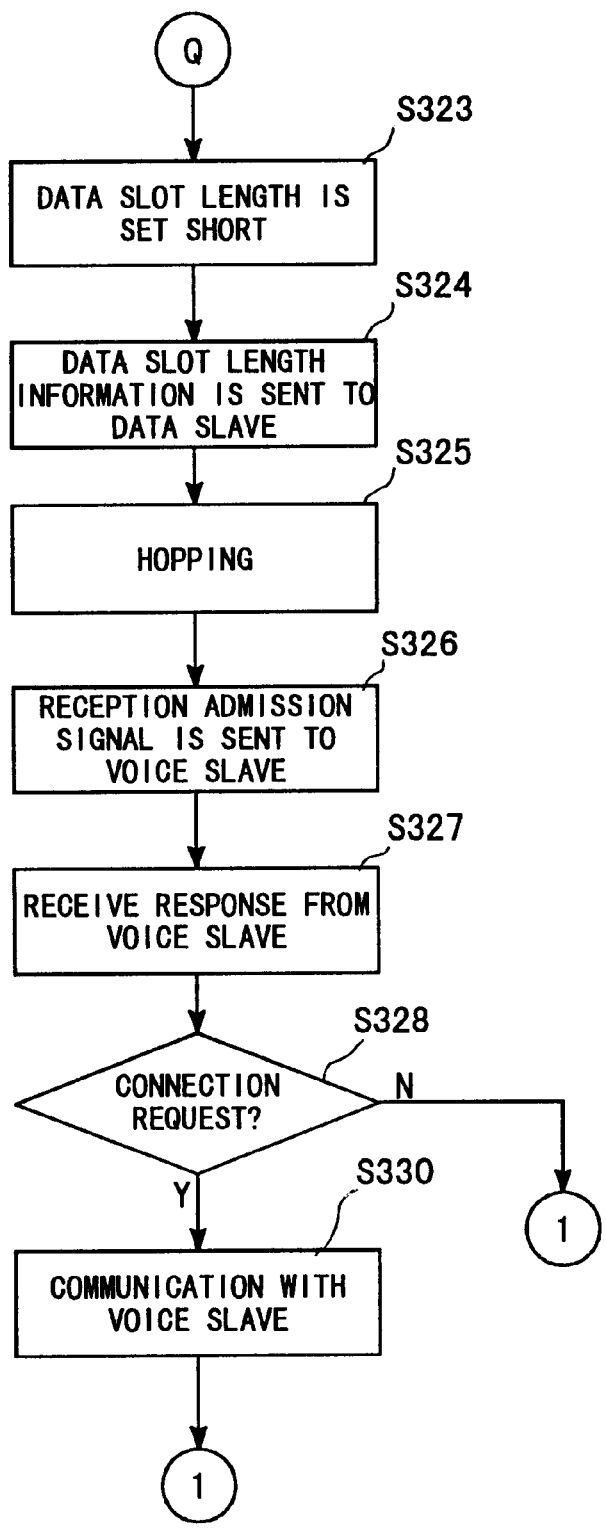
Figure 28A:
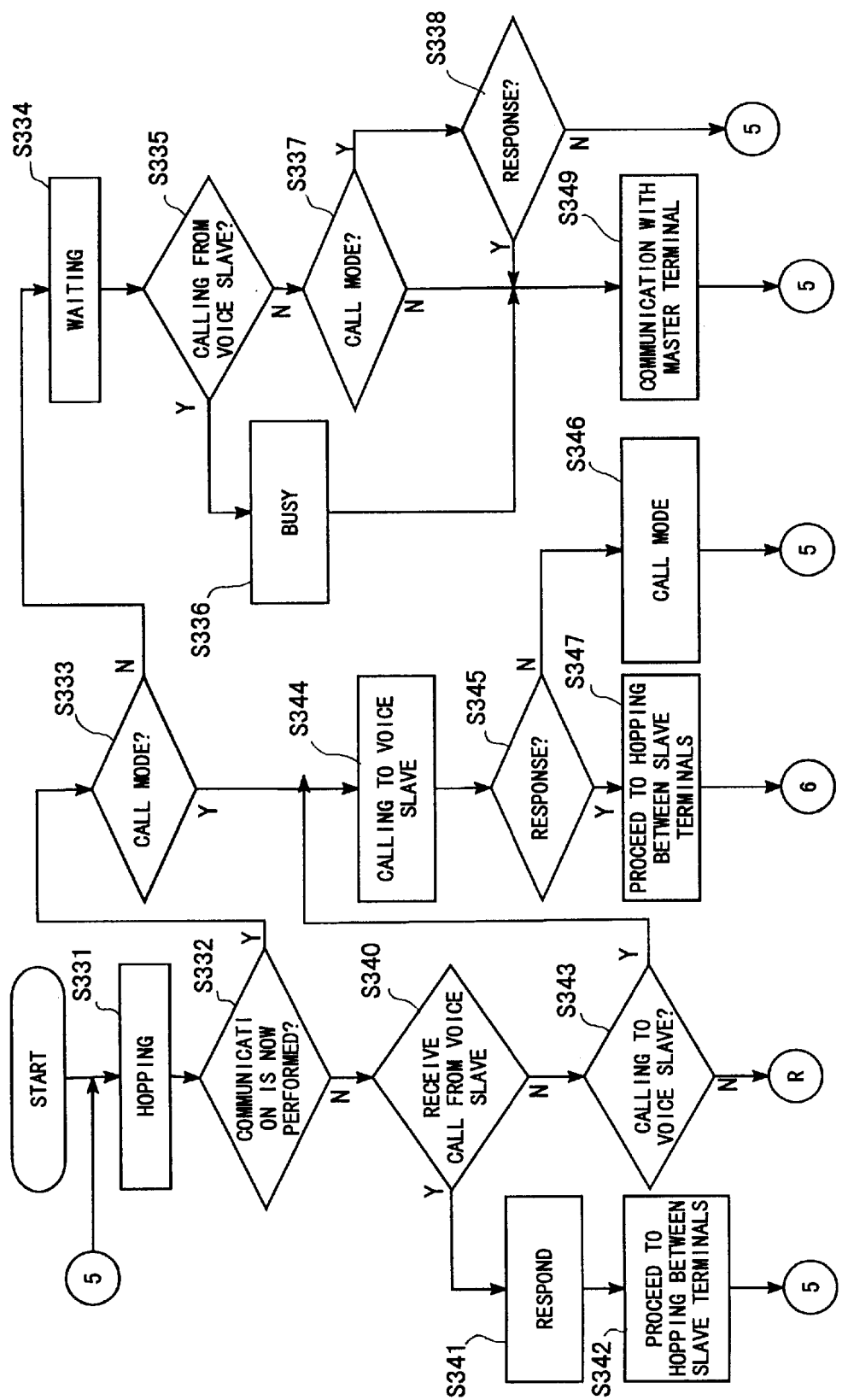
FIGS. 28A and 28B are flowcharts showing a communicating process of a voice slave telephone in the communicating apparatus in the second embodiment of the present invention.
Figure 28B:
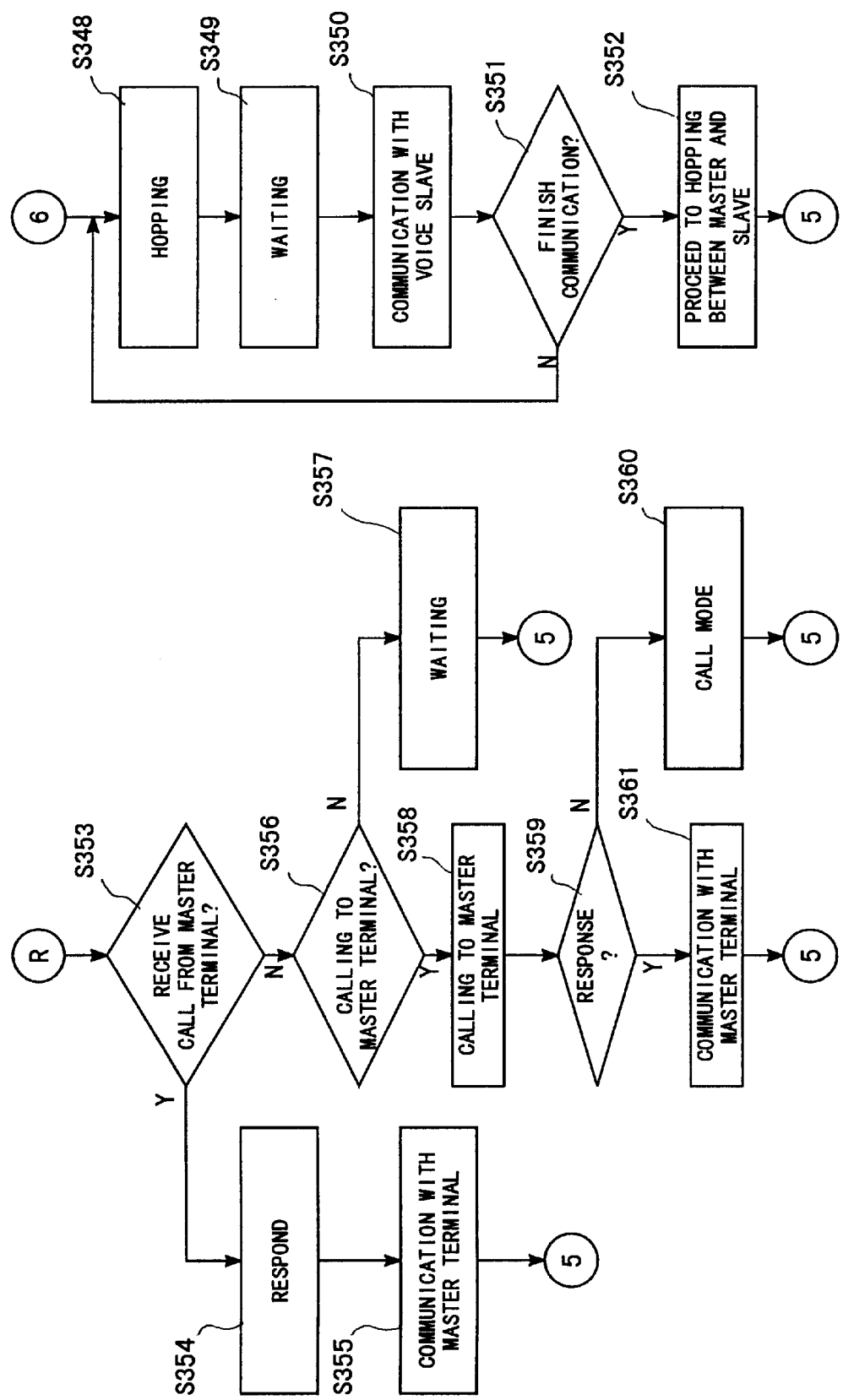
Figure 29:
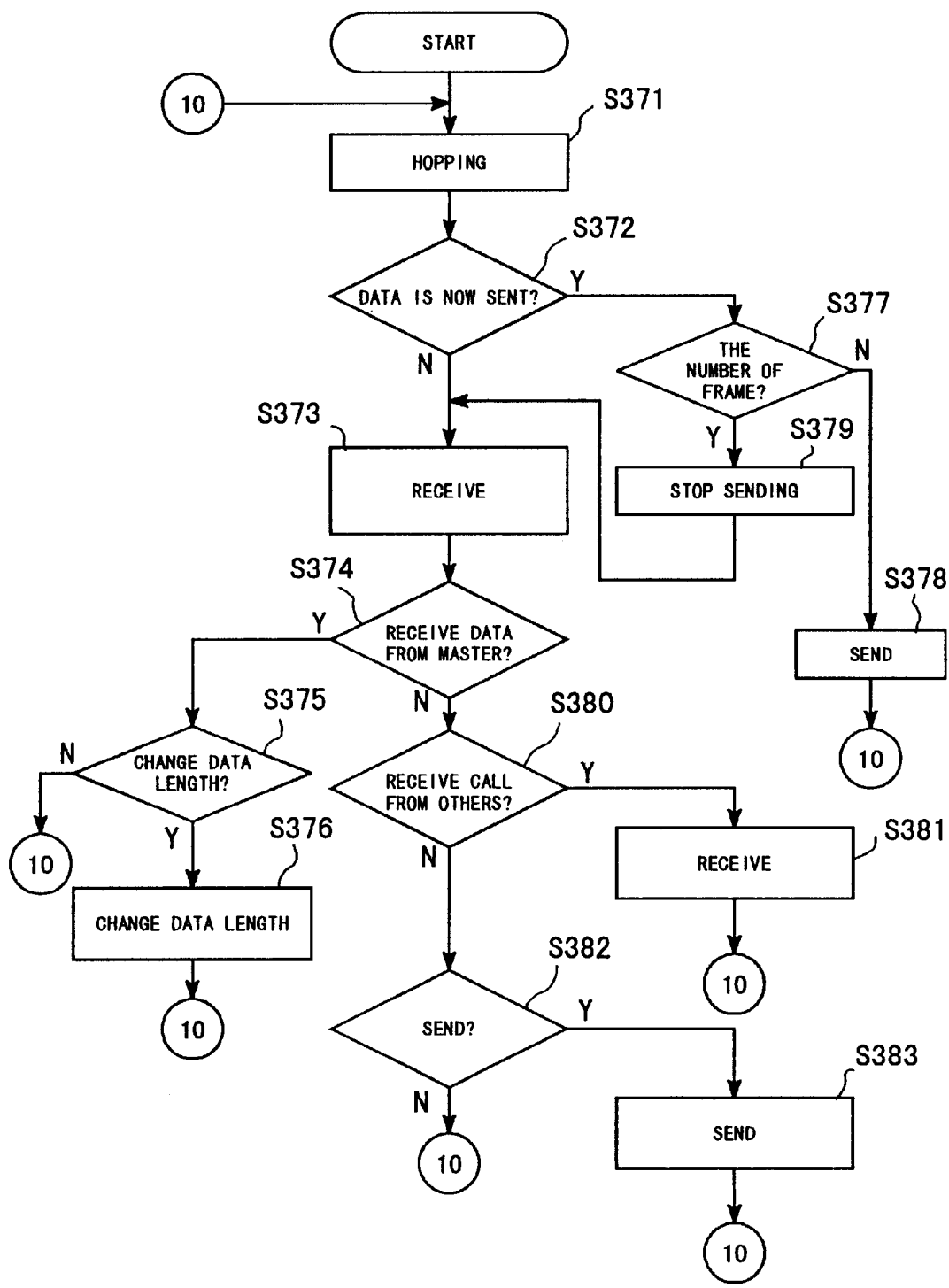
FIG. 29 is a flowchart showing a communicating process of a wireless adapter in the communicating apparatus in the second embodiment of the present invention.
Figure 30:
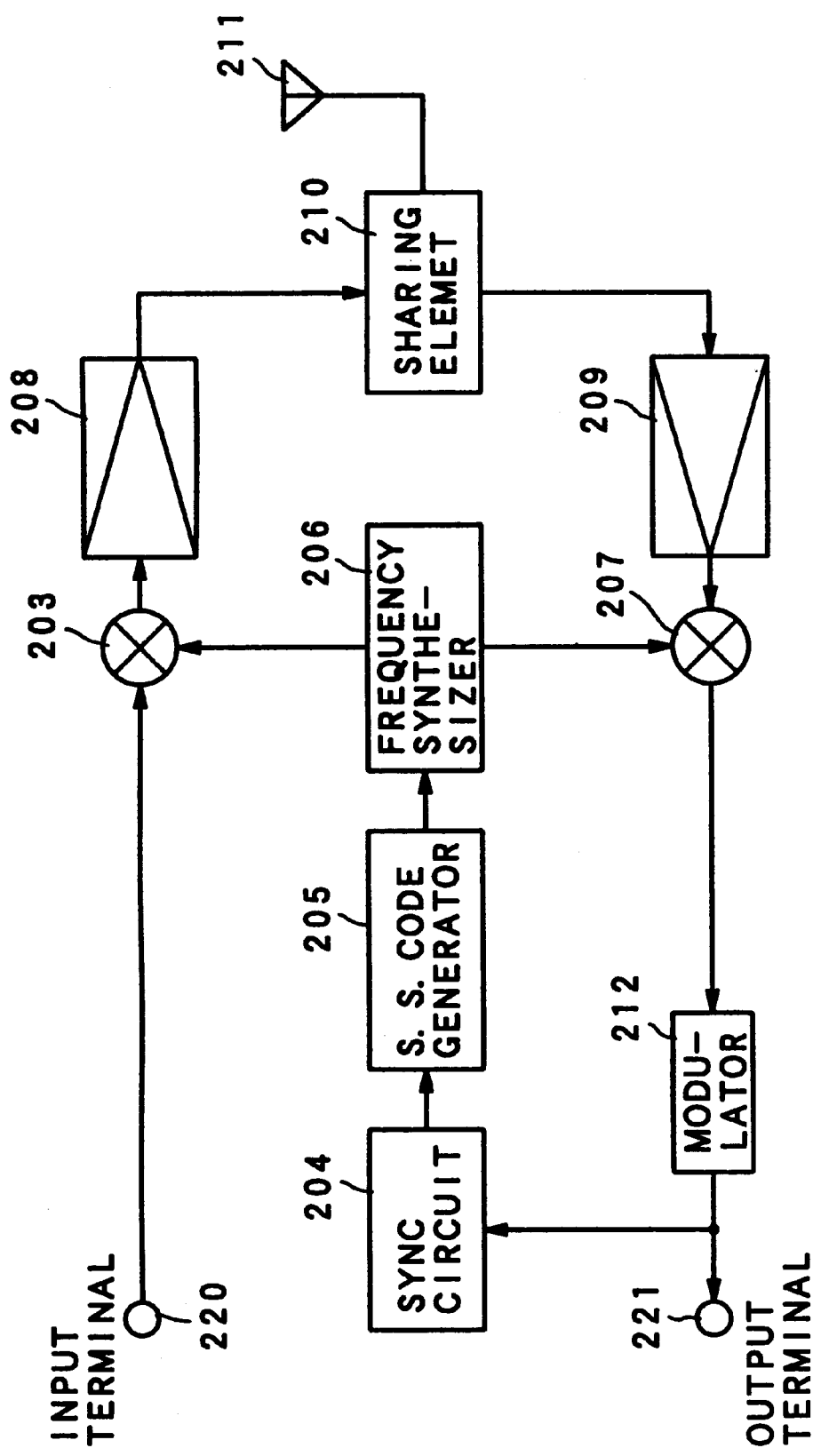
FIG. 30 is a block diagram showing a configuration of another sending and receiving device using a frequency hopping method.

FIGS. 27A, 27B and 27C are the flowcharts showing the communicating process of the master terminal 1. FIGS. 28A and 28B are the flowcharts showing the communicating process of the voice slave terminal. FIG. 29 is the flowchart showing the communicating process of the data slave terminal.

Figure 26A:
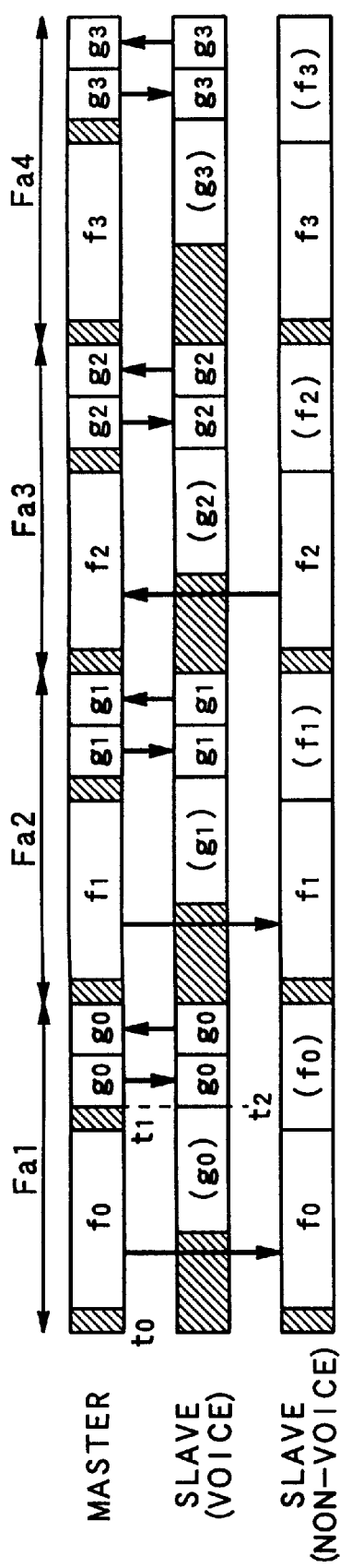

At first, the case is explained in which the master terminal 1 is communicating with the voice slave terminal 20A. Although FIG. 26A shows frames on and after the frame Fa1, this case is explained assuming that the communication was performed before the frame Fa1. When the frame before the frame Fa1 shown in FIG. 26A is ended, the frame is switched at a timing of a time t0, and then the frequency hop is performed at this timing (FIG. 27A, Step S301). If the value M of the hopping counter 35 at this time is 0, the CPU 10 selects a frequency f0 from the table TB1 shown in FIG. 25. Since communicating with the voice slave terminal (Step S302=YES), the communication with the data slave terminal is performed at the frequency f0 (Step S303). After the data slot is ended, the value M of the hopping counter 35 is incremented at a timing of a time t1 shown in FIG. 26A, and the frequency hop is performed again (Step S304). Since the value M of the hopping counter 35 becomes 1 at this time, a frequency g0 is selected from the table TB1 shown in FIG. 25. Next, it is determined whether or not the operation is a call mode described later (Step S305). If the present operation is not the call mode (Step S305=NO), the communication between the master terminal and the voice slave terminal is performed at the frequency g0 (Step S307).

On the other hand, the voice slave terminal 20A also performs the hop at the time t0, similarly to the master terminal 1 (FIG. 28A, Step S331). However, since the hopping table used by the voice slave terminal is the table TB3 shown in FIG. 25, the frequency g0 is selected at M=0. Then, since the operation is now under communication and is not a slave terminal call mode described later (Step S332=YES and Step S333=NO), the operational flow proceeds to a waiting state (Step S334). In this embodiment, the sleep slot is set in this waiting state, as mentioned above. Thus, the data slave terminal is in the sleep state until the timing of the hop at the time t1 in the master terminal 1. Next, the operation becomes in a wake state at the timing of the time t1, and ready for a communication with the master terminal starting from a time t2. There is no call from other voice slave terminals (Step S335=NO), and the operation is not a master terminal call mode described later (Step S337=NO). Hence, the communication with the master terminal is performed (Step S339).

The data slave terminal 40A also performs the hop at the time t0 in synchronization with the master terminal 1 (FIG. 29, Step S371). Since a table in the data slave terminal 40A is the table TB2 shown in FIG. 25, the frequency f0 is selected at M=0. In the example shown in FIG. 26A, data is not being sent by the data slave terminal 40A (Step S372=NO). Thus, data from the master terminal is received by the data slot at the frequency f0 (Step S363). Incidentally, although sent by the master terminal (Step S364=YES), the change of the data slot length is not required (Step S365=NO). Hence, the above mentioned processes are repeated while maintaining the short data slot.

When the similar processes are continued in the frames Fa1 to Fa4 as shown in FIG. 26A, the frequency is hopped to f0, f1, f2 and f3 at the data slot of the master terminal 1. The frequency is also hopped to g0, g1, g2 and g3 in the voice slot. Further, the frequencies are similarly hopped in the voice slave terminal 20A and the data slave terminal 40A. Therefore, the communication between the master terminal and the respective slave terminals is surely performed.

Especially, the sending operation and the receiving operation are alternatively performed within one frame, in the master terminal 1 and the voice slave terminal 20A. Accordingly, the repetition of the alternative operations enables the sending and receiving operation of a continuous voice signal.

The sending and receiving operation of the packet data is performed by the master terminal 1 and the data slave terminal 40A. Any one of the sending operation and the receiving operation is performed in a single data slot, as shown in FIG. 26A. Incidentally, the sending operation is performed by a single data slave terminal or only the master terminal, in the single data slot, as shown in FIG. 26D. Then, the data slave terminal or the master terminal which does not perform the sending operation starts the sending operation after checking that there is not the data slave terminal or the master terminal which is performing the sending operation in the data slot.

Figure 26B:
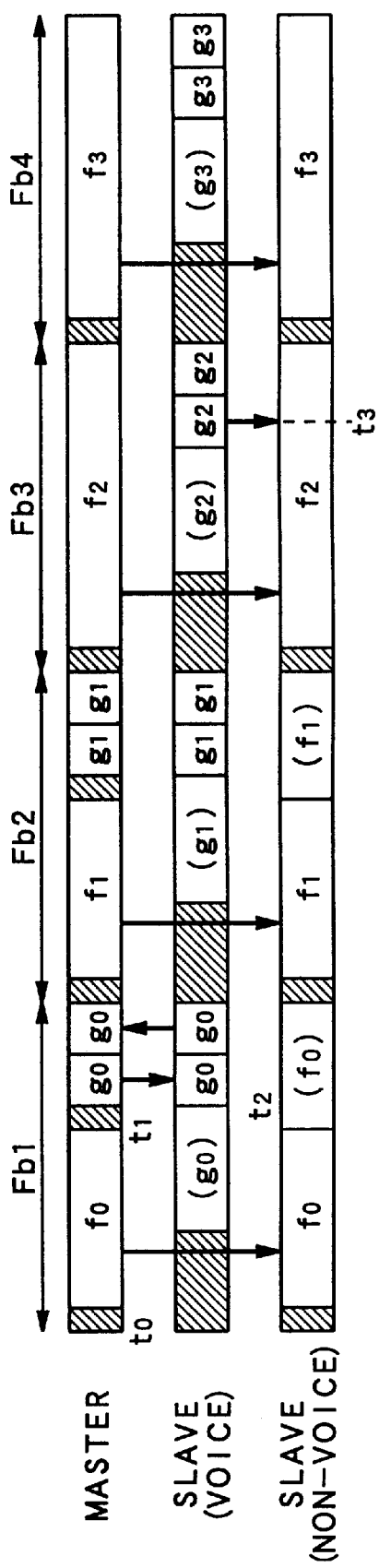

Next, the process after the communications with the master terminal 1 and the voice slave terminal 20A are ended is explained. As shown in FIG. 26B, when the communications with the master terminal 1 and the voice slave terminal 20A are ended at the frame Fb1, the master terminal 1 hops the frequency to f1 at a switch timing of a next frame Fb2 (FIG. 27A, Step S301). The example of FIG. 26B implies the case in which the communication with the voice slave terminal 20A is ended (Step S302=NO) and then the sending operation from the master terminal 1 is performed by the data slot (Step S308=YES). Then, the call from the voice slave terminal is not received, and the call of the voice slave terminal is not performed (FIG. 27B, Steps S310 and S311=NO). Hence, it is determined whether or not the length of the data slot is short (Step S312). Since the communication with the voice slave terminal is performed till the frame Fb1 in the example shown in FIG. 26B, the data slot is short (Step S312=YES). Thus, the data slot is set long from a next frame (Step S313). The information that the data slot length is made long is reported to the data slave terminal, at the frame Fb2 (Step S314). Then, the frequency is hopped to f2, at a switch timing of a next frame Fb3 (Step S301). The communication with the data slave terminal is started by the long data slot (Step S302=NO, Step S308=YES, Step S310= NO, Step S311=NO, Step S312=NO and Step S315).

On the other hand, in the data slave terminal 40A, when the frequency is hopped to f1 at the switch timing of the frame Fb2 (FIG. 29, Step S371) and the data from the master terminal is received (Step S372=NO and Step S373), since this data requires a change of the data slot length (Steps S374 and S375=YES), the setting of changing the data slot length from the next frame Fb3 is performed (Step S376). Then, the frequency is hopped to f2 at the switch timing of the next frame Fb3 (Step S371), and the data from the master terminal is received (Step S372=NO, Step S373, Step S374= YES and Step S375=NO).

In this way, when the communication with the voice slave terminal is not performed, the communication is performed by making the data slot length long. This results in a high data transmission rate.

Since the voice slave terminal does not communicate with the master terminal, while the hop is performed at the switch timing of the frame, the operational flow is in the waiting state (FIGS. 28A and 28B, Steps S331, S332, S340, S343, S353 and S356=NO and Step S357). However, the hopped frequency is different from that of the communication by the data slot. Thus, for example, even if the call is performed from the side of the voice slave terminal to other voice slave terminals and the like at the timing of the time t3 shown in FIG. 26B, this call does not interfere with the communication between the master terminal 1 and the data slave terminal 40A.

Next, the case is explained in which the communication between the master terminal and the data slave terminal is continued under the condition that the data slot length is made long as mentioned above. For example, in a case of determining that the communication with the data slave terminal 40A to this point is continued for a predetermined time while maintaining the long data slot after the frequency is hopped to f0 (FIG. 27A, Step S301) at a switch timing to a frame Fc1 shown in FIG. 26C and the data from the data slave terminal is received (Step S302=NO, Step S308=NO and Step S309), a process is performed to once make the data frame length short and call the voice slave terminal or receive the call from the voice slave terminal. In short, in order to hop to the frequency f1 at a next frame Fc2 (Step S301) and then send a request of changing the data frame length from the master terminal and thereby call the voice slave terminal (Step S308=YES, Step S310=NO and Step S311=YES), the data slot length on the side of the master terminal is firstly made short (Step S316), and the request of changing the data slot length is sent to the datae slave terminal at the frequency f1 (Step S317). Then, in order to call the voice slave terminal, the frequency is hopped to g1 at a timing of a time t4 shown in FIG. 26C (Step S318), and the voice slave terminal is called at the frequency g1 (Step S319). If a response is outputted by the voice slave terminal corresponding to the call (Step S320=YES), the communication with the voice slave terminal is performed (Step S321). However, if no response (Step S320=NO), the operational flow proceeds to a call mode (Step S322). If proceeding to this call mode, the call to the voice slave terminal is repeated in the condition that the data slot is made short and the voice slot is set (Steps S301 and S302=YES, Steps S303 and S304, Steps S305 and S306=YES).

On the other hand, the case of receiving the call from the voice slave terminal is similarly performed. Namely, in order to send the request of changing the data frame length from the master terminal and receive the call from the voice slave terminal (Steps S308 and S310=YES), the data slot length on the side of the master terminal is firstly made short (FIG. 27C, Step S323), and the request of changing the data slot length is sent to the data slave terminal at the frequency f1 (Step S324). Then, in order to receive the call from the voice slave terminal, the frequency is hopped to g1 at the timing of the time t4 shown in FIG. 26C (Step S325), and a reception admission signal is sent to the voice slave terminal at the frequency g1 (Step S326). A response from the voice slave terminal corresponding to the signal is received (Step S327), and it is determined whether or not a connection request is required by the voice slave terminal (Step S328). If the connection request is not required (Step S328=NO), the data slot length is made long from a next frame Fc3, and again the communication with the data slave terminal is resumed (Steps S301, S302, S308, S310, S311 and S312= YES and Steps S313 and S314). However, if the connection request is required (Step S328=YES), the communication with the voice slave terminal is performed (Step S330). At this time, a connection admission is sent to the voice slave terminal at a next frame.

On the other hand, the voice slave terminal side, if the call is outputted by the master terminal (FIG. 28B, Step S353= YES), responses to the master terminal (Step S354) and communicates with the master terminal (Step S355). The voice slave terminal side, if calling the master terminal (Step S356=YES), calls the master terminal (Step S358), and then it is determined whether or not a response is outputted by the master terminal (Step S359). As a result, if no response (Step S359=NO), the operational flow proceeds to a master terminal call mode (Step S360). If the response is outputted, the communication is performed (Steps S337 and S338=YES and Step S339). If no response, the call is continued (Step S337=YES and Step S338 NO).

As mentioned above, even if the communication with the data slave terminal is continued at the long data slot length, the call to the voice slave terminal or the call from the voice slave terminal is always received for each predetermined frame. Hence, while ensuring the high data transmission rate, the communication of the voice data can be performed surely and simultaneously.

If consecutively sending data to the master terminal from the data slave terminal (FIG. 29, Step S372=YES), it is necessary to perform a call from other data slave terminal or a call to other data slave terminal. Thus, a sending operation interruption process is performed for each predetermined frame number. In short, if not reaching the predetermined frame number (Step S377=NO), the data is continued to be sent (Step S378). However, if the sending operation of the predetermined frame number is performed (Step S377= YES), the sending operation is interrupted (Step S379). The operation becomes in a receiving state (Step S373) in order to check the call from the other data slave terminal. Then, if there is the call from the other data slave terminal (Step S374=NO and Step S380=YES), the data from the data slave terminal is received (Step S381). And, the sending operation is performed (Step S383), if it is necessary to perform the sending operation to the other data slave terminal (Step S382=YES), although there is not the call from the other data slave terminal (Step S374=NO and Step S380=NO).

The communication with the other data slave terminal can be surely performed as mentioned above.

Next, the process of the communication between the voice slave terminals is explained with reference to the flowchart of FIGS. 28A and 28B. For example, the example is explained if the call to the voice slave terminal 20C from the voice slave terminal 20B is performed in a case that the communication is being performed between the master terminal 1 and the voice slave terminal 20A, as shown in FIG. 26E.

Figure 26E:
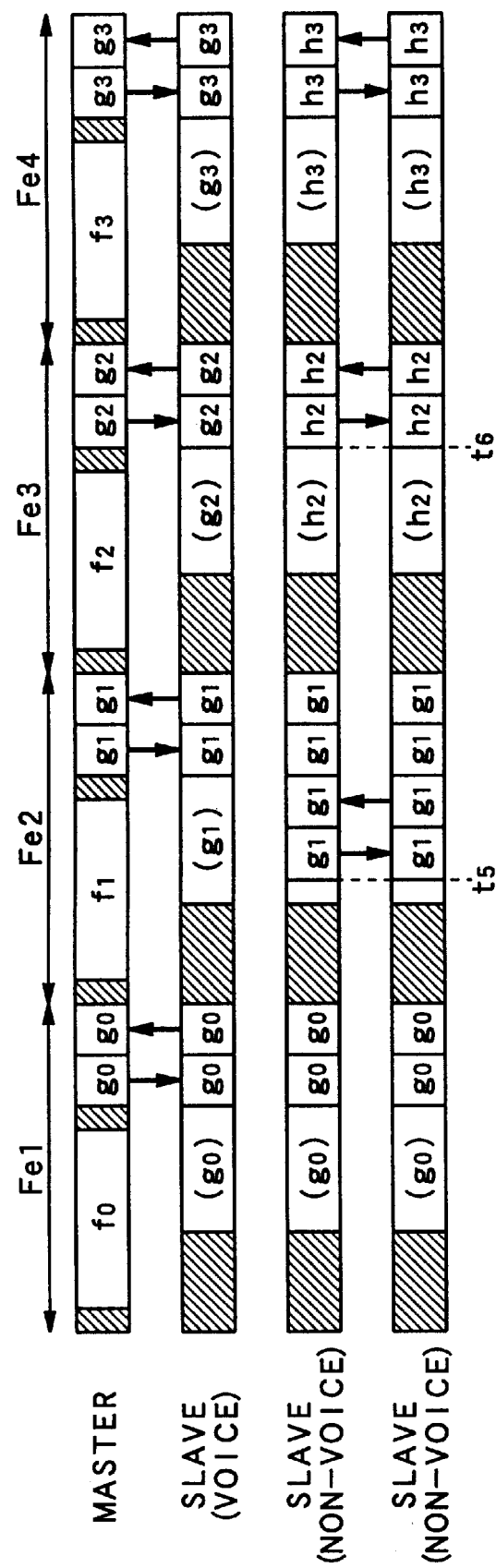

At first, in the voice slave terminal 20B, the frequency is hopped to g1 at a switch timing of a frame Fe2 shown in FIG. 26E (FIG. 28A=Step S331). If performing a call to the voice slave terminal 20C (Step S343=YES) when the communication is not performed (Step S332=NO) and there is no call from the other voice slave terminals (Step S340= NO), the call to the voice slave terminal 20C is performed at the frequency g1 at a timing of a time t5 shown in FIG. 26E (Step S344) without setting the usual waiting period. Then, it is determined whether or not there is a response from the voice slave terminal 20C (Step S345). As a result, if no response (Step S345=NO), the operational flow proceeds to a slave terminal call mode (Step S346). The call is continued at the above mentioned timing until the response is performed (Step S331, and Steps S332 and S333=YES= and Step S344).

However, if there is the response from the voice slave terminal 20C as shown in FIG. 26E (Step S345=YES), the operational flow proceeds to a hop between the slave terminals (Step S347). This hop uses the table TB4 shown in FIG. 25, and uses a frequency different from that used in the communication between the master terminal and the slave terminal.

Then, the frequency is hopped to h2 at a switch timing of a frame fe3 (FIG. 28B, Step S348). The waiting period similar to that of the communication with the master terminal is set (Step S349). Then, the communication with the voice slave terminal 20C is started at the frequency h2 from a timing of a time t6 shown in FIG. 26E (Step S350). Hereafter, the communication is performed in accordance with this sequence until the communication is ended (Step S351=NO). If the communication is ended (Step S351= YES), the operational flow again proceeds to the hop between the master terminal and the slave terminal (Step S352).

As mentioned above, the call between the slave terminals is performed at a position of a sleep slot, which enables the communication between the slave terminals without the interference with the communication between the master terminal and the other slave terminal or without the intervention of the master terminal. Moreover, the hopping table perfectly independent of the hopping table for the communication between the master terminal and the slave terminal is used in the hopping table for the communication between the slave terminals. Thus, this enables the communication between the slave terminals without the interference with the communication between the master terminal and the slave terminal. Incidentally, the type, in which a phase of the hopping table for the communication between the master terminal and the slave terminal is shifted in the manner of $h=g_{k+2}$, may be used in the hopping table used for the communication between the slave terminals. In this case, it is not necessary to hold a plurality of hopping tables. Hence, it is enough to add a correction value of 2 to the value M of the hopping counter 35 by the CPU 10.

As mentioned above, according to this embodiment, the communication is performed by setting the data slot and the voice slot within one frame. Hence, it is possible to simultaneously send and receive the voice data and the non-voice data with a high efficiency.

When the communication of the voice data is not performed, the length of the data slot is made long. Thus, it is possible to make the transmission rate of the non-voice data higher and also possible to perform the excellent communication adapted to the characteristic of the data.

The data slot of the master terminal and the data slot of the data slave terminal are synchronous with each other, and further the slot lengths are always coincident with each other. Therefore, it is possible to surely send the non-voice data with a high reliability.

It is designed that the frequency of the voice slot for the voice data communication is different from that of the data slot and the sending and receiving timings are set behind the data slot. Hence, it is possible to make the hop slot of the voice slave terminal longer. It is not necessary to use a fast type of a PLL local oscillator for the voice slave terminal. Moreover, a cheap PLL local oscillator can be used as frequency synthesizer.

It is designed to use the respectively different frequencies for the data slot and the voice slot. Thus, the excellent communications are performed without the interference with the mutual communications.

The communication between the slave terminals can be quickly performed without the intervention of the master terminal, since the call is performed by using the waiting period.

A hopping pattern for the data data slave terminal may be constructed by a frequency with less interruption, depending on a communication condition at that time. At this time, a hopping pattern for the slave terminal may be constructed by the remaining frequencies other than the frequencies used for the data data slave terminal. This is because the voice slot used for the communication of the voice data is shorter than the data slot and thereby an acoustic trouble is not brought about even if one frequency is interfered. On the other hand, the packet communication performed at the frequency with the less interruption can improve the reliability of the data transmission.

In this embodiment, the case is explained in which the sending lot and the receiving slot within the voice slot is constructed as one combination. However, the present invention is not limited thereto. Hence, it is allowable to set a plurality of combinations, each containing the sending lot and the receiving lot. Such a configuration enables the communication between a plurality of slave terminals. Moreover, in this case, it may be designed to use from the final combination of the sending and receiving slots in the frame and then the non-used voice slot is changed into the data slot.

Furthermore, the call between the slave terminals may be performed by using the hopping table between the master terminal and the slave terminal.

The invention may be embodied in other specific forms without departing from the spirit or essential characteristics thereof. For instance, the allocating device for dividing the frame into the slot to allocate to a first data and the slot to allocate to a second data is realized by the CPU 10 in the aforementioned embodiments. However, the allocating device may be realized by an electrical circuit, an LSI, a gate arrays or the like. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A communication apparatus comprising a master device connected with a plurality of outside lines for performing an outside communication of communication data between said master device and said plurality of outside lines, and a plurality of slave devices wirelessly connected with said master device for performing a communication of said communication data between said master device and said plurality of slave devices by using a spread spectrum communication method, said communication of said communication data between said master device and said plurality of slave devices being performed for each communication frame which indicates an unit of said communication on the basis of said spread spectrum communication method, said communication data including at least one of a first-type communication data and a second type communication data, (i) said master device comprising:
      a first communication device for performing said outside communication of said communication data between said master device and said plurality of outside lines;
      a converting device for converting a first format of said communication data received from said plurality of outside lines into a second format which can be handled by said master device, and for converting said second format of said communication data received from said plurality of slave devices into said first format which can be handled by said plurality of outside lines;
      an allocating device for dividing said communication frame into at least a first slot and a second slot for allocating said first slot to said communication data to be used for performing a first communication between said master device and a first slave device among said plurality of slave devices, and for allocating said second slot to said communication data to be used for performing a second communication between said master device and a second slave device among said plurality of slave devices, said first slot including a first sending slot and a first receiving slot, said second slot including a second sending slot and a second receiving slot; and
      a second communicating device for performing simultaneously said first communication of said communication data between said master device and said first slave device by using said first slot, and said second communication of said communication data between said master device and said second slave device by using said second slot, and
      a determining device for determining whether said communication data received from said plurality of outside lines by said first communicating device is first-type communication data or second-type communication data, and for determining whether said communication data received from said plurality of slave devices by said second communicating device is first-type communication data or second-type communication data,
      wherein said allocating device allocates said first slot to the communication of the first-type communication data and allocates said second slot to the communication of said second-type data on the basis of a determination by said determining device,
      wherein said allocating device changes a length of said first slot in accordance with the presence or absence of the second-type communication data determined by said determining device, and forms only said first slot if said determining device determines that no second-type communication data is present,
   (ii) each of said plurality of slave devices comprising:
      a generating device for generating said communication data to be send to said master device;
      a selecting device for selecting a slot allocated to said communication data to be used for performing said first or second communication between said master device and said each of plurality of slave devices from among at least said first slot and said second slot; and
      a third communicating device for performing said first or second communication of said communication data between said master device and each of plurality of slave devices by using said selected slot, wherein each of first slot comprising a hop period for stabilizing communication frequency, the hop period of the first slot used by a slave device which communicates voice data is longer than the hop period of the first slot used by the master device and a slave unit which communicates non-voice data.

* * * * *